United States Patent

Hollis

[11] Patent Number: 6,044,808
[45] Date of Patent: Apr. 4, 2000

[54] ELECTRONICALLY ASSISTED THERMOSTAT FOR CONTROLLING ENGINE TEMPERATURE

[76] Inventor: Thomas J. Hollis, 5 Roxbury Dr., Medford, N.J. 08055

[21] Appl. No.: 08/848,362

[22] Filed: Apr. 30, 1997

Related U.S. Application Data

[63] Continuation of application No. 08/593,993, Jan. 30, 1996, Pat. No. 5,657,722.

[51] Int. Cl.[7] .................................................. F01P 3/02
[52] U.S. Cl. ........................................................ 123/41.1
[58] Field of Search ........................... 123/41.1; 236/34, 236/34.5

[56] References Cited

U.S. PATENT DOCUMENTS

| | | |
|---|---|---|
| 2,392,723 | 1/1946 | Chandler . |
| 3,907,468 | 9/1975 | Green et al. . |
| 4,286,551 | 9/1981 | Blitz . |
| 4,319,547 | 3/1982 | Bierling . |
| 4,325,330 | 4/1982 | Kugler et al. . |
| 4,348,991 | 9/1982 | Stang et al. . |
| 4,369,738 | 1/1983 | Hirayama . |
| 4,381,736 | 5/1983 | Hirayama . |
| 4,399,774 | 8/1983 | Tsutsumi . |
| 4,399,775 | 8/1983 | Tanaka et al. . |

(List continued on next page.)

FOREIGN PATENT DOCUMENTS

| | | |
|---|---|---|
| 0 492 241 A1 | 12/1991 | European Pat. Off. . |
| 0 557 113 A2 | 8/1993 | European Pat. Off. . |
| 25 17 236 | 10/1976 | Germany . |
| 30 18 682 | 11/1980 | Germany . |
| 34 35 833 | 4/1986 | Germany . |
| 3543084 A1 | 6/1986 | Germany . |
| 35 16 502 | 11/1986 | Germany . |
| 40 33 261 | 4/1992 | Germany . |
| 289213 | 5/1987 | Japan . |
| 0223628 | 9/1990 | Japan . |
| 1574860 | 7/1987 | Russian Federation . |
| PCT/US96/ 01278 | 2/1996 | WIPO . |
| PCT/US96/ 06994 | 5/1996 | WIPO . |

OTHER PUBLICATIONS

Goodheart–Wilcox *Automotive Encyclopedia*, (1995) Engine Lubrication, Chapter 16, pp. 161–168.
Goodheart–Wilcox, *Automotive Encyclopedia*, (1995) Engine Cooling Systems, Chapter 17, pp. 169–185.
Hydraulic Handbook, (1958) First Edition, Section 2 Technical Data (3 sheets).

*Primary Examiner*—Noah P. Kamen
*Attorney, Agent, or Firm*—Seidel, Gonda, Lavorgna & Monaco, PC

[57] ABSTRACT

A temperature control system in a liquid cooled internal combustion engine including an electronically assisted thermostat for controlling flow of a temperature control fluid through the engine. The electronically assisted thermostat has a first state for inhibiting said flow and a second state for allowing said flow. The thermostat includes a housing with a valve member that reciprocates within the housing between the first state and the second state. A return spring biases the valve member into the second state. A wax pellet is attached to the valve member and has a solid state and a liquid state. The wax pellet maintains the valve member in its first state when the wax pellet is in its solid state, and allows the return spring to bias the valve member into its second state when the wax pellet is in its liquid state. A heating element is mounted within the housing and adapted to transfer heat to wax pellet. The heating element is adapted to receive an electrical transmission for producing heating of the heating element. An engine computer determines a thermostat state based on the temperature control fluid temperature signal and the additional signal. The engine computer sends an output signal when the additional signal is above a predetermined value regardless of whether the temperature of the temperature in control fluid signal is below a predetermined temperature control fluid temperature value. The signal from the engine computer controls the electrical transmission to the heating element.

3 Claims, 59 Drawing Sheets

U.S. PATENT DOCUMENTS

| | | | |
|---|---|---|---|
| 4,399,776 | 8/1983 | Shikata . | |
| 4,413,596 | 11/1983 | Hirayama . | |
| 4,423,705 | 1/1984 | Morita et al. . | |
| 4,484,541 | 11/1984 | Yokoyama . | |
| 4,489,680 | 12/1984 | Spokas et al. . | |
| 4,510,893 | 4/1985 | Schweiger et al. . | |
| 4,512,300 | 4/1985 | DeVore et al. . | |
| 4,520,767 | 6/1985 | Roettgen et al. . | |
| 4,522,334 | 6/1985 | Saur | 236/34.5 |
| 4,539,942 | 9/1985 | Kobayashi et al. . | |
| 4,545,333 | 10/1985 | Nagumo et al. . | |
| 4,546,742 | 10/1985 | Sturges . | |
| 4,550,693 | 11/1985 | Saur . | |
| 4,590,563 | 5/1986 | Matsumura et al. . | |
| 4,616,599 | 10/1986 | Taguchi et al. . | |
| 4,662,321 | 5/1987 | Devaux . | |
| 4,667,630 | 5/1987 | Sasaki . | |
| 4,726,324 | 2/1988 | Itakura . | |
| 4,726,325 | 2/1988 | Itakura . | |
| 4,794,883 | 1/1989 | Fukami et al. . | |
| 4,798,177 | 1/1989 | Oomura et al. . | |
| 4,813,408 | 3/1989 | Katsumoto et al. . | |
| 4,875,437 | 10/1989 | Cook et al. . | |
| 4,895,301 | 1/1990 | Kennedy . | |
| 4,926,800 | 5/1990 | Valev . | |
| 4,961,530 | 10/1990 | Wagner . | |
| 4,964,371 | 10/1990 | Maeda et al. . | |
| 4,977,743 | 12/1990 | Aihara et al. . | |
| 5,070,832 | 12/1991 | Hapka et al. . | |
| 5,111,775 | 5/1992 | Sumida et al. . | |
| 5,121,714 | 6/1992 | Susa et al. . | |
| 5,159,313 | 10/1992 | Kawai et al. . | |
| 5,170,755 | 12/1992 | Kano et al. . | |
| 5,174,254 | 12/1992 | Humburg | 123/41.08 |
| 5,183,012 | 2/1993 | Saur et al. | 123/41.08 |
| 5,195,467 | 3/1993 | Kurz . | |
| 5,215,044 | 6/1993 | Banzhaf et al. . | |
| 5,337,704 | 8/1994 | Roth . | |
| 5,385,296 | 1/1995 | Kurz et al. . | |
| 5,404,842 | 4/1995 | Matsushiro et al. . | |
| 5,415,147 | 5/1995 | Nagle et al. . | |
| 5,419,488 | 5/1995 | Saur et al. | 236/34.5 |
| 5,458,096 | 10/1995 | Hollis . | |
| 5,463,986 | 11/1995 | Hollis | 123/41.1 |
| 5,467,745 | 11/1995 | Hollis | 123/41.1 |
| 5,482,010 | 1/1996 | Lemberger et al. | 123/41.1 |
| 5,483,927 | 1/1996 | Letang et al. | 123/41.12 |
| 5,494,005 | 2/1996 | Saur | 123/41.1 |
| 5,505,164 | 4/1996 | Hollis | 123/41.33 |
| 5,507,251 | 4/1996 | Hollis | 123/41.1 |
| 5,529,025 | 6/1996 | Ranzinger et al. | 123/41.1 |
| 5,555,854 | 9/1996 | Huemer et al. | 123/41.1 |
| 5,572,958 | 11/1996 | Mader et al. | 123/41.1 |
| 5,582,138 | 12/1996 | Ziolek et al. . | |
| 5,617,816 | 4/1997 | Saur et al. | 123/41.08 |
| 5,775,270 | 7/1998 | Huemer et al. | 123/41.1 |

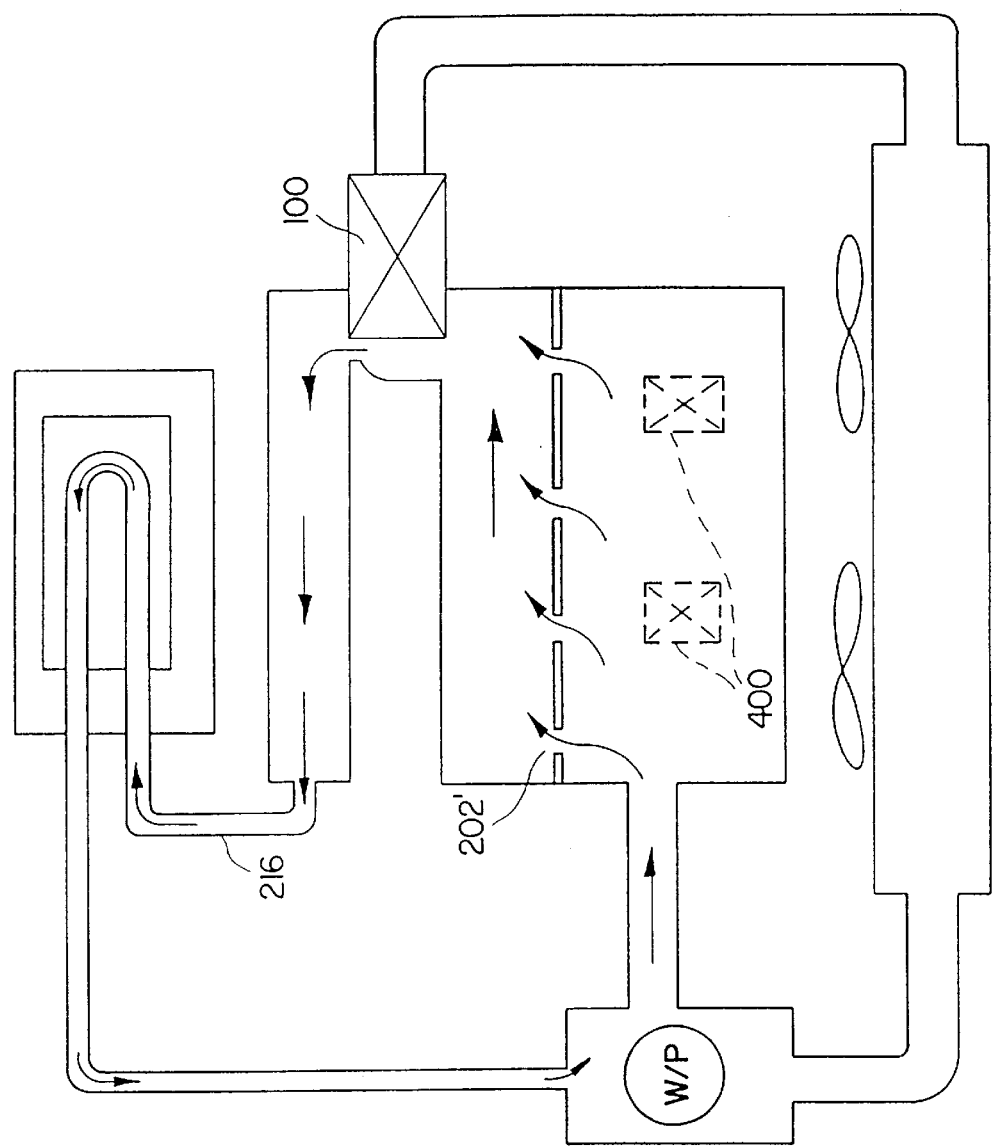

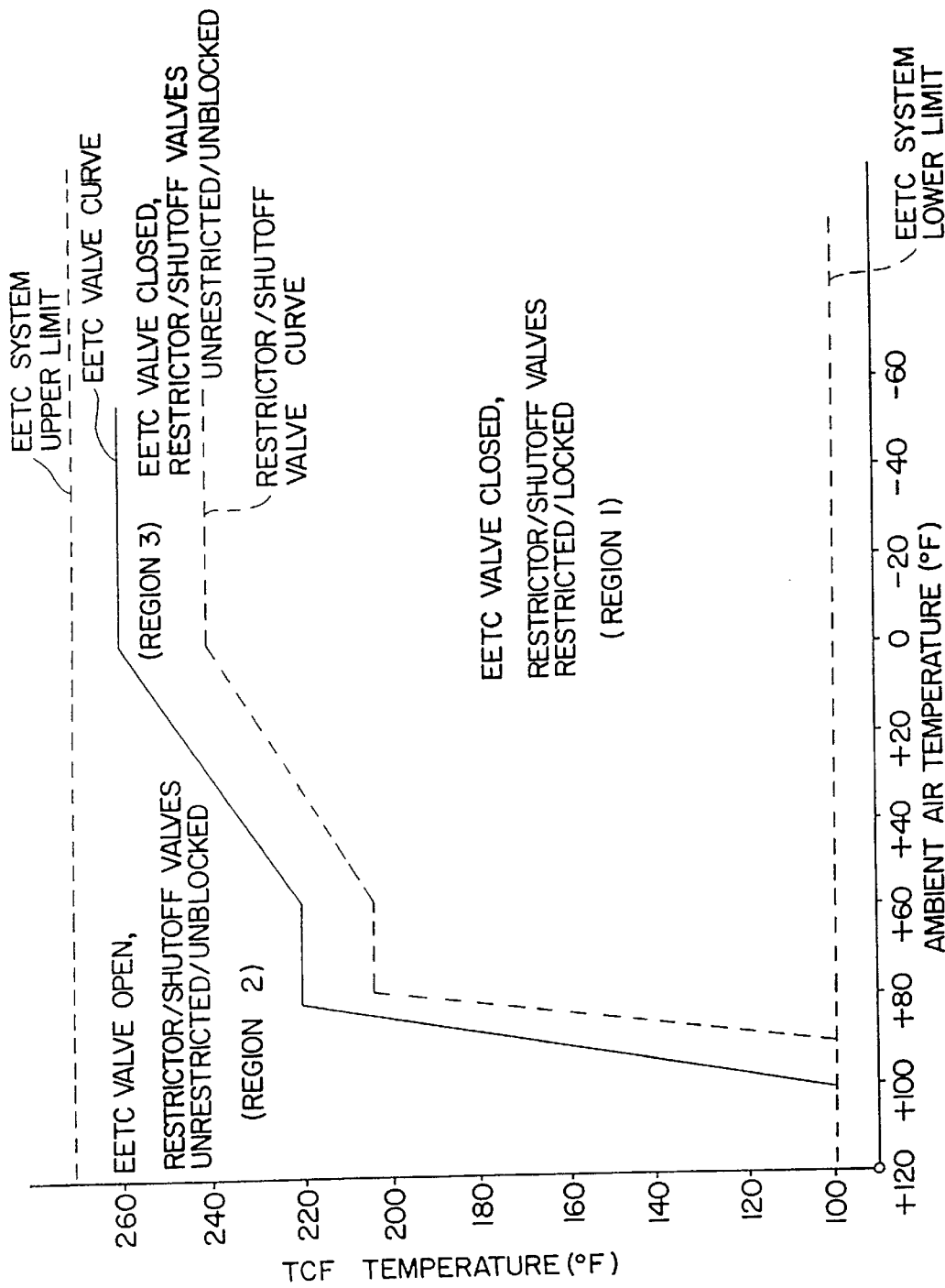

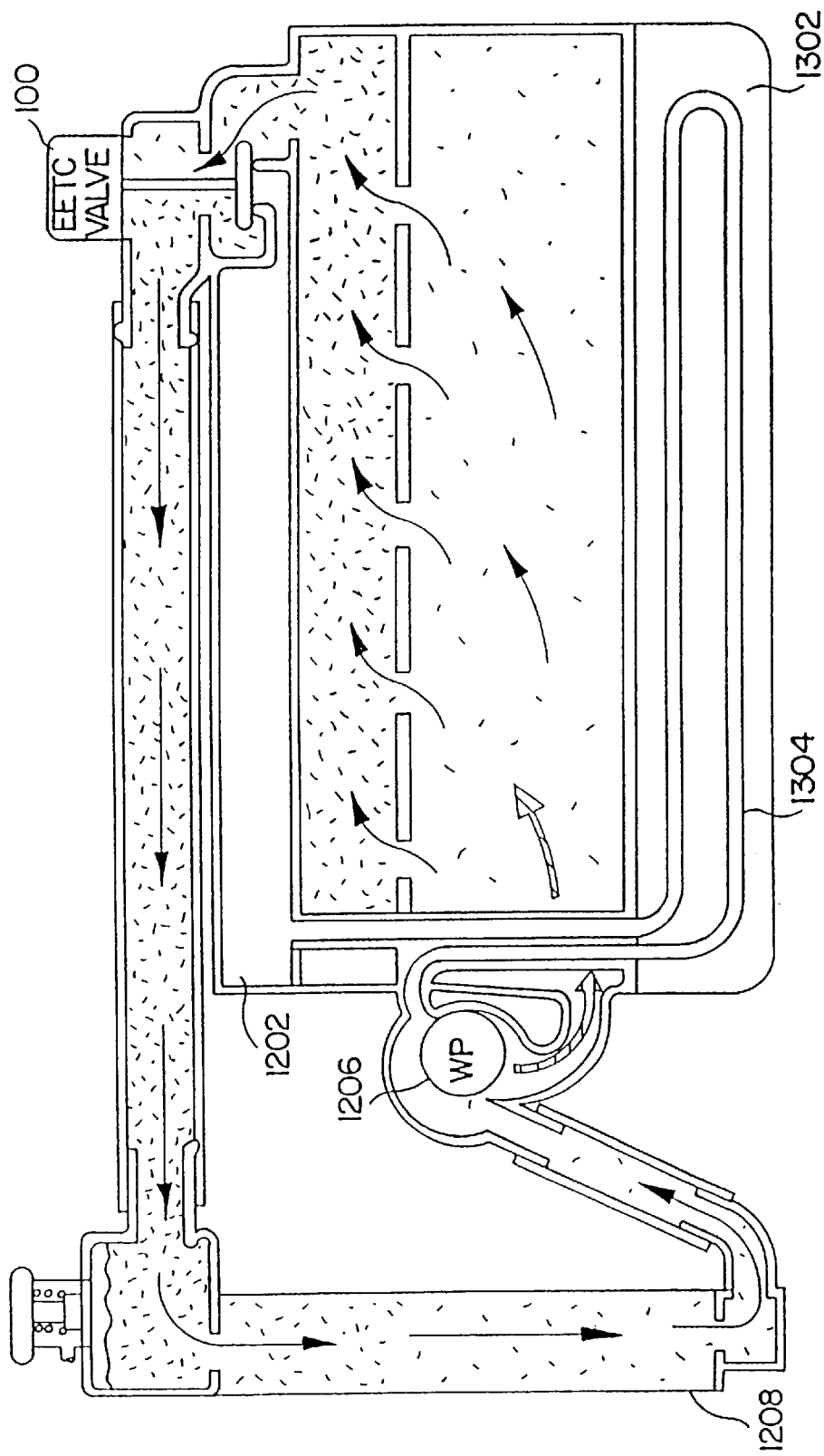

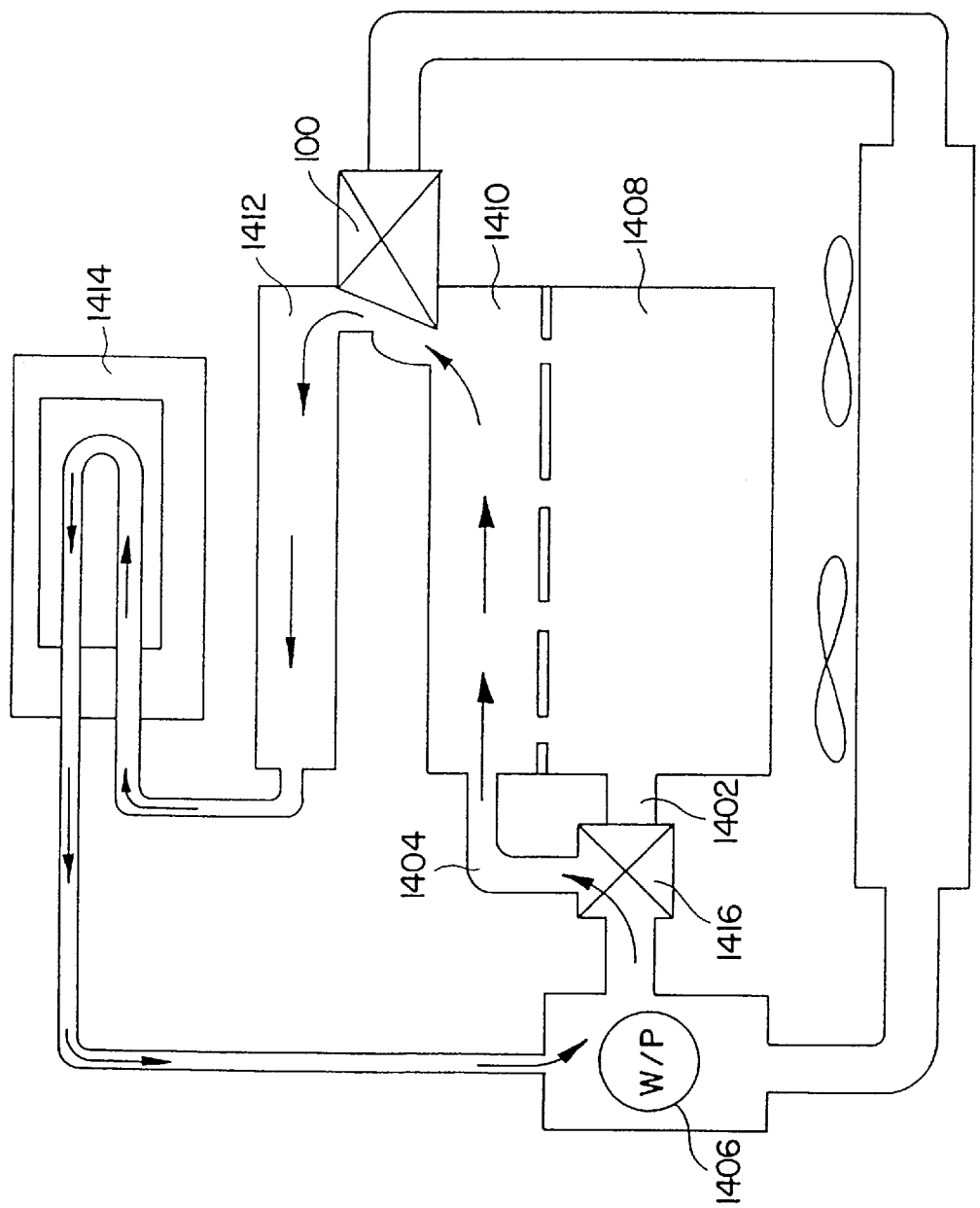
FIG. 44-A

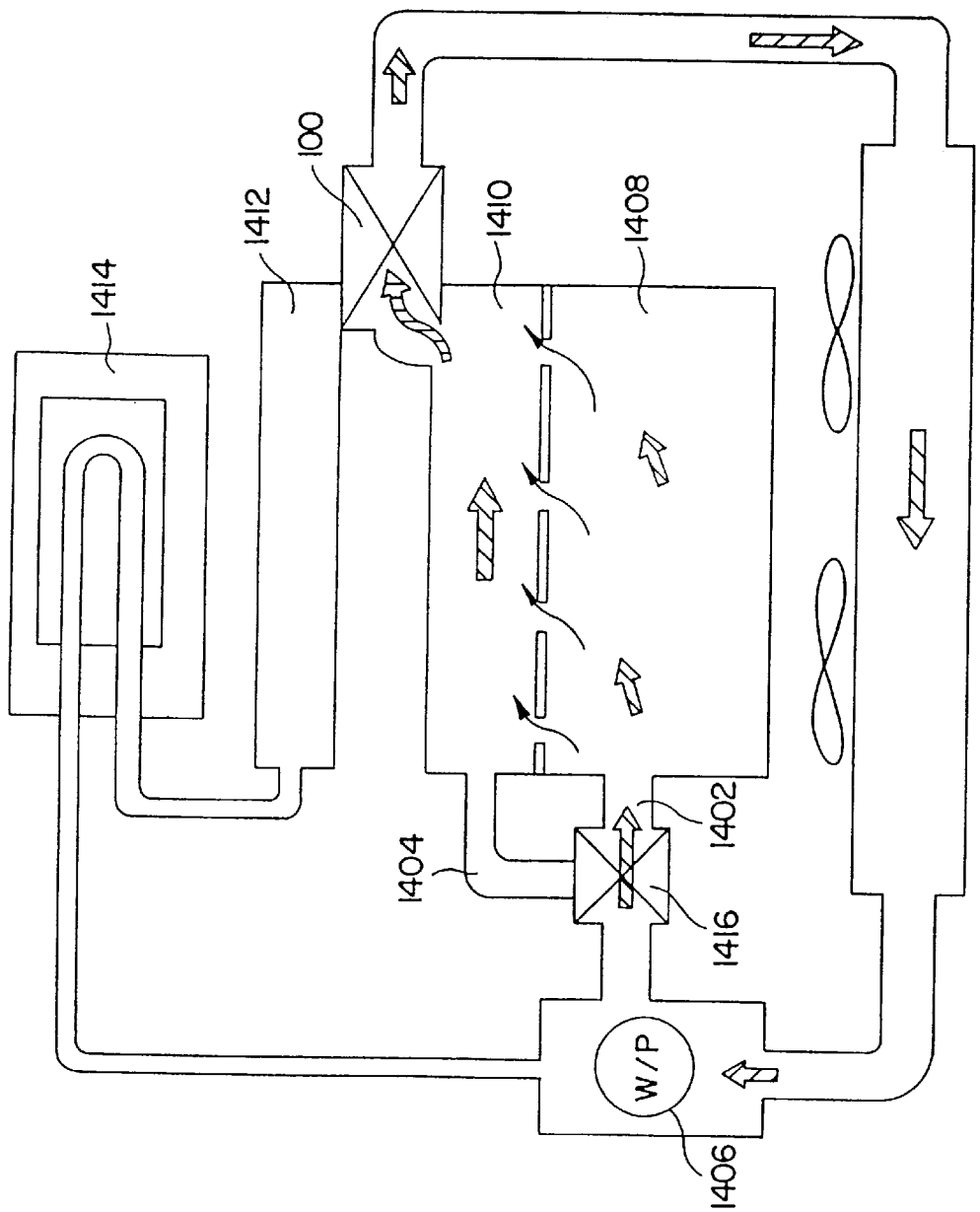
FIG. 44-B

ELECTRONICALLY ASSISTED THERMOSTAT FOR CONTROLLING ENGINE TEMPERATURE

This application is a continuation of Ser. No. 08/593,993, filed Jan. 30, 1996, now U.S. Pat. No. 5,657,722.

CROSS-REFERENCE TO RELATED APPLICATION

This application is a related to U.S. application Ser. No. 08/390,711, filed Feb. 17, 1995 and entitled "SYSTEM FOR MAINTAINING ENGINE OIL AT AN OPTIMUM TEMPERATURE," abandoned, which is a continuation-in-part of U.S. application Ser. No. 08/306,272 filed Sep. 14, 1994 and entitled "SYSTEM FOR DETERMINING THE APPROPRIATE STATE OF A FLOW CONTROL VALVE AND CONTROLLING ITS STATE," now U.S. Pat. No. 5,467,745. The entire disclosures of both of these applications is incorporated herein by reference. This application is also related to U.S. application Ser. No. 08/469,957 filed Jun. 6, 1995 and entitled "SYSTEM FOR DETERMINING THE LOAD CONDITION OF AN ENGINE FOR MAINTAINING OPTIMUM ENGINE OIL TEMPERATURE," now U.S. Pat. No. 5,507,251. The entire disclosure of this application is incorporated herein by reference.

FIELD OF THE INVENTION

This invention relates to a system for maintaining engine lubrication oil at a desired temperature by controlling the state of one or more flow control valves which regulate the flow of temperature control fluid within an internal combustion gasoline or diesel engine equipped with a radiator.

BACKGROUND OF THE INVENTION

Page 169 of the *Goodheart-Willcox Automotive Encyclopedia,* The Goodheart-Willcox Company, Inc., South Holland, Ill., 1995 describes that as fuel is burned in an internal combustion engine, about one-third of the heat energy in the fuel is converted to power. Another third goes out the exhaust pipe unused, and the remaining third must be handled by a cooling system. This third is often underestimated and even less understood.

Most internal combustion engines employ a pressurized cooling system to dissipate the heat energy generated by the combustion process. The cooling system circulates water or liquid coolant through a water jacket which surrounds certain parts of the engine (e.g., block, cylinder, cylinder head, pistons). The heat energy is transferred from the engine parts to the coolant in the water jacket. In hot ambient air temperature environments, or when the engine is working hard, the transferred heat energy will be so great that it will cause the liquid coolant to boil (i.e., vaporize) and destroy the cooling system. To prevent this from happening, the hot coolant is circulated through a radiator well before it reaches its boiling point. The radiator dissipates enough of the heat energy to the surrounding air to maintain the coolant in the liquid state.

In cold ambient air temperature environments, especially below zero degrees Fahrenheit, or when a cold engine is started, the coolant rarely becomes hot enough to boil. Thus, the coolant does not need to flow through the radiator. Nor is it desirable to dissipate the heat energy in the coolant in such environments since internal combustion engines operate most efficiently and pollute the least when they are running relatively hot. A cold running engine will have significantly greater sliding friction between the pistons and respective cylinder walls than a hot running engine because oil viscosity decreases with temperature. A cold running engine will also have less complete combustion in the engine combustion chamber and will build up sludge more rapidly than a hot running engine. In an attempt to increase the combustion when the engine is cold, a richer fuel is provided. All of these factors lower fuel economy and increase levels of hydrocarbon exhaust emissions.

To avoid running the coolant through the radiator, coolant systems employ a thermostat. The thermostat operates as a one-way valve, blocking or allowing flow to the radiator. FIGS. 40–42 (described below) and FIG. 2 of U.S. Pat. No. 4,545,333 show typical prior art thermostat controlled coolant systems. Most prior art coolant systems employ wax pellet type or bimetallic coil type thermostats. These thermostats are self-contained devices which open and close according to precalibrated temperature values.

Coolant systems must perform a plurality of functions, in addition to cooling the engine parts. In cold weather, the cooling system must deliver hot coolant to heat exchangers associated with the heating and defrosting system so that the heater and defroster can deliver warm air to the passenger compartment and windows. The coolant system must also deliver hot coolant to the intake manifold to heat incoming air destined for combustion, especially in cold ambient air temperature environments, or when a cold engine is started. Ideally, the coolant system should also reduce its volume and speed of flow when the engine parts are cold so as to allow the engine to reach an optimum hot operating temperature. Since one or both of the intake manifold and heater need hot coolant in cold ambient air temperatures and/or during engine start-up, it is not practical to completely shut off the coolant flow through the engine block.

Practical design constraints limit the ability of the coolant system to adapt to a wide range of operating environments. For example, the heat removing capacity is limited by the size of the radiator and the volume and speed of coolant flow. The state of the self-contained prior art wax pellet type or bimetallic coil type thermostats is controlled solely by coolant temperature. Thus, other factors such as ambient air temperature cannot be taken into account when setting the state of such thermostats.

Numerous proposals have been set forth in the prior art to more carefully tailor the coolant system to the needs of the vehicle and to improve upon the relatively inflexible prior art thermostats.

U.S. Pat. No. 4,484,541 discloses a vacuum operated diaphragm type flow control valve which replaces a prior art thermostat valve in an engine cooling system. When the coolant temperature is in a predetermined range, the state of the diaphragm valve is controlled in response to the intake manifold vacuum. This allows the engine coolant system to respond more closely to the actual load on the engine. U.S. Pat. No. 4,484,541 also discloses in FIG. 4 a system for blocking all coolant flow through a bypass passage when the diaphragm valve allows coolant flow into the radiator. In this manner, all of the coolant circulates through the radiator (i.e., none is diverted through the bypass passage), thereby shortening the cooling time.

U.S. Pat. No. 4,399,775 discloses a vacuum operated diaphragm valve for opening and closing a bypass for bypassing a wax pellet type thermostat valve. During light engine load operation, the diaphragm valve closes the bypass so that coolant flow to the radiator is controlled by the wax pellet type thermostat. During heavy engine load operation, the diaphragm valve opens the bypass, thereby removing the thermostat from the coolant flow path. Bypassing the thermostat increases the volume of cooling water flowing to the radiator, thereby increasing the thermal efficiency of the engine.

U.S. Pat. No. 4,399,776 discloses a solenoid actuated flow control valve for preventing coolant from circulating in the engine body in cold engine operation, thereby accelerating engine warm-up. This patent also employs a conventional thermostat valve.

U.S. Pat. No. 4,545,333 discloses a vacuum actuated diaphragm flow control valve for replacing a conventional thermostat valve. The flow control valve is computer controlled according to sensed engine parameters.

U.S. Pat. No. 4,369,738 discloses a radiator flow regulation valve and a block transfer flow regulation valve which replace the function of the prior art thermostat valve. Both of those valves receive electrical control signals from a controller. The valves may be either vacuum actuated diaphragm valves or may be directly actuated by linear motors, solenoids or the like. In one embodiment of the invention disclosed in this patent, the controller varies the opening amount of the radiator flow regulation valve in accordance with a block output fluid temperature.

U.S. Pat. No. 5,121,714 discloses a system for directing coolant into the engine in two different streams when the oil temperature is above a predetermined value. One stream flows through the cylinder head and the other stream flows through the cylinder block. When the oil temperature is below the predetermined value, a flow control valve closes off the stream through the cylinder block. Although this patent suggests that the flow control valve can be hydraulically actuated, no specific examples are disclosed. The flow control valve is connected to an electronic control unit (ECU). This patent describes that the ECU receives signals from an outside air temperature sensor, an intake air temperature sensor, an intake pipe vacuum pressure sensor, a vehicle velocity sensor, an engine rotation sensor and an oil temperature sensor. The ECU calculates the best operating conditions of the engine cooling system and sends control signals to the flow control valve and to other engine cooling system components.

U.S. Pat. No. 5,121,714 employs a typical prior art thermostat valve 108 for directing the cooling fluid through a radiator when its temperature is above a preselected value. This patent also describes that the thermostat valve can be replaced by an electrical-control valve, although no specific examples are disclosed U.S. Pat. No. 4,744,336 discloses a solenoid actuated piston type flow control valve for infinitely varying coolant flow into a servo controlled valve. The solenoids receive pulse signals from an electronic control unit (ECU). The ECU receives inputs from sensors measuring ambient temperature, engine input and output coolant temperature, combustion temperature, manifold pressure and heater temperature.

One prior art method for tailoring the cooling needs of an engine to the actual engine operating conditions is to selectively cool different portions of an engine block by directing coolant through different cooling jackets (i.e., multiple circuit cooling systems). Typically, one cooling jacket is associated with the engine cylinder head and another cooling jacket is associated with the cylinder block.

For example, U.S. Pat. No. 4,539,942 employs a single cooling fluid pump and a plurality of flow control valves to selectively direct the coolant through the respective portions of the engine block. U.S. Pat. No. 4,423,705 shows in FIGS. 4 and 5 a system which employs a single water pump and a flow divider valve for directing cooling water to head and block portions of the engine.

Other prior art systems employ two separate water pumps, one for each jacket. Examples of these systems are given in U.S. Pat. No. 4,423,705 (see FIG. 1), U.S. Pat. No. 4,726,324, U.S. Pat. No. 4,726,325 and U.S. Pat. No. 4,369,738.

Still other prior art systems employ a single water pump and single water jacket, and vary the flow rate of the coolant by varying the speed of the water pump.

U.S. Pat. No. 5,121,714 discloses a water pump which is driven by an oil hydraulic motor. The oil hydraulic motor is connected to an oil hydraulic pump which is driven by the engine through a clutch. An electronic control unit (ECU) varies the discharge volume of the water pump according to selected engine parameters.

U.S. Pat. No. 4,079,715 discloses an electromagnetic clutch for disengaging a water pump from its drive means during engine start-up or when the engine coolant temperature is below a predetermined level.

Published application nos. JP 55-35167 and JP 53-136144 (described in column 1, lines 30–62 of U.S. Pat. No. 4,423,705) disclose clutches associated with the driving mechanism of a water pump so-that the pump can be stopped under cold engine operation or when the cooling water temperature is below a predetermined value.

The goal of all engine cooling systems is to maintain the internal engine temperature as close as possible to a predetermined optimum value. Since engine coolant temperature generally tracks internal engine temperature, the prior art approach to controlling internal engine temperature control is to control engine coolant temperature. Many problems arise from this approach. For example, sudden load increases on an engine may cause the internal engine temperature to significantly exceed the optimum value before the coolant temperature reflects this fact. If the thermostat is in the closed state just before the sudden load increase, the extra delay in opening will prolong the period of time in which the engine is unnecessarily overheated.

Another problem occurs during engine start-up or warm-up. During this period of time, the coolant temperature rises more rapidly than the internal engine temperature. Since the thermostat is actuated by coolant temperature, it often opens before the internal engine temperature has reached its optimum value, thereby causing coolant in the water jacket to prematurely cool the engine. Still other scenarios exist where the engine coolant temperature cannot be sufficiently regulated to cause the desired internal engine temperature.

When the internal engine temperature is not maintained at an optimum value, the engine oil will also not be at the optimum temperature. Engine oil life is largely dependent upon wear conditions. Engine oil life is significantly shortened if an engine is run either too cold or too hot. As noted above, a cold running engine will have less complete combustion in the engine combustion chamber and will build up sludge more rapidly than a hot running engine. The sludge contaminates the oil. A hot running engine will prematurely break down the oil. Thus, more frequent oil changes are needed when the internal engine temperature is not consistently maintained at its optimum value.

Prior art cooling systems also do not account for the fact that the optimum oil temperature varies with ambient air temperature. As the ambient air temperature declines, the internal engine components lose heat more rapidly to the environment and there is an increased cooling effect on the internal engine components from induction air. To counter these effects and thus maintain the internal engine components at the optimum operating temperature, the engine oil should be hotter in cold ambient air temperatures than in hot ambient air temperatures. Current prior art cooling systems cannot account for this difference because the cooling system is responsive only to coolant temperature.

In sum, the prior art approach of employing coolant temperature to control the internal engine temperature is crude and inaccurate.

Despite the large number of ideas proposed to improve the performance of engine cooling systems, there is still a need for cooling system components and techniques which allow the system to more effectively match its performance to the instantaneous needs of the engine, while still meeting the plurality of other functions noted above which are demanded of the cooling system. There is especially a need for a system and technique for controlling the state of one or more flow control valves in engine cooling systems in accordance with predetermined engine and ambient temperature conditions, including the actual internal engine temperature. The present invention fills that need.

A temperature control system in a liquid cooled internal combustion engine including an electronically assisted thermostat for controlling flow of a temperature control fluid through the engine. The electronically assisted thermostat has a first state for inhibiting said flow and a second state for allowing said flow. The thermostat includes a housing with a valve member that reciprocates within the housing between the first state and the second state. A return spring biases the valve member into the second state. A wax pellet is attached to the valve member and has a solid state and a liquid state. The wax pellet maintains the valve member in its first state when the wax pellet is in its solid state, and allows the return spring to bias the valve member into its second state when the wax pellet is in its liquid state. A heating element is mounted within the housing and adapted a to transfer heat to wax pellet. The heating element is adapted to receive an electrical transmission for producing heating of the heating element.

An engine computer receives a temperature control fluid temperature signal and at least one additional signal. The engine computer determines a thermostat state based on the temperature control fluid temperature signal and the additional signal. The engine computer sends an output signal when the additional signal is above a predetermined value regardless of whether the temperature of the temperature control fluid signal is below a predetermined temperature control fluid temperature value. The signal from the engine computer controls the electrical transmission to the heating element.

A method for controlling the flow of temperature control fluid in an internal combustion engine is also disclosed. The method includes controlling the flow of temperature control fluid along a passageway within the engine with the use of an electronically assisted thermostat.

The foregoing and other objects features and advantages of the present invention will become more apparent in light of the following detailed description of the preferred embodiments thereof, as illustrated in the accompanying drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 14C is a diagrammatic illustration of a second embodiment of the temperature control system of the present invention employing the novel EETC valve to control flow to the radiator in a GM 3800 V6 transverse internal combustion engine during the warm-up phase.

FIGS. 22A and 22B are graphs showing the state of a plurality of valves in the invention at selected temperature control fluid and ambient air temperatures.

FIG. 32B is an idealized diagrammatic view of the second embodiment of FIG. 32A showing the temperature control fluid flow paths during normal operation.

FIG. 44A is a diagrammatic illustration of an alternate embodiment of the temperature control system according to the present invention in an internal combustion which includes a by-pass waterjacket for assisting in engine warm-up.

FIG. 44B is a diagrammatic illustration of the temperature control system shown in FIG. 44A during normal operation.

DESCRIPTION OF THE PREFERRED EMBODIMENT

Figure 1:
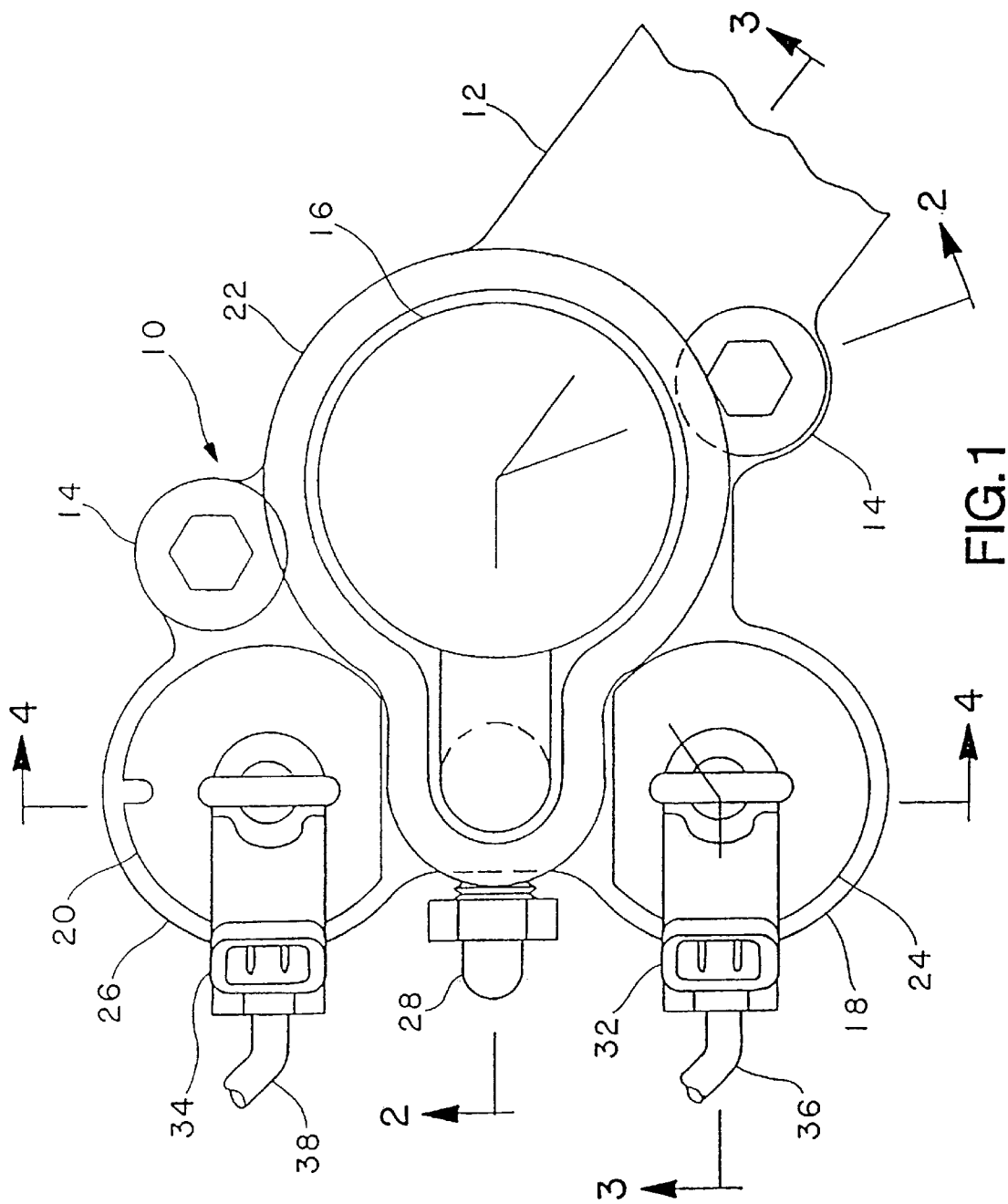
FIG. 1 is a top plan view of one preferred form of a hydraulically operated electronic engine temperature control valve for controlling the flow of temperature control fluid in an engine.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Certain terminology is used herein for convenience only and is not be taken as a limitation on the invention. Particularly, words such as "upper," "lower," "left," "right," "horizontal," "vertical," "upward," and "downward" merely describe the configuration shown in the figures. Indeed, the valves and related components may be oriented in any direction. For example while a vertically oriented radiator is illustrated in the figures, a horizontally oriented radiator is well within the scope of the invention.

Apparatus depicting the preferred embodiments of the novel electronic engine temperature control valve are illustrated in the drawings.

FIG. 1 shows a top plan view of electronic engine temperature control valve 10 (hereafter, "EETC valve 10") as it would appear attached to an engine temperature control fluid passageway 12. (Only a portion of the passageway 12 is visible in this view.) The EETC valve 10 is attached to the passageway 12 by mounting-bolts 14. The EETC valve 10 includes two major subcomponents, a valve mechanism 16 and a pair of solenoid actuated hydraulic fluid injectors 18 and 20. The injector 18 is a fluid inlet valve and the injector 20 is a fluid outlet valve. In effect, the injectors 18, 20 are one-way flow through valves. The view in FIG. 1 shows valve housing sub-parts including housing 22 of the valve mechanism 16 and housings 24 and 26 of the respective hydraulic fluid injectors 18 and 20. The EETC valve 10 also includes fluid pressure sensor 28 mounted to the valve housing through insert 30. In the preferred embodiment, the insert 30 is a brass fitting.

Also visible in FIG. 1 are electrical terminals 32, 34, and fluid inlet and outlet tubes 36, 38, associated with respective fluid injectors 18 and 20. These tubes are attached to respective solid tubes which feed into the valve housing through inserts 30. Those inserts 30 are not visible in this view. However, the insert 30 associated with the inlet tube 36 is visible in FIG. 3. The inlet tube 36 is connected to a source of pressurized hydraulic fluid, such as engine lubrication oil. The outlet tube 38 is connected to a low pressure reservoir of the hydraulic fluid, such as an engine lubrication oil pan. Each of the electrical terminals 32, 34 are connected at one end to a solenoid inside of its respective fluid injector (not shown) and at the other end to a computerized engine electronic control unit (ECU) (not shown).

Figure 2:
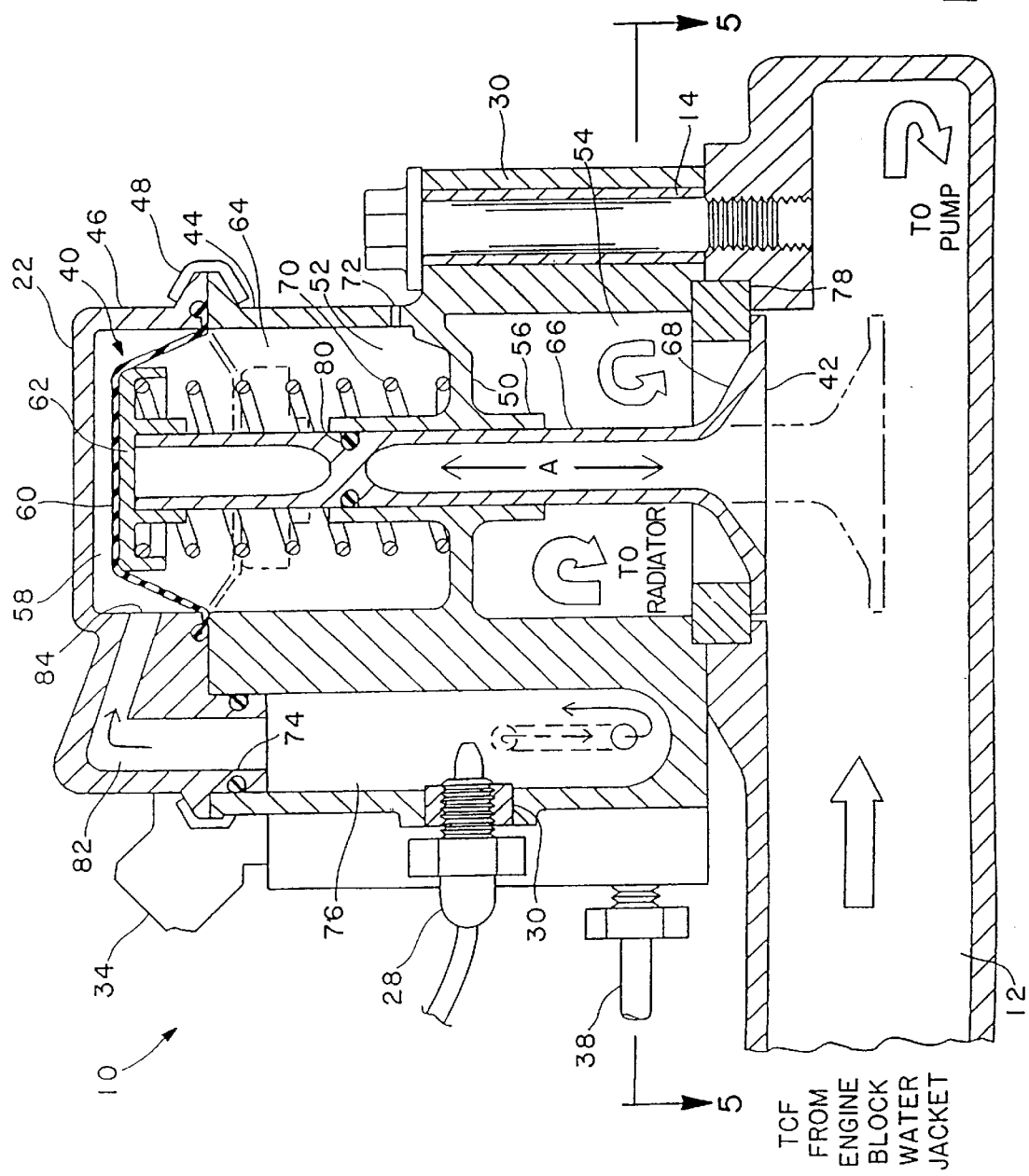
FIG. 2 is a sectional side view of the valve in FIG. 1, taken along line 2—2 in FIG. 1.

FIG. 2 shows a sectional side view of one version of the EETC valve 10, taken along line 2—2 in FIG. 1. In this version, the EETC valve 10 is a hydraulically actuated diaphragm valve 40. The diaphragm valve 40 reciprocates within the valve housing 22 along axis A between a first and second state or position. The solid lines in FIG. 2 shows the valve 40 in the first position which is associated with a valve "closed" state. FIG. 2 also shows the valve's second position in phantom which is associated with a valve "open" state. In the first "closed" position, the valve 40 prevents flow of temperature control fluid (hereafter, "TCF") through passageway opening 42. In the second "open" position, the valve 40 allows fluid flow through the opening 42. The opening 42 leads to the engine radiator (not shown). Also visible in FIG. 2 is the electrical terminal 34 and the outlet tube 38 associated with the solenoid 20, the fluid pressure sensor 28, and one of the mounting bolts 14.

The temperature control fluid (TCF) referred to herein is typically known in the art as "coolant." Coolant is a substance, ordinarily fluid, used for cooling any part of a reactor in which heat is generated. However, as will be described below, the TCF not only removes heat energy from engine components but is also employed in certain embodiments to deliver heat energy to certain engine components. Thus, the TCF is more than merely a coolant. Likewise, while the prior art referenced herein relates to engine cooling systems, the invention herein employs its unique valve(s) in an engine temperature control system, providing both cooling and heating functions to engine components.

Turning again to FIG. 2, the valve 40 reciprocates within the valve mechanism housing 22. The housing 22 is constructed of body 44 and cover 46, held together by band clamp or crimp 48. The body 44 includes a generally horizontal dividing wall 50 which divides the body 44 into upper compartment 52 and lower compartment 54. (It should be recognized that the dividing wall 50 is a generally cylindrical disk in three dimensions.) The center of the dividing disk or wall 50 has a circular bore to allow passage of a reciprocating valve shaft or rod therethrough, as described below. A cylindrical collar 56 extends vertically upward and downward from the inner edge of the dividing wall 50, thereby coinciding with the outer circumference of the circular bore. The collar 56 is integral with the dividing wall 50. The lower end of the lower compartment 54 leads to the opening 42.

As noted above, the valve 40 reciprocates between a first "closed" position wherein the valve 40 prevents flow of TCF through passageway opening 42 and a second "open" position wherein the valve 40 allows fluid flow through the opening 42. When the valve 40 is "closed," the water pump circulates the TCF only through the engine block water jacket. If the heater or defroster is in operation, the fluid is also circulated through a heat exchanger for the passenger compartment heater, typically a heater core. When the valve 40 is "open," most of the TCF flows through the radiator before it is circulated through the engine block water jacket and the heater's heat exchanger.

Thus, in the embodiment of the invention shown in FIG. 2, the valve 40 functions in a manner similar to the prior art wax pellet thermostat. However, unlike the fixed temperature wax pellet thermostat, the valve 40 is electronically controlled and thus can be opened and closed according to a computer controlled signal tailored to specific engine operating conditions and ambient environmental conditions.

The diaphragm valve 40 includes upper chamber 58, diaphragm 60, plate 62, lower chamber 64, shaft or rod 66, valve member 68 and biasing spring 70. The diaphragm 60, plate 62 and spring 70 are disposed in the housing body's upper compartment 52. The diaphragm 60 separates the housing body's upper compartment 52 into the upper and lower chambers 58, 64. The spring 70 is seated on one side against a lower surface of the plate 62 and on the other side against an upper surface of the housing body's dividing wall 50. The rod 66 is also seated on one side against the lower surface of the plate 62 and extends through the housing body's upper and lower compartments 52, 54. The diaphragm 60 is mechanically linked to the valve member 68 through the plate 62 and the rod 66. The position of the diaphragm 60 is thus communicated through the plate 62 and the rod 66 to the valve member 68, thereby causing the valve member 68 to reciprocate between the first and, second positions, shown in solid and in phantom, respectively.

The lower chamber portion of the body 44 includes air bleed opening 72 therethrough for removing and reintroducing air into the lower chamber 64 as the diaphragm valve 40 is moved between its first and second positions. Radial O-ring 74 prevents the hydraulic fluid from leaking out of passage 76.

The valve 40 also includes a gasket seal 78 around the periphery of the opening 42 to allow the valve member 68 to close off flow through the opening 42 when the valve 40 is in the first position. In the preferred embodiment of the invention, the gasket seal 78 also functions as the valve seat for the valve member 68. The gasket seal 78 is generally square in vertical cross-section, although other shapes are contemplated by the invention. One preferred type of gasket seal material is Viton®, manufactured by E.I. Du Pont De Nemours & Co., Wilmington, Del. An O-ring 80 is disposed within the outer circumference of the rod 80 to prevent TCF in the lower compartment 54 from leaking into the valve's lower chamber 64.

In the preferred embodiment of the invention, the diaphragm 60 possesses special characteristics to allow it to more easily withstand very high pressures. Details of the diaphragm 60 are more fully discussed with respect to FIG. 15.

Figure 4:
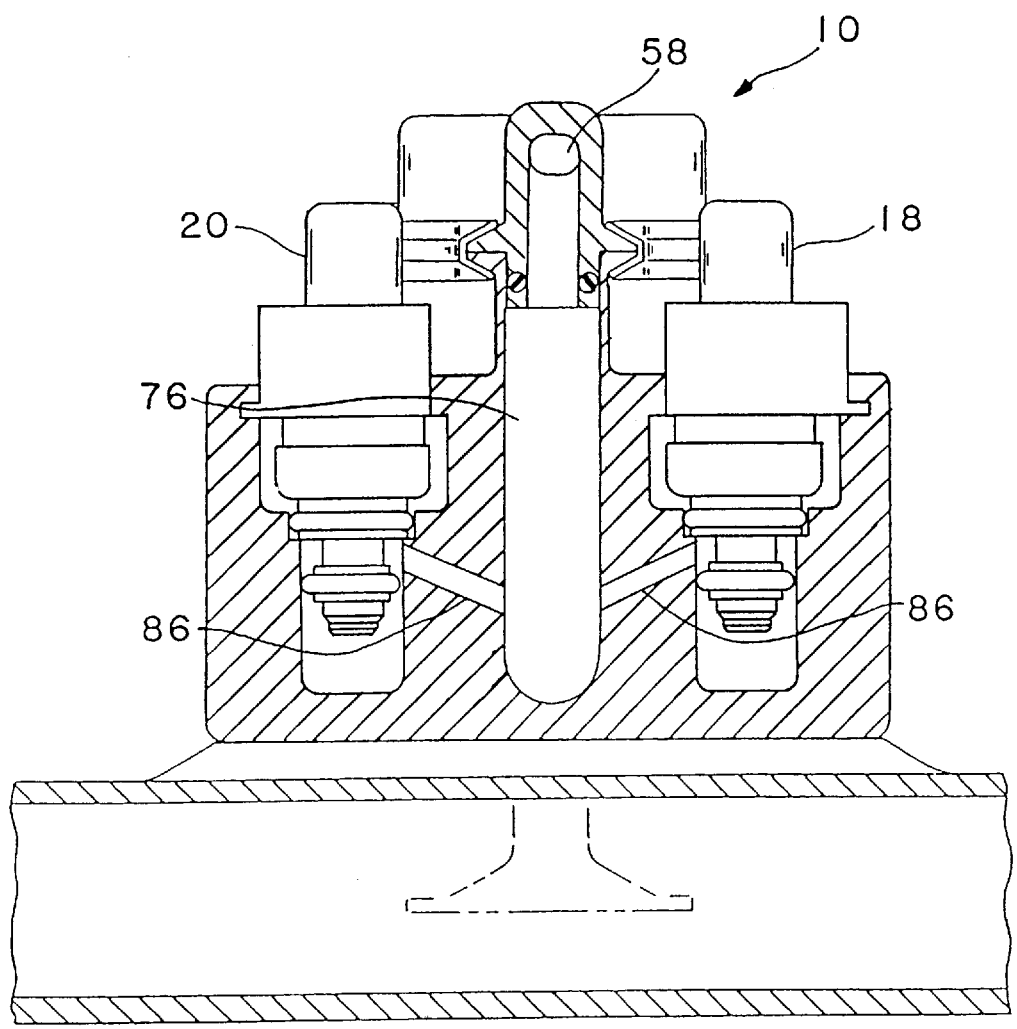
FIG. 4 is yet another sectional side view of the valve in FIG. 1, taken along line 4—4 in FIG. 1.

The diaphragm valve upper chamber 58 is in fluid communication with hydraulic fluid passageway 82 through opening 84 therebetween. The fluid passageway 82 is in fluid communication with the outlet of the hydraulic fluid injector 18 and the inlet of the hydraulic fluid injector 20 through the passage 76, as best shown in FIG. 4. The fluid passageway is also in fluid communication with the fluid pressure sensor 28 to allow the pressure in the passageway to be monitored for controlling the valve state. Diaphragm valves of the size suitable for installation in an engine fluid passageway can typically withstand pressures in the range of 200 psi. The diaphragm strength is typically the first component to fail due to excessive high pressure. Pressure monitoring helps to ensure that pressures do not exceed those which the valve components can safely handle.

A warning system can be incorporated which would send a signal from the pressure sensor 28 to the ECU when the pressure exceeds or falls below a predetermined limit, 'such as if there is a loss of hydraulic pressure. The ECU could then display a suitable warning to the operator. Additionally, override mechanisms, such as an electromechanical device, could be activated to lock the EETC valve in the open position thereby maintaining flow to the radiator during valve failure.

Figure 15:
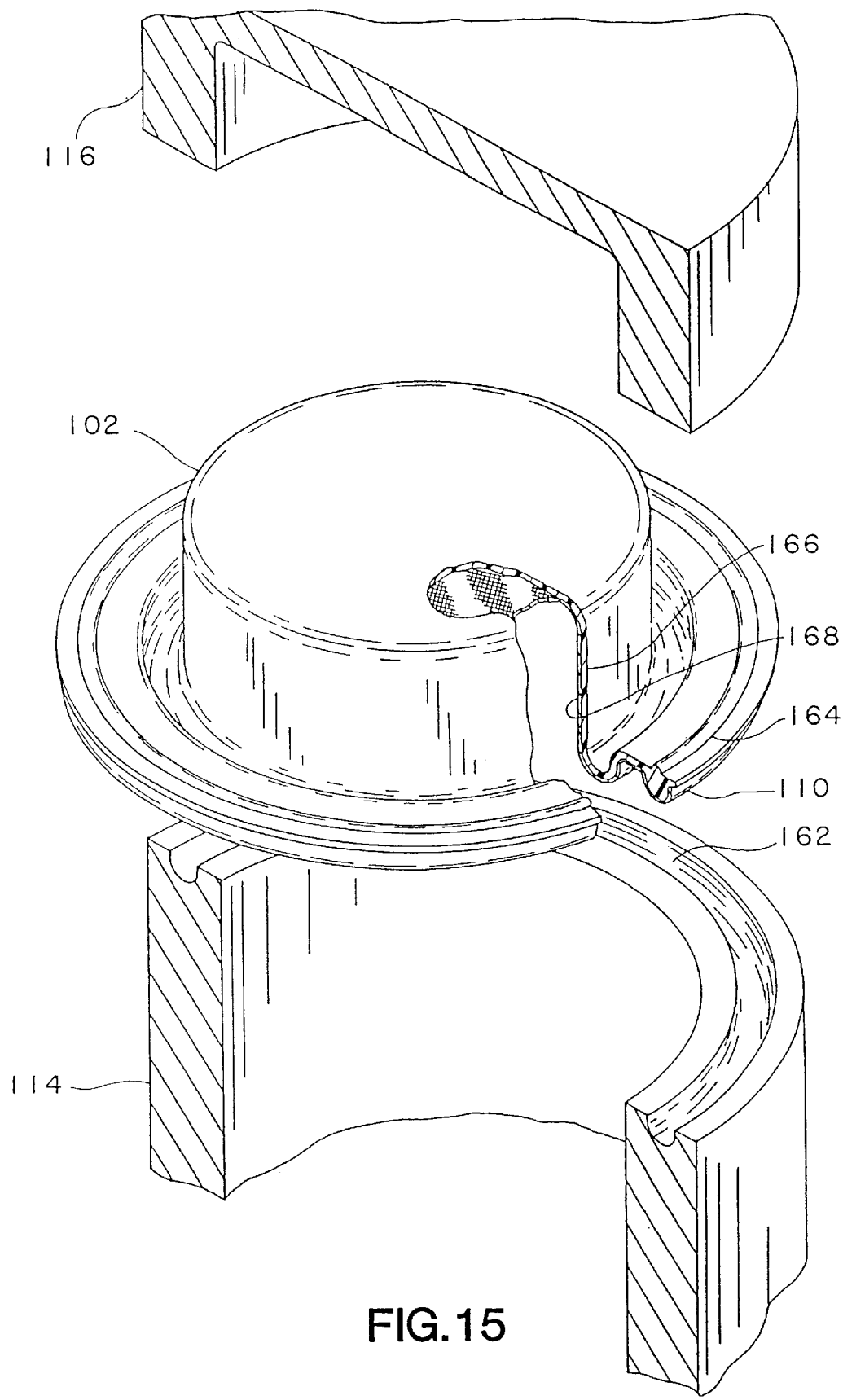
FIG. 15 is an exploded view of a portion of the valve in FIG. 2 showing a preferred embodiment of a diaphragm and how it attaches to the valve housing.

In the preferred embodiment of the invention, the diaphragm includes certain features to allow it to better withstand a high pressure environment. FIG. 15 shows a preferred diaphragm and an exploded view of the preferred manner in which the diaphragm is mounted in the diaphragm valve mechanism housing to achieve the best results under high pressure.

Unlike prior art diaphragm valves, such as disclosed in U.S. Pat. No. 4,484,541, which are actuated and deactuated by applying and removing a vacuum to and from an upper chamber, the diaphragm valve 40 disclosed herein is actuated by pressurized and depressurizing the upper chamber 58 with hydraulic fluid. A hydraulic fluid system has numerous advantages over a vacuum actuated system including less sensitivity to temperature extremes, and increased accuracy, durability and reliability. These are very considerations since the EETC system must function under a multitude of extreme conditions, both environmental and physical. Accordingly, a reliable power source is required and one of the most dependable sources of hydraulic fluid in an engine is pressurized engine oil.

The EETC internal engine circuit is generally operating at higher temperatures to optimize engine performance. These higher temperatures require higher pressures to actuate the EETC valve (e.g., about 10 pounds of force). Standard electromechanical solenoid-type or vacuum-type valves may experience operational problems during the worst case conditions. The novel EETC valve of the present invention is designed to provide the force required to actuate the valve when less than 50% of normal engine oil pressure is available, such as when there is a low amount of oil present, a high oil temperature, or the oil pump is worn. Accordingly, the hydraulically actuated EETC valve disclosed is the preferred valve for the disclosed system.

In operation, the valve 40 functions as follows. When the engine is operating and it is desired to open the valve 40, the ECU sends a control signal to the solenoid of the hydraulic fluid injector 18 to open the injector's valve. Simultaneously, the ECU sends a control signal to the solenoid of the hydraulic fluid injector 20 to close that injector's valve, if it is not- already closed. Pressurized hydraulic fluid from the fluid inlet tube 36 flows through the fluid injector 18, the hydraulic fluid passageway 82, the opening 84 and into the valve upper chamber 58, where it pushes against the diaphragm 60 and plate 62. When the fluid pressure against the diaphragm 60 and plate 62 exceeds the opposing force of the biasing spring 70, the diaphragm 60 moves downward, thereby causing the valve member 68 to move downward. The upper chamber 58 expands as the diaphragm 60 and plate 62 moves downward. As the upper chamber 58 fills with fluid, the pressure in the chamber rises. When the pressure sensor 28 detects that the fluid pressure has reached a predetermined level, it causes the ECU to start a timer which runs for a predetermined period of time. After that time has expired, the ECU sends a control signal to the solenoid of the hydraulic fluid injector 18 to close the injector's valve. The hydraulic fluid in the upper chamber 58 thus remains trapped therein.

The predetermined pressure level and time period are empirically determined so as to allow the valve member 68 to reach its open or second position. To avoid excessively activating the injector's solenoids, the open injector valve should be closed as soon as the diaphragm valve 40 has reached the desired state. Also, a diaphragm valve 40 is selected which will always open under less pressure than exists in the hydraulic fluid system that the inlet fluid injector 18 is attached to. To remove air trapped in the upper chamber 58 and/or connected passageways, the ECU can be programmed to open the valve of the outlet fluid injector 20 for a short period of time (e.g., one second). This is similar to the technique for bleeding air from a vehicle's hydraulic braking system.

If hydraulic fluid leaks out of the upper chamber 58, the pressure sensor 28 will immediately sense this condition. The ECU responds by again sending a control signal to the solenoid of the hydraulic fluid injector 18 to open the injector's valve. When the pressure sensor 28 detects that the fluid pressure has again reached the predetermined level, it causes the ECU to start-a timer which runs again for a predetermined period of time. After that time has expired, the ECU sends a control signal to the solenoid of the hydraulic fluid injector 18 to close the injector's valve.

The process of opening the EETC valve is automatically delayed by the ECU during engine start-up until the source of the hydraulic fluid pressure reaches it normal operating level. In one embodiment of the invention which employs engine lubrication oil as the hydraulic fluid, the delay period is about two or three seconds to allow for lubrication of all critical engine components.

When it is desired to close the valve 40, the above steps are reversed. That is, the ECU sends a control signal to the solenoid of the hydraulic fluid injector 18 to close the injector's valve, if it is not already closed. Simultaneously, the ECU sends a control signal to the solenoid of the hydraulic fluid injector 20 to open that injector's valve. The pressurized hydraulic fluid inside the upper chamber 58 flows out of the upper chamber 58 through the opening 84, into the hydraulic fluid passageway 82, through the open valve of the hydraulic fluid injector 20 and into the fluid outlet tube 38. The fluid outlet tube 38 connects to a reservoir (not shown) of hydraulic fluid. As the hydraulic fluid empties out of the upper chamber 58, biasing spring 70 pushes the diaphragm 60 and plate 62 upward, thereby causing the valve member 68 to move upward until the valve 40 becomes closed. When the pressure sensor 28 detects that the upper chamber 58 is no longer pressurized, it causes the ECU to send a control signal to the solenoid of the hydraulic fluid injector 20 to close that injector's valve.

The vehicle's engine does not need to be operating to close the valve 40. Thus, during a "hot engine off soak" (i.e., the time period subsequent to shutting off a hot engine), the valve 40 stays open since the hydraulic fluid remains trapped in the upper chamber 58. This function mimics prior art cooling systems which maintain an open path to the radiator until the thermostat's wax pellet rehardens. After the engine has cooled down, the ECU (which is powered from the vehicle's battery) causes the valve 40 to close, as described above.

Figure 3:
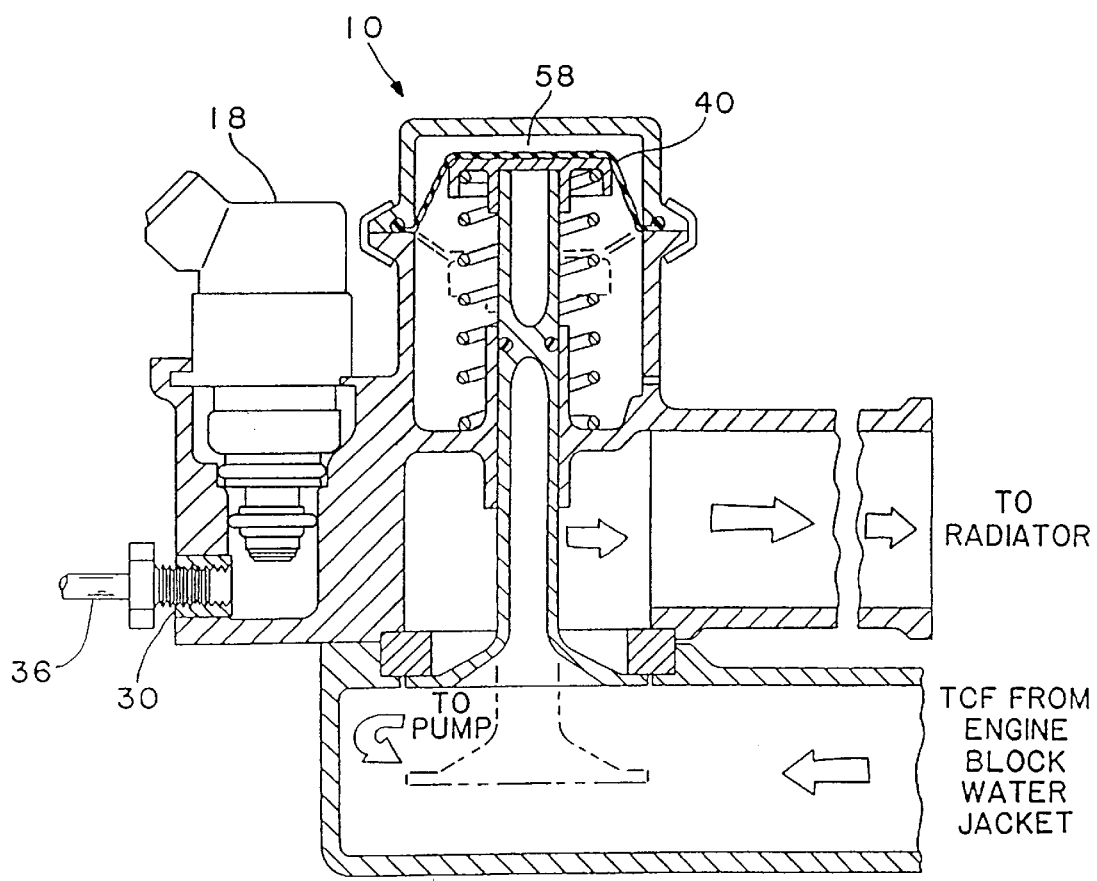
FIG. 3 is a different sectional side view of the valve in FIG. 1, taken along line 3—3 in FIG. 1.

FIG. 3 shows a different sectional side view of the diaphragm version of the EETC valve 10, taken along line 3—3 in FIG. 1. This view more clearly shows the entire path of the TCF from a passageway leading from the engine block water jacket, through the valve 40 and to the radiator. As noted above, if the valve 40 is closed, the TCF circulates directly back into the engine block water jacket, without being diverted into the radiator.

FIG. 3 also shows the inlet hydraulic fluid injector 18 and the fluid inlet tube 36 leading thereto, along with the insert 30 associated therewith. As noted above, the insert 30 is preferably a brass fitting. The passageway 82 from the outlet of the injector's valve to the upper chamber 58 is not visible in this view but is clearly shown in FIG. 4. The fluid connection or path between the fluid inlet tube 36 and the injector 18 is also not visible in this view but is understandable with respect to FIG. 6.

FIG. 4 shows yet another sectional side view of the diaphragm version of the EETC valve 10, taken along line 3—3 in FIG. 1. This view shows fluid passageway 86 from the outlet of the hydraulic fluid injector 18 to the passage 76 leading to the diaphragm upper chamber 58, and from the upper chamber 58 to the passage 76 leading from the hydraulic fluid injector 20. Again, the fluid connections or paths between the fluid inlet and outlet tubes 36, 38 and the respective injectors 18, 20 are also not visible in this view but are understandable with respect to FIG. 6.

Figure 5:
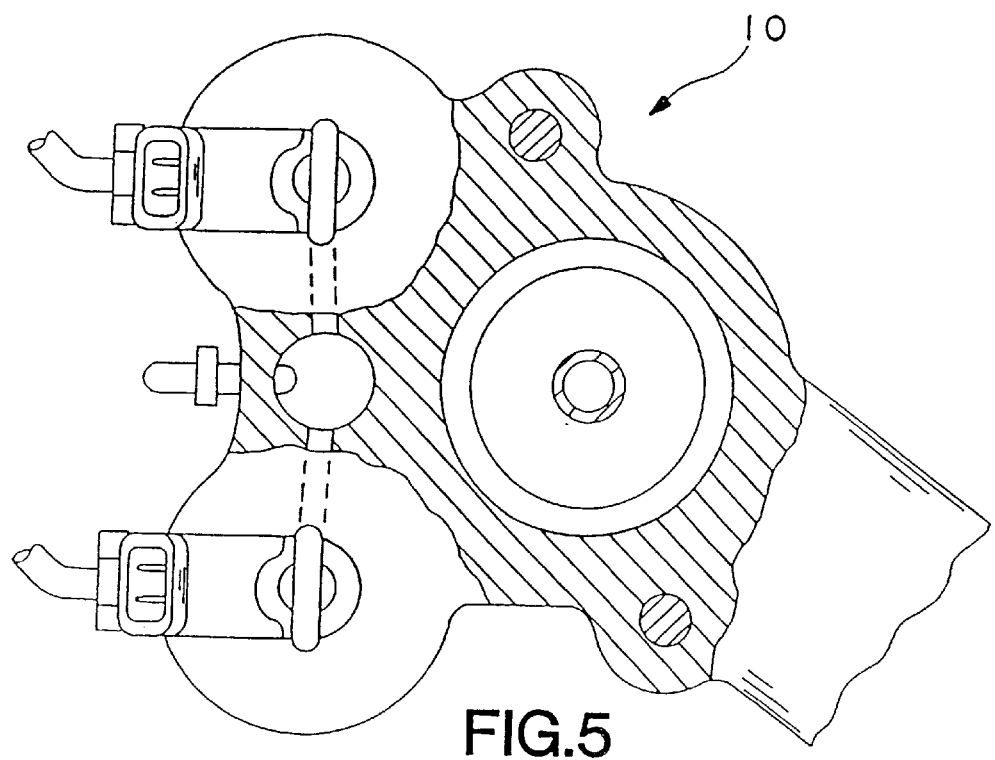
FIG. 5 is a horizontal sectional view of the valve in FIGS. 1 and 2, taken along line 5—5 in FIG. 2.

FIG. 5 is a horizontal sectional view of the EETC valve 10 in FIGS. 1 and 2, taken along line 5—5 in FIG. 2. This view shows more of the internal structure of the valve parts.

Figure 6:
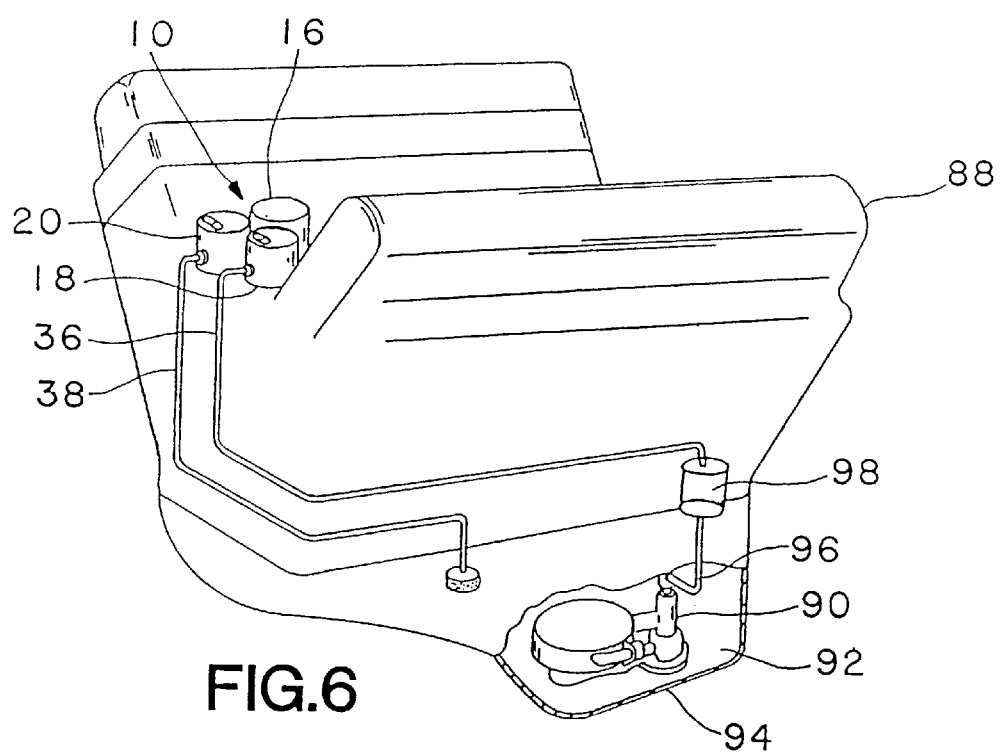
FIG. 6 is a diagrammatic view of the valve in FIG. 1 connected to parts of an engine.

FIG. 6 shows diagrammatically the preferred embodiment of how the EETC valve 10 connects to a source of hydraulic fluid. In this embodiment of the invention, the source of hydraulic fluid is engine lubrication oil. In FIG. 6, a portion of oil pan 94 is cut away to show engine lubrication oil pump 90 and engine lubrication oil reservoir 92 in oil pan 94. As is well known in the art, outlet 96 of the oil pump 90 feeds oil to practically all of the engine moving parts under pump pressure through distributing headers (not shown). To provide a source of pressurized hydraulic fluid to the inlet fluid injector 18, the fluid inlet tube 36 is connected to the oil pump outlet 96. An optional replaceable filter 98 may be placed in the pressurized oil line to ensure that the oil flowing to the valve 10 does not clog the injectors. To provide a return path for the hydraulic fluid exiting from the outlet fluid injector 20, the fluid outlet tube 38 is connected to the oil reservoir 92 in the oil pan 94.

Figure 7:
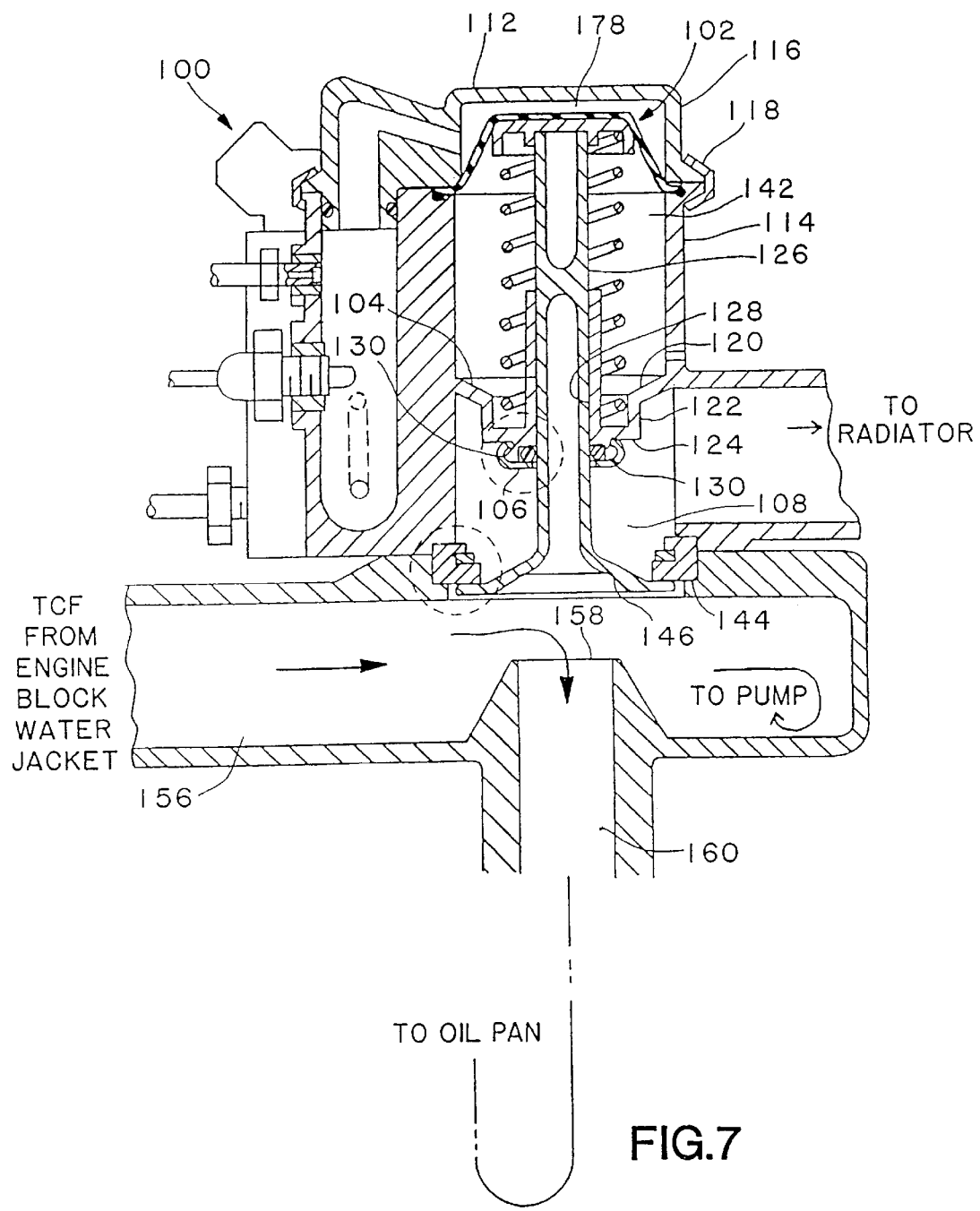
FIG. 7 is sectional side view of a preferred form of a multifunction valve which controls the flow of temperature control fluid to plural parts of an engine, shown in a first position.
Figure 8:
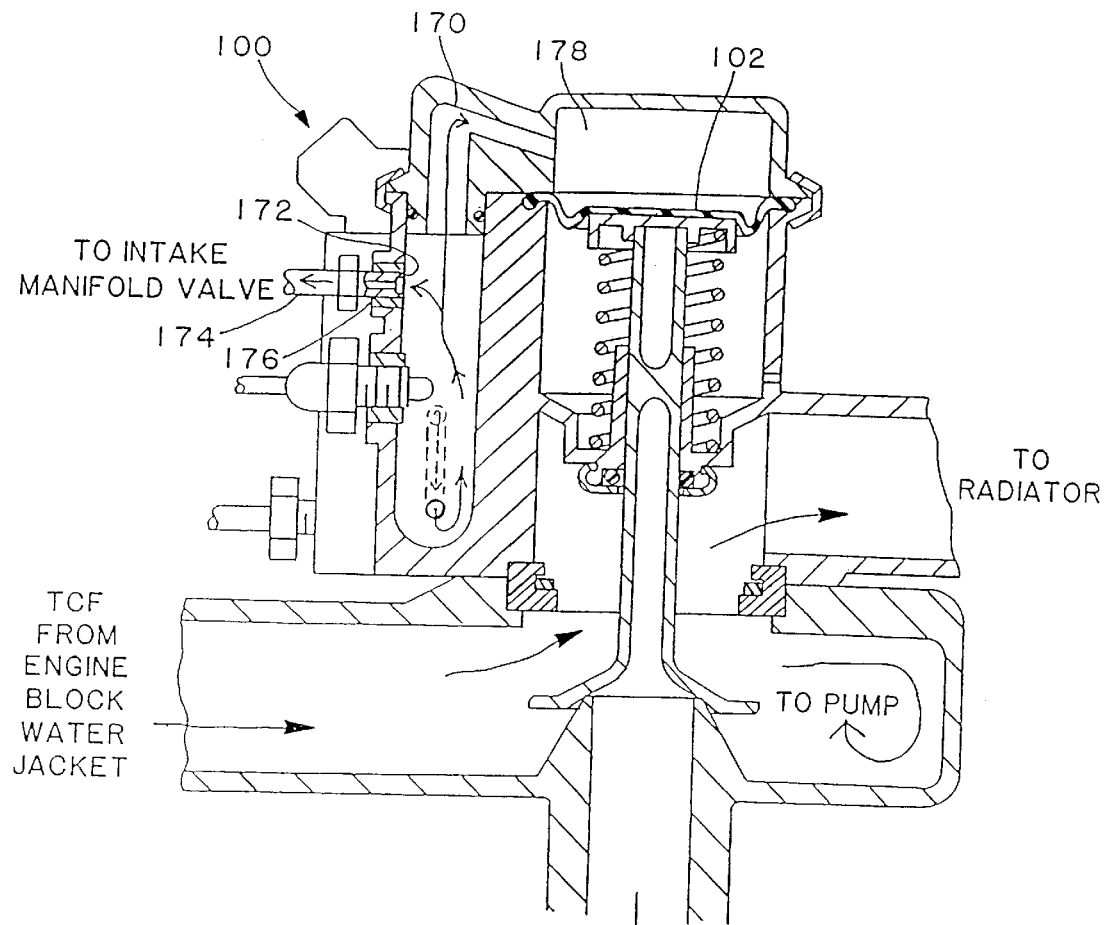
FIG. 8 is sectional side view of the multi-function valve of FIG. 7, shown in a second position.

FIGS. 7 and 8 show another preferred form of an EETC valve 100 which simultaneously controls the flow of TCF to plural parts of an engine. In a first embodiment, the EETC valve 100 controls fluid flow to the radiator and the oil pan. When the EETC valve 100 is in a first position, flow to the radiator is blocked and flow to the oil pan is permitted. When the EETC valve 100 is in a second position, flow to the radiator is permitted and flow to the oil pan is blocked. FIG. 7 shows the EETC valve 100 in the first position, whereas FIG. 8 shows the valve in the second position.

In a second embodiment, the EETC valve 100 controls fluid flow to the radiator, oil pan and a portion of the engine block water jacket. In this embodiment that portion of the water jacket comprises the portion around, for example, the intake manifold. When the EETC valve 100 is in a first position, flow to the radiator is blocked and flow to the oil pan and the intake manifold is permitted. When the EETC valve 100 is in a second position, flow to the radiator is permitted, flow to the oil pan is blocked, and flow to the intake manifold is either restricted or blocked. Again, FIG. 7 shows the EETC valve 100 in the first position, whereas FIG. 8 shows the valve in the second position. Alternately, the EETC valve can control fluid flow to the cylinder head, or water pump instead of, or in conjunction with, the intake manifold of the second embodiment.

The EETC valve 100 employs a diaphragm valve 102. The sectional view in FIG. 7 is slightly different than the section taken of EETC valve 10 through line 2—2 in FIG. 1 so as to show the TCF passage through the EETC valve 100. It should be noted that a top plan view of the EETC valve 100 will appear identical to EETC valve 10 shown in FIG. 1. Furthermore, the valve parts and housing of EETC valve 100 differ only slightly from the EETC valve 10. One difference between EETC valve 10 and EETC valve 100 lies in the shape of the housing body's dividing wall and collar attached thereto. In the embodiment of the invention shown in FIG. 7, dividing wall 104 has a unique shape to allow it to accept a unique stationary rod seal 106. The seal 106 performs a function similar to the O-ring 80 shown in FIG. 2. That is, the seal 106 prevents TCF in the valve's lower compartment 108 from leaking into the valve's lower chamber 142. The EETC valve 100 is similar to the EETC valve 10 in that its housing 112 includes a body 114 and a cover 116, held together by band clamp or crimp 118.

The dividing wall 104 in FIG. 7 is, preferably, defined by three integrally formed portions, a downwardly tapered portion 120 attached at one end to a sidewall of housing 112, a generally vertical portion 122 attached at one end to the other end of the tapered portion 120, and a generally horizontal portion 124 attached at one end to the other end of the generally vertical portion 122. The center of the dividing wall 104 has a circular bore to allow passage of reciprocating valve rod 126 therethrough, in the same manner as the valve rod in EETC valve 10. Thus, the generally horizontal portion 124 does not extend completely across the radius of the housing 112. A cylindrical collar 128 extends vertically upward from the other end of the horizontal portion 124 (i.e., from the inner edge of the dividing wall 104), thereby coinciding with the outer circumference of the circular bore. Unlike the collar 56 in diaphragm valve 40, the collar 128 does not extend downward from the dividing wall 104. Instead, the dividing wall 104 includes an integrally formed extension flange 130 which extends perpendicularly downward by a short distance from a center region of the horizontal portion 124. The unique stationary rod seal 106 is attached to a lower surface of the dividing wall 104 as best shown in FIG. 13A.

Figure 13A:
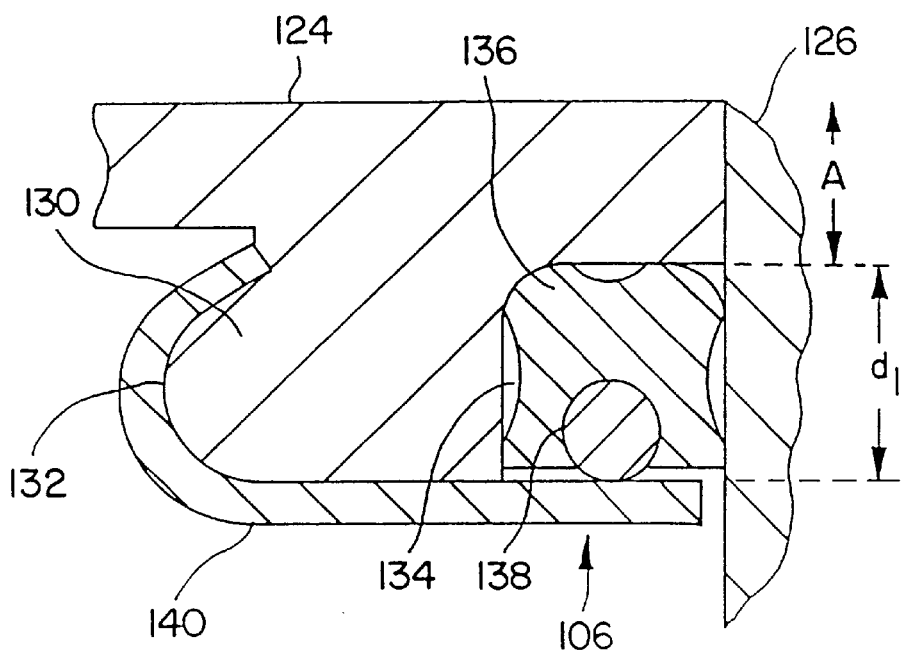
FIG. 13A is an enlarged view of a stationary rod seal employed in the embodiment of the invention shown in FIG. 7.

FIG. 13A shows an enlarged view of the circled dashed region in FIG. 7 associated with the stationary rod seal 106. Reciprocating valve rod 126 moves along axis A adjacent to the inner sidewall of the dividing wall's horizontal portion 124. The extension flange 130 includes a curved outer wall surface 132 and a generally planar inner wall surface 134. The extension flange 130 extends downward from the horizontal portion by a distance of about $d_1$. A cylindrical seal 136 having a generally rectangular vertical cross-section is fit into the space between the extension flange's inner wall surface 134 and the outer circumferential wall of the rod 126 (or the outer circumferential wall of the dividing wall's bore, if the rod 126 is not yet inserted into place). The seal 136 has a vertical width slightly less than $d_1$ so that the seal 136 lies approximately flush with a horizontal plane formed by the lower surface of the extension flange 130. The seal 136 also has a circular impression therein for accepting O-ring 138. Retention cup 140 is attached to the lower surface of the extension flange 130 and the seal 136. The outer edge of the cup 140 wraps around the curved outer wall surface 132 of the extension flange 130.

One suitable material for the retention cup 140 is a brass cup crimped over the curved outer wall surface 132. A suitable material for the seal 136 is a standard Vitron® material type POLYPAK® retention seal manufactured by Parker-Hannifin Corp., Cleveland, Ohio. A suitable rod 126 will have an outer diameter of about ⅜ inch. A stationary rod seal 106 constructed with those materials will withstand TCF pressures of at least 50 psi.

The stationary rod seal 106 inhibits debris which becomes lodged on the lower portion of the rod 126 from traveling up into the valve's lower chamber 142 when the rod 126 moves from the second position shown in FIG. 8 to the first position shown in FIG. 7. The stationary rod seal 106 effectively acts as a wiper, dislodging any such debris from the rod 126 and depositing in the valve's lower compartment 108 where it can be carried away by the TCF.

The dividing wall 104/stationary rod seal 106 feature in EETC valve 100 can replace the dividing wall/O-ring sealing structure in EETC valve 10.

Turning again to FIG. 7, the diaphragm valve 102 includes a reinforced gasket seal 144. The details of the gasket seal 144 are shown more clearly in FIG. 13B. The gasket seal 144 also functions as the valve seat for valve member 146.

Figure 13B:
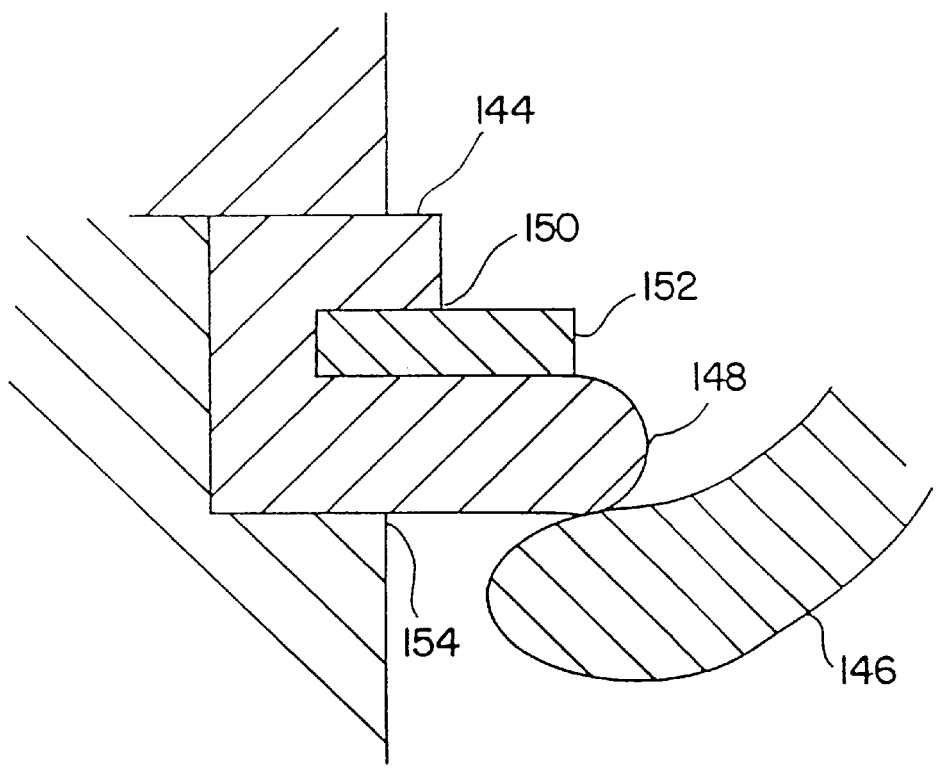
FIG. 13B is an enlarged view of a gasket seal employed in the embodiment of the invention shown in FIG. 7.

FIG. 13B shows an enlarged view of the circled dashed region in FIG. 7 associated with the gasket seal 144. The gasket seal 144 provides two functions. First, it functions as a sealing seat for the valve member 146. Second, it prevents the TCF from flowing into the valve's lower compartment 108 when the EETC valve 100 is in the first position.

The gasket seal 144 includes an elastomer material 148 having a cut-out 150. A washer 152, preferably of stainless steel, is snapped into the cut-out 150. The washer 152 limits the travel of the valve member 146 by strengthening and supporting the gasket seal 144, thereby increasing the integrity of the seal 144. If the cut-out 150 and washer 152 were not present, the valve member 146 would be more prone to push through the elastomer material 148 under high pressure conditions. To inhibit this from occurring, the inner diameter of the washer 152 is dimensioned to be smaller than the outer diameter of the bottom of the valve member 146. In an alternate embodiment, the gasket seal 144 is made entirely of metal material and functions to limit the travel of the valve member 146. Other seal configurations are also contemplated by the present invention.

The gasket seal 144 is pressed into a cut-out 154 in a wall of TCF passageway 156, although it may also be located in a cut-out of a wall of the valve's lower compartment 108. The cut-out 154 and the washer's cut-out 150 are dimensioned so that an outer diameter portion of the washer 152 recesses in the wall. This arrangement tightly traps the washer 152 into position.

As noted above, the first embodiment of the EETC valve 100 controls fluid flow to the radiator and the oil pan. This is accomplished by including an opening 158 in the TCF passageway 156 leading to an additional TCF passageway 160. The passageway opening 158 is positioned within the passageway 156 so that when the valve member 146 is in the first position (as shown in FIG. 7), the valve member 146 does not block the opening 158, thereby allowing flow of a portion of the fluid therethrough. When the valve member 146 is in the second position (as shown in FIG. 8), the valve member 146 becomes seated against the opening 158, thereby closing the opening 158, and thus preventing flow of any of the fluid therethrough.

The diaphragm valve 102 does not need to be modified to provide the additional control function associated with the fluid flow to the oil pan. It is only necessary to position the opening 158 so that the valve member 146 seats over it at the end of its stroke, as shown in FIG. 8.

FIG. 15 shows the preferred diaphragm 102 exploded from the housing body 114 and valve cover 116. The diaphragm 102 is formed from a flexible material which moves between the first position shown in FIG. 7 and the second position shown in FIG. 8 as hydraulic fluid fills into and empties from the diaphragm valve's upper chamber. The diaphragm 102 includes an integrally molded O-ring type flange 110 which extends downward from the outer circumference and seats into groove 162 formed in the upper edge of the body 114. The diaphragm also includes an integrally molded bead 164 on the top side of the flange 110. The preferred material for the diaphragm 102 is an elastomer 166, covered with fabric 168 on its lower surface. One suitable combination of elastomer and fabric is Viton® and Nomex®, both manufactured by E.I. Du Pont De Nemours & Co., Wilmington, Del. This type of diaphragm is designed by RPP Corporation, Lawrence, Md.

The size of the diaphragm 102 is determined by the dimensions of the EETC valve 100. In one embodiment of the invention wherein the EETC valve 100 is sized to replace a prior art wax pellet or bimetallic coil type thermostat, a suitable diaphragm 102 will have the following dimensions:

1. end-to-end diameter of about 1.87 inches;
2. top-to-bottom height of about 0.55 inches;
2. flange diameter and height of about 0.094 inches; and
3. bead 164 radius of about 0.015 inches.

A diaphragm 102 sized as such will fit into a cylinder bore having a diameter of about 1.43 inches and will accept an upper plate of a piston rod having a diameter of about 1.18 inches.

Since FIG. 15 shows the preferred embodiment of the housing body/diaphragm/valve cover subassembly, it should be understood that the equivalent subassembly in the EETC valve 10 also preferably employs this embodiment. The diaphragm in the EETC valve 10 has an integrally molded O-ring type flange which extends upward from the outer circumference and seats into a groove formed in the lower edge of the valve cover. The diaphragm in the EETC valve 10 is also preferably an elastomer, covered with fabric on its lower surface. The diaphragm in the EETC valve 10 does not include an integrally molded bead on an opposite side of the flange. Accordingly, it is easier and cheaper to manufacture.

The particular features of the diaphragm 102 and the manner in which it is assembled between the housing body 114 and valve cover 116 allows the diaphragm 102 to withstand larger pressures than the diaphragm of the EETC valve 10.

Figure 14A:
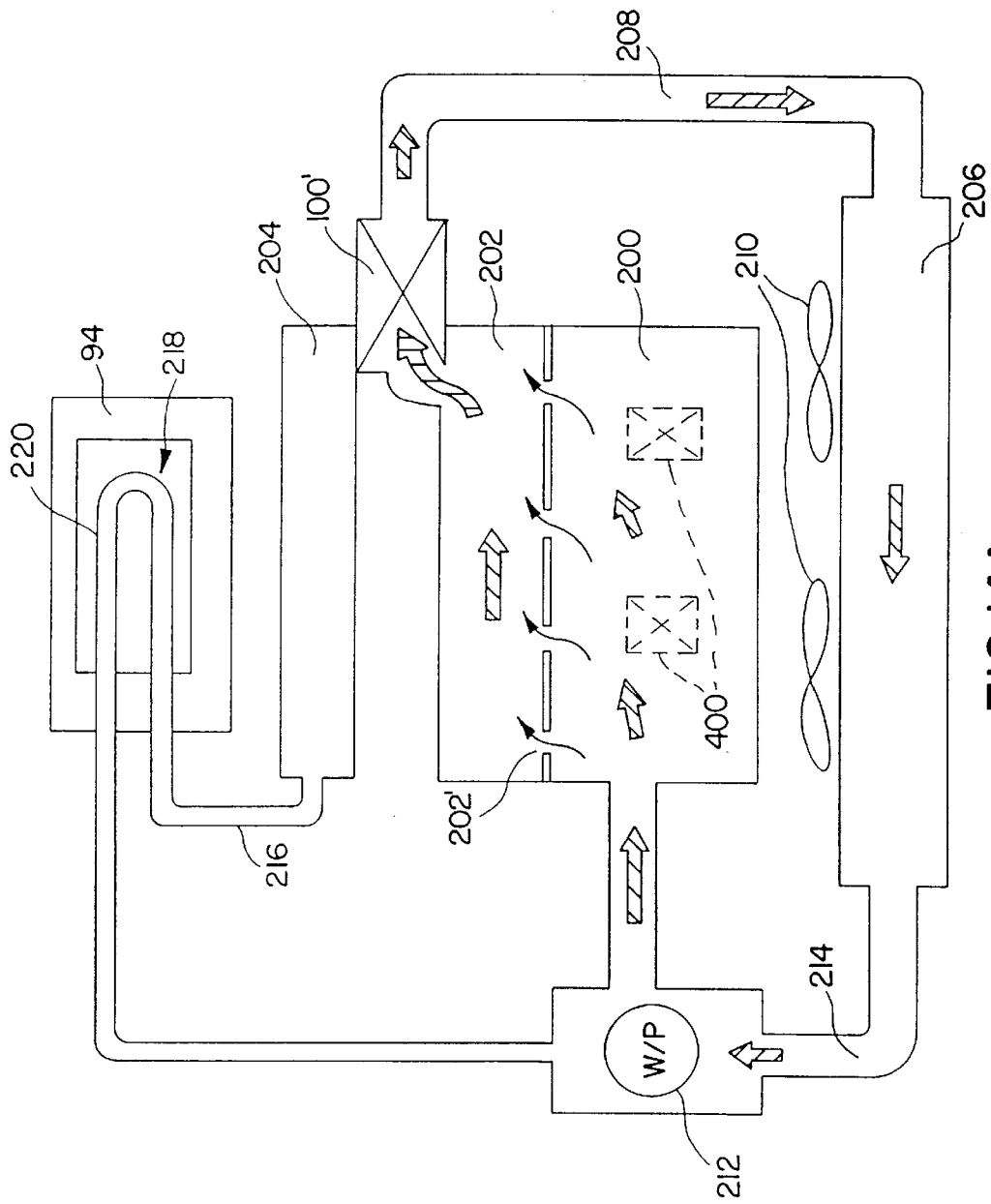
FIG. 14A is a diagrammatic illustration of one embodiment of the temperature control system according to the present invention employing the temperature control valve in a GM 3800 V6 transverse internal combustion engine during normal operation.

FIG. 14A diagrammatically shows one embodiment of the temperature control system according to the present invention in a GM 3800 V6 transverse internal combustion engine. The system includes a modified version of the multi-function EETC valve 100 of FIGS. 7 and 8, with fluid paths to the intake manifold and the oil pan. The fluid flow paths to and from the automobile heater are not shown in this simplified diagram. The system shown in FIG. 14A functions as follows.

When the diaphragm valve 102 is in the second position similar to that shown in FIG. 8 (i.e., open to TCF flowing to the radiator, closed to TCF flowing to the intake manifold/oil pan), the TCF enters a TCF jacket 200 formed in a cylinder block. From there, it is supplied to through passageways 202' to the cylinder head waterjacket 202. The TCF leaving the jackets 200 and 202 flows through the valve 102 of EETC valve 100 and is introduced to radiator 206 through radiator inlet passage 208. The TCF which enters the radiator 206 is cooled during its passage therethrough by air flow from cooling fan 210 located at the rear side of the radiator 206. The cooled TCF is supplied to a TCF pump 212 (e.g., a water pump) through the radiator outlet passage 214. The TCF supplied to the pump 212 is again circulated to the jackets 200 and 202.

Figure 14B:
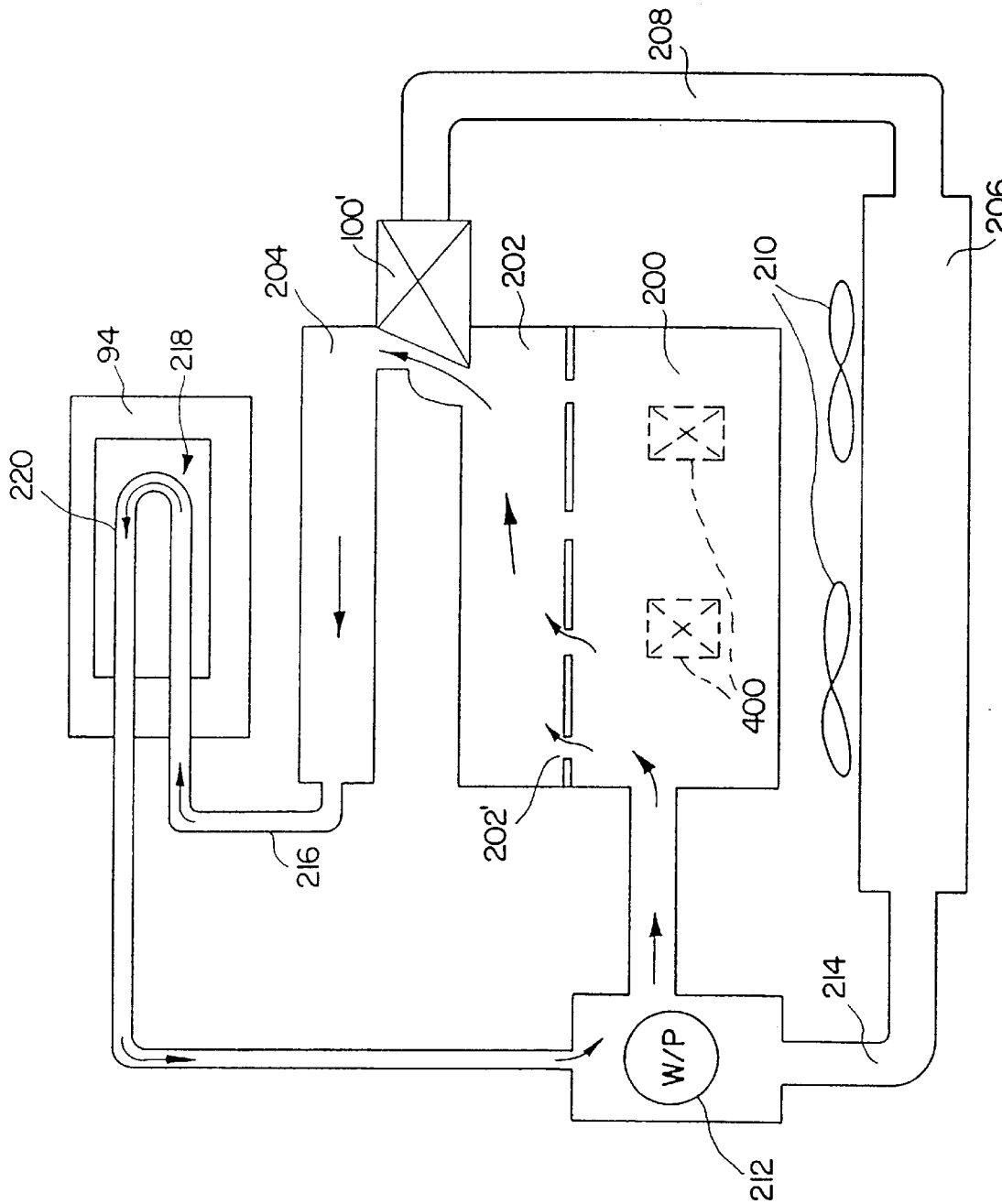
FIG. 14B is a diagrammatic illustration of the temperature control system of FIG. 14A during the warm-up phase.

FIG. 14B illustrates the temperature control system when the diaphragm valve 102 is in the first position, similar to that shown in FIG. 7 (i.e., closed to TCF flowing to the radiator, open to TCF flowing to the intake manifold/oil pan). In this embodiment, the restrictors 400 function to restrict and/or prevent the flow of the TCF from the engine block jacket 200 to the cylinder head 202. Therefore, only a small amount of the TCF entering jacket 200 is supplied to the cylinder head jacket 202 (indicated in the figures by the small arrows). The smaller mass of TCF in the cylinder head will, accordingly, heat up quickly. Meanwhile the restricted mass of TCF in the block waterjacket 200 operates as an insulator to prevent heat loss. The TCF leaving the cylinder head jacket 202 is prevented from entering the radiator inlet passage 208 by EETC valve 100. Hence, the TCF bypasses the radiator 206 and enters the intake manifold jacket 204. From the intake manifold jacket 204, the TCF flows to the oil pan 94 through bypass passageway 216 and into heat exchanger 218. The heat exchanger 218 preferably comprises a U-shaped heat conductive tube 220 which allows heat from the TCF to pass into the oil in the oil pan 94. Other tubing shapes are also suitable. The TCF exiting the heat exchanger 218 flows back into the pump 212 for recirculation into the engine block.

In cold temperature environments, or when an engine is first warmed up, the engine lubrication oil should be heated to its normal operating temperature as rapidly as possible, and maintained at that temperature. In prior art engine cooling systems, engine coolant is not employed to assist in this goal. To the contrary, prior art systems work against this goal by immediately circulating coolant through the jacket and removing heat from the engine block, and, thus, from the engine oil, inhibiting it from reaching its optimum temperature as quickly as possible.

The present invention helps to achieve that goal by circulating a portion of the TCF through the oil pan 94. Since the diaphragm valve 102 is likely to be in the first position shown in FIG. 7 when the engine is in cold temperature environments, or when it is first warmed up, the oil in the oil pan 94 will receive warm or hot TCF when it needs it the most. The heat energy transferred from the warm or hot TCF into the oil allows the oil to more quickly reach its ideal operating temperature. In effect, the TCF diverted to the oil pan 94 recaptures some of the parasitic engine heat loss caused by circulation of the TCF.

The inventive system described herein allows the engine oil to capture some of the heat energy in the TCF after the engine is turned off. In contrast, the heat energy in the coolant of prior art cooling systems is wasted by being passed into the environment. Since the valve 102, in the present invention, will always be in the first position after engine cooldown, heat energy can pass by convection through the passageway 216 and into the oil pan 94. If the ambient air temperature is very cold, the valve 102 may even remain in the first position during and after engine operation. Thus, convective heating of the engine oil will continue after the engine is turned off. The mass of hot TCF has the potential to keep the engine oil warm longer after engine shut-off. As a result, the present invention provides substantial benefits in situations where an engine is subject to frequent on/off cycles, e.g., delivery vehicles.

Figure 14D:
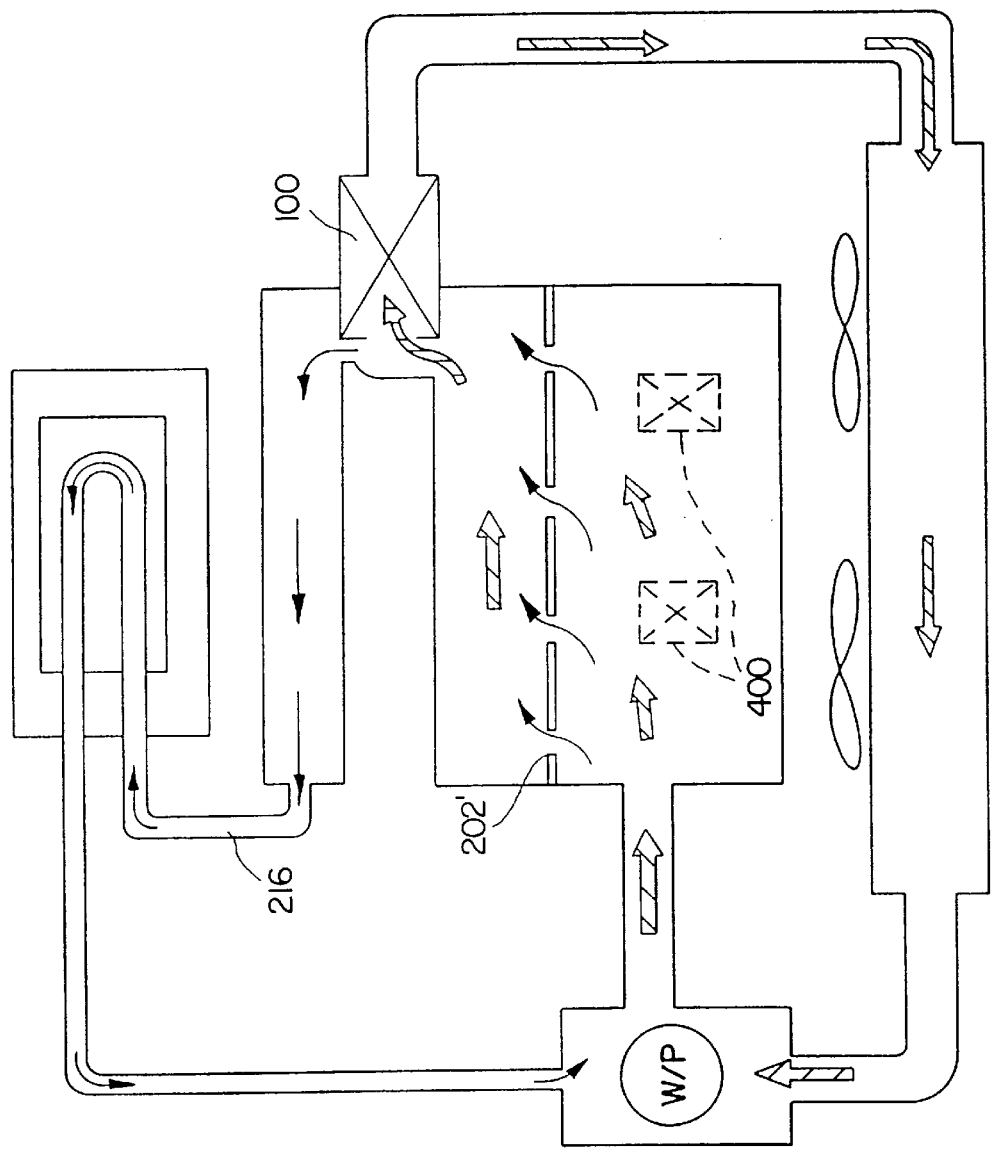
FIG. 14D is a diagrammatic illustration of the second embodiment of the temperature control system of FIG. 14C during normal operation showing part of the TCF flowing to the radiator and part flowing through the intake manifold and the oil pan.

As noted above, the EETC valve 100 may operate in alternate embodiments. For example, a second embodiment incorporates the EETC valve 100 to physically control fluid flow through the radiator. As a consequence of inhibiting and permitting the flow to the radiator, the flow through the intake manifold and oil pan is controlled. This is diagrammatically shown in FIGS. 14C and 14D and operates as follows. When the EETC valve 100 is in a first position, flow to the radiator is blocked and flow through the oil pan and through the intake manifold is permitted (e.g., engine warm-up phase). When the EETC valve 100 is in a second position (FIG. 14D), flow to the radiator is permitted. The flow to intake manifold and oil pan is not physically restricted, but the pressure from the water pump will cause a significant amount of the TCF to flow through the radiator with a minimal amount flowing through the intake manifold and the oil pan.

Figure 14E:
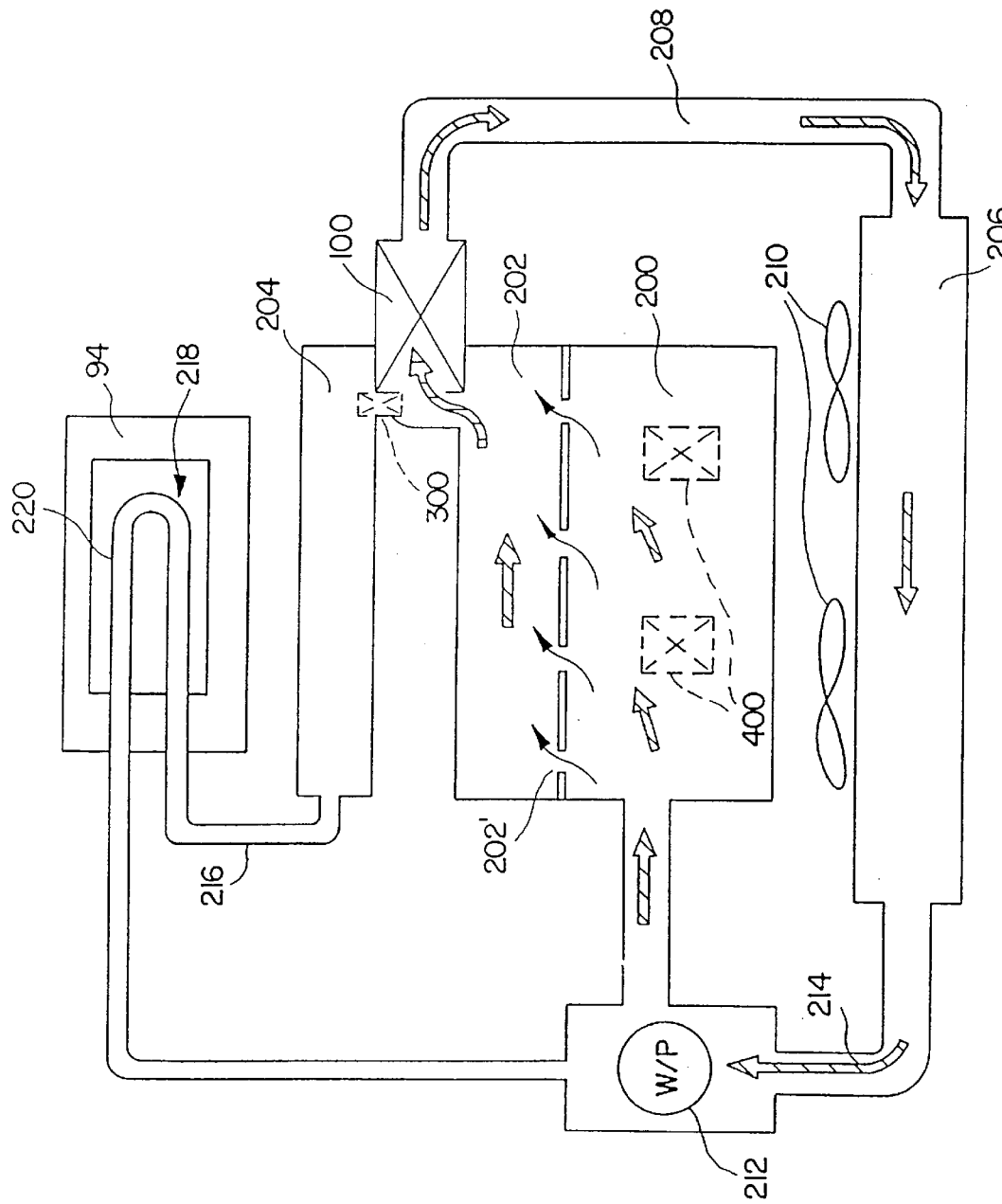
FIG. 14E is a diagrammatic illustration of a third embodiment of the temperature control system of the present invention employing a remote shut-off valve (as shown in FIGS. 8 and 33) in a GM 3800 V6 transverse internal combustion engine during normal operation.
Figure 14F:
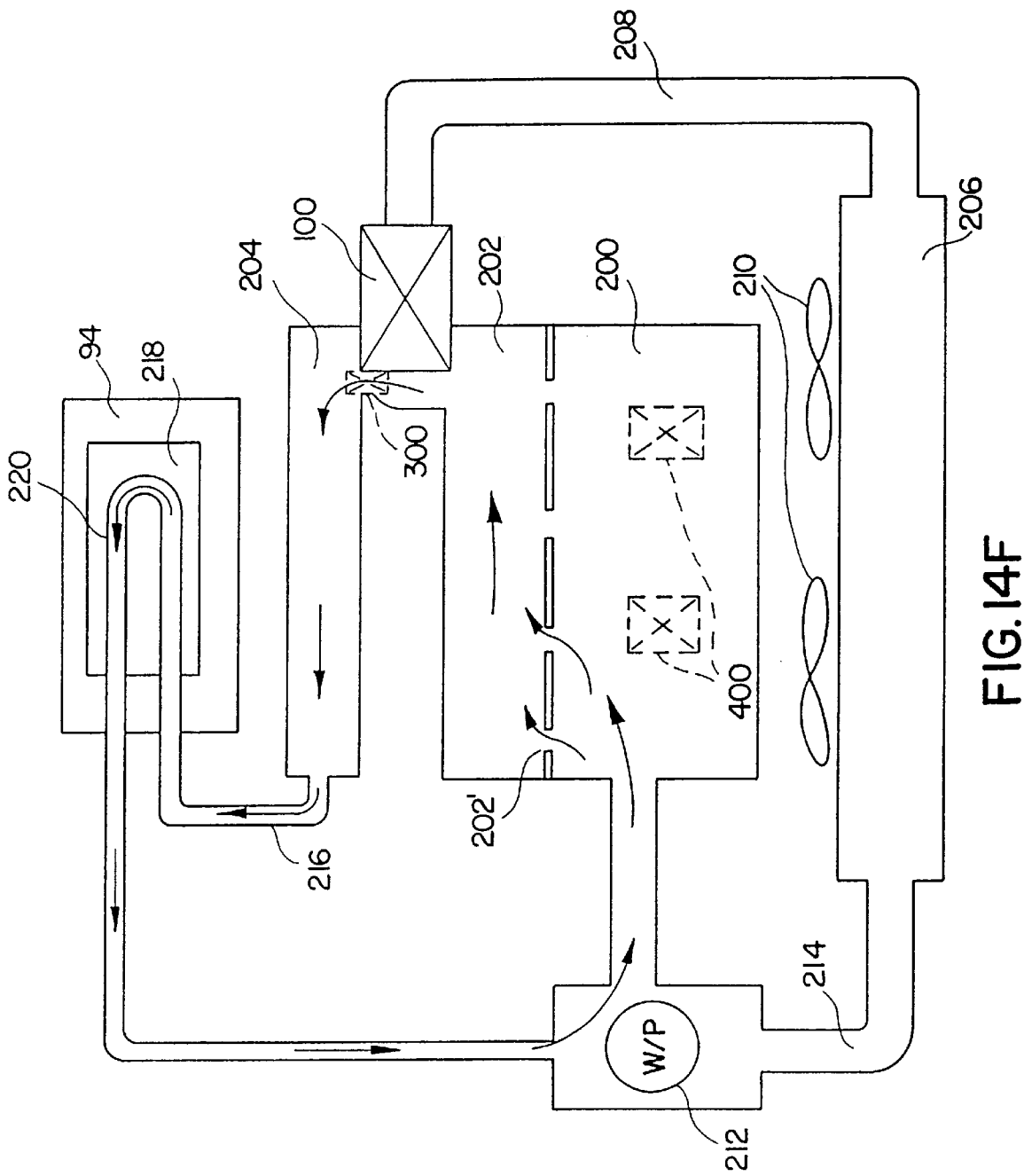
FIG. 14F is a diagrammatic illustration of the third embodiment of the temperature control system of FIG. 14E during normal operation showing the TCF flowing to the radiator.

A third embodiment of the temperature control system is shown in FIGS. 14E and 14F. Operation of this embodiment of the EETC valve 100 is best understood in conjunction with FIG. 8. The valve's hydraulic fluid passageway 170 includes opening 172 leading to fluid outlet tube 174 through housing insert 176, preferably a brass fitting. The outlet tube 174 is, preferably, connected to an remotely located intake manifold flow control valve. This valve is not shown in FIG. 8, but is labelled in FIG. 14E as valve 300. The valve 300 controls the flow of fluid through the intake manifold jacket 204 which surrounds the intake manifold (not shown). For the purposes herein, the valve 300 can be any valve which is moved from a first position to a second position by hydraulic fluid pressure applied to a valve chamber, wherein the first position is associated with unrestricted fluid flow through an associated passageway and the second position is associated with either restricted or blocked flow through the passageway. One example of a valve 300 suitable for this purpose is described in FIGS. 33–39 of this disclosure. However, the valve 300 can comprise any type of hydraulically fluid actuated valve such as a piston valve, diaphragm valve or the like. Furthermore, while the preferred valve is actuated by hydraulic pressure, other actuation mechanisms are well within the scope of this invention. The valve is shown positioned in close proximity to the EETC valve 100 for the sake of convenience. It should be well understood that the valve 300 may be placed at any suitable location for restricting and/or blocking flow into the intake manifold jacket 204.

When it is desired to move the diaphragm valve 102 into the second position shown in FIG. 8, pressurized hydraulic fluid flows through the passageway 170 into upper chamber 178. Simultaneously, a portion of the hydraulic fluid flows through the opening 172, into the fluid outlet tube 174 and into the chamber (not shown) of the intake manifold flow control valve 300. The pressurized fluid in this chamber causes the valve 300 to move from the first position (unrestricted flow) to the second position (restricted or blocked flow).

When it is desired to move the diaphragm valve 102 back into the first position shown in FIG. 7, the hydraulic fluid in the upper chamber 178 flows out through an outlet hydraulic fluid injector in the same manner as described with respect to FIGS. 2–5. Likewise, the hydraulic fluid in the chamber of the valve 300 flows back into the EETC valve 100 and out through the outlet hydraulic fluid injector. In this manner, the state of the EETC valve 100 determines the state of the valve 300.

The purpose of this control scheme is to reduce the amount of heat energy flowing through the intake manifold when the engine is hot. In a typical internal combustion engine, the intake manifold has an ideal temperature of about 120 degrees Fahrenheit. In such engines, there is no significant advantage in heating the intake manifold to temperatures higher than about 130 degrees Fahrenheit. In fact, extremely hot intake manifold temperatures reduce combustion efficiency. This is due to the fact that air expands as it is heated. Consequently, as the air volume expands, the number of oxygen molecules per unit volume decreases. Since combustion requires oxygen, reducing the amount of oxygen molecules in a given volume decreases combustion efficiency. Prior art cooling jackets typically deliver coolant through the intake manifold at all times. When an engine is running hot, the coolant temperature is typically in a range from about 220 to about 260 degrees Fahrenheit. Thus, the coolant may be significantly hotter than the ideal temperature of the intake manifold. Nevertheless, the prior art cooling system will continue to deliver hot coolant through the intake manifold, thereby maintaining the intake manifold temperature in an excessively high range.

The second embodiment of the invention described herein employs the EETC valve 100 to restrict or block the flow of TCF through the intake manifold, thereby avoiding the unwanted condition described above. When the EETC valve 100 is in the first position shown in FIG. 7, it is likely that the temperature of the TCF is below that which would cause the intake manifold to exceed its ideal operating temperature. Thus, when the EETC valve 100 is in the first position, flow of TCF through the intake manifold is permitted. The intake manifold flow control valve scheme can also be employed with the EETC valve 10 shown in FIGS. 2–5. This scheme functions with or without the modification to the temperature control fluid passageway for diverting the fluid to the oil pan.

The valve 300 may, instead, be mounted at the end of the intake manifold jacket 204 (not shown in the figures), thereby "dead heading" the flow of fluid through the jacket 204. "Dead heading" is used herein to describe the state whereby the flow of fluid is blocked but the fluid still remains in the water jacket passage due to the continuous pumping of fluid by the engine's water pump. "Restricting" is used herein to describe the state whereby the flow of fluid is partially blocked but a portion of the fluid still flows in the water jacket passage due to the continuous pumping of fluid by the engine's water pump. Since heat energy is primarily transferred to and from the engine block by the flow of fluid, dead heading the flow will have almost the same effect as shutting off the flow. This is due, in part, to the cooling effect provided by the air passing through the intake manifold, which operates to extract the heat from the "stagnant" TCF in the water jacket of the intake manifold. A minimum amount of convective fluid heat flow will still occur between the intake manifold jacket 204 and the cylinder head and block jackets 200 and 202 in this configuration, since the channels between the cylinder head and the intake manifold are still open. However, it is more preferable to place the valve 300 in the passageway leading to the beginning of the intake manifold jacket 204 (shown in FIGS. 14E and 14F), thereby preventing both fluid flow through the intake manifold jacket 204 and convective fluid heat flow between the jacket 204 and the jackets 200 and 202.

The configuration in FIGS. 14A through 14F wherein the EETC valve 100 controls fluid flow to the radiator, oil pan and a portion of the engine block water jacket (e.g., the portion around the intake manifold) produces a highly effective engine temperature control system in a wide range of ambient temperature conditions, as well as during engine warm up. In cold temperature environments and during warm up, the EETC valve 100 allows flow of the TCF to the oil pan and the intake manifold, thereby causing the engine oil and intake manifold to more rapidly reach their ideal operating temperatures. Once the engine is sufficiently warmed up, or when the engine is operating in very hot ambient air temperatures, the EETC valve 100 shuts off flow of the TCF to both the oil pan and the intake manifold since neither the oil, nor the intake manifold need additional heat energy under either of those conditions.

The EETC valve 100 can also control the flow of the TCF to portions of the engine block water jacket other than the portion around the intake manifold. The valve 300 shown in FIGS. 14E and 14F can, alternatively, be placed to block or restrict flow through portions of the cylinder block jacket 200 or the cylinder head jacket 202. In another embodiment, a plurality of water jacket blocking/restricting valves can be simultaneously controlled from the hydraulic fluid system of the diaphragm valve 102. FIGS. 14A through 14F show such additional valves 400 in phantom. FIG. 14F illustrates the restricting/shutting off of some of the channels 202' between the engine block 200 and the cylinder head jacket 202.

The alternate embodiments shown in FIGS. 14A through 14F illustrate the use of restrictor/shut-off valves to prevent or reduce the passage of fluid to a portion of the cylinder head and/or the intake manifold. As. stated above, these configurations are beneficial when the engine is cold, such as during start-up, since they heat the oil to its optimum operating temperature as soon as possible Although constant circulation of the TCF fluid through the engine, without including the radiator, will eventually heat up the engine oil, doing so will take considerably longer than desired. Accordingly, in these embodiments, the heat from the cylinder head and/or the intake manifold is channeled to the engine oil to heat it up directly. The EETC valve in these embodiments would, preferably, be similar to the valve depicted in FIG. 43. However, the flow would be directed to the intake manifold before proceeding to the oil pan.

The passageways controlled and the locations of the EETC and restrictor/shut-off valves will, of course, vary depending on the configuration of the engine chosen. Those skilled in the art, upon reading this disclosure, will be readily capable of varying the disclosed preferred embodiments without departing from the scope of the invention.

Figure 40:
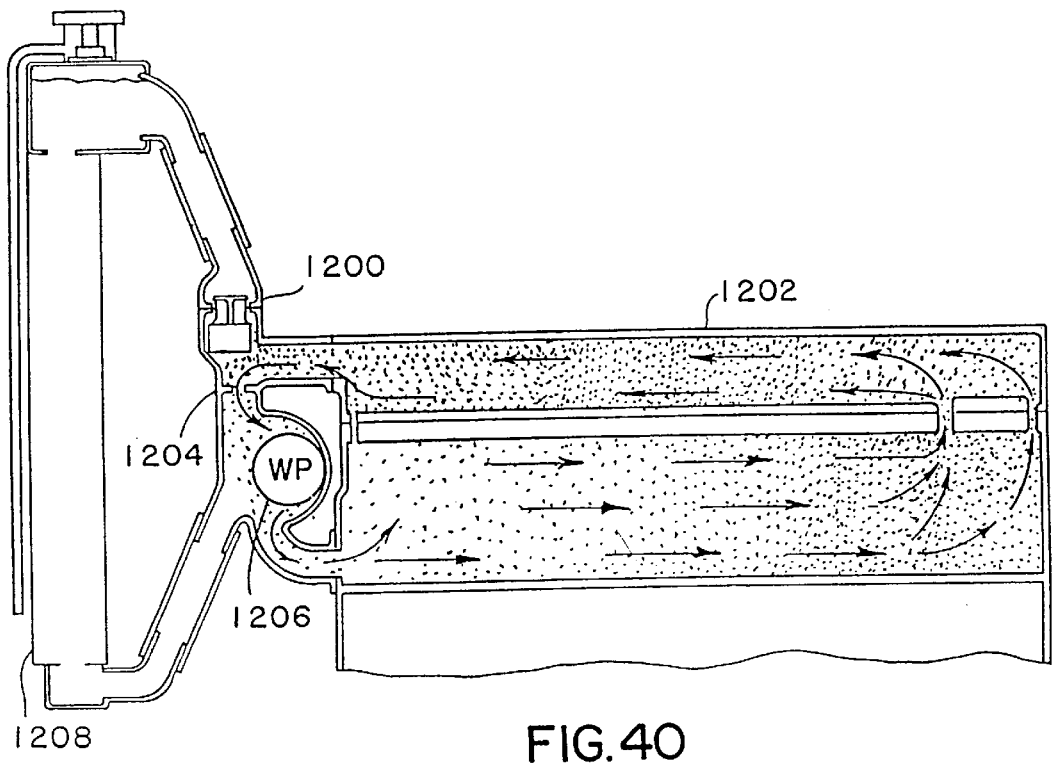
FIG. 40 is a diagrammatic view of the coolant circulation flow path through a prior art engine when a thermostat is closed.
Figure 41:
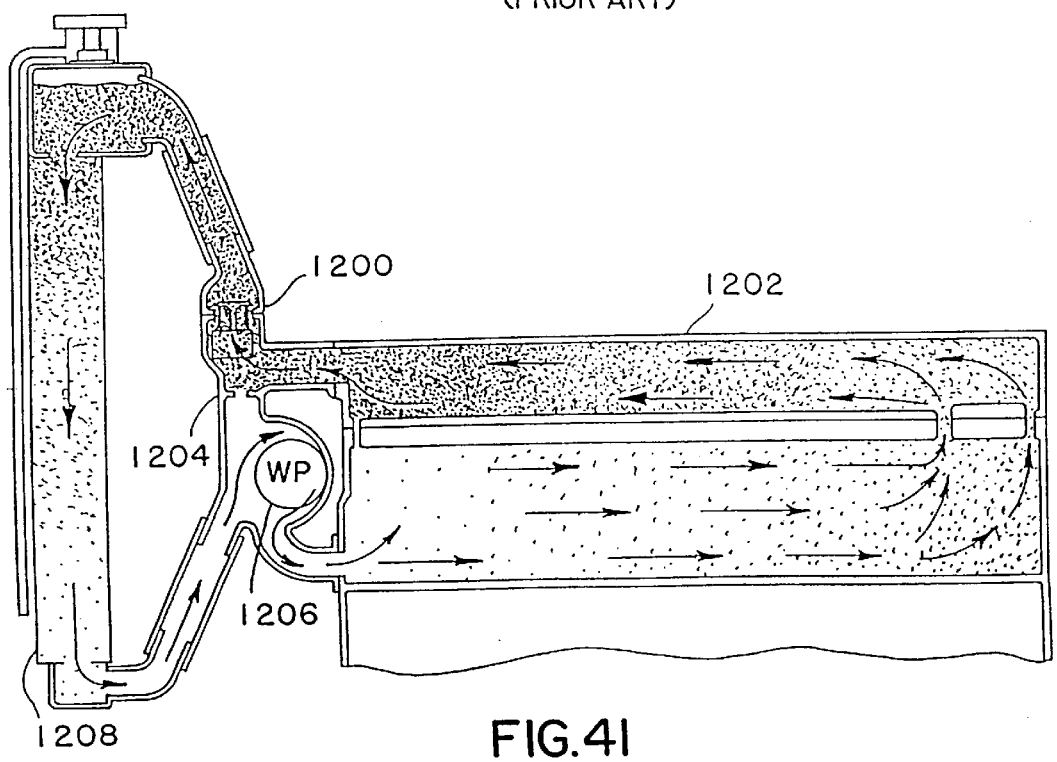
FIG. 41 is an idealized diagrammatic view of the coolant circulation flow path through a prior art engine when a thermostat is open.

The EETC valve 100 can also be employed to address a design compromise inherent in prior art engine cooling systems employing prior art thermostats. Prior art FIGS. 40 and 41 show a simplified diagrammatical representation of coolant circulation flow paths through such an engine. The coolant temperature is represented by stippling densities, hot coolant having the greatest density and cold coolant having the smallest density. FIG. 40 shows that when thermostat 1200 is closed, the coolant that exits water jacket 1202 flows through orifice 1204, into the intake side of water pump 1206, and then back to the water jacket 1202. Thus, the coolant circulates entirely within the engine water jacket 1202, avoiding radiator 1208. FIG. 41 shows that when the thermostat 1200 is open, all of the coolant circulates through the radiator 1208, into the intake side of the water pump 1206, and then back to the water jacket 1202.

FIG. 41 is an idealized diagram of coolant flow. Since fluid takes the path of least resistance, most of the coolant will flow through the larger opening associated with the thermostat 1200, as opposed to the more restrictive orifice 1204. However, a small amount of coolant still passes through the orifice 1204 and into the intake side of the water pump 1206, as shown in prior art FIG. 42. Since this small amount of coolant is not cooled by the radiator 1208, it raises the overall temperature of the coolant reentering the water jacket to a level higher than is desired.

To minimize this problem, the opening associated with the thermostat 1200 is made as large as possible and the orifice 1204 is made as small as possible. However, if the orifice 1204 is made too small, circulation through the water jacket 1202 will be severely restricted when the thermostat 1200 is closed. This may potentially cause premature overheating of portions of the engine block and will reduce the amount of heat energy available for the heater and intake manifold during engine start-up and in cold temperature environments. If the orifice 1204 is made too large, the percentage of coolant flowing therethrough will be large when the thermostat 1200 is open. Accordingly, the average temperature of the coolant returning to the water jacket 1202 will be too hot to properly cool the engine.

Thus, prior art engine cooling systems must always attempt to strike the proper balance between extremes when sizing the orifice 1204, thereby resulting in a compromised, but never idealized, size. In an idealized system, the orifice 1204 is open and large when the thermostat 1200 is closed, and is closed when the thermostat 1200 is open.

Figure 43:
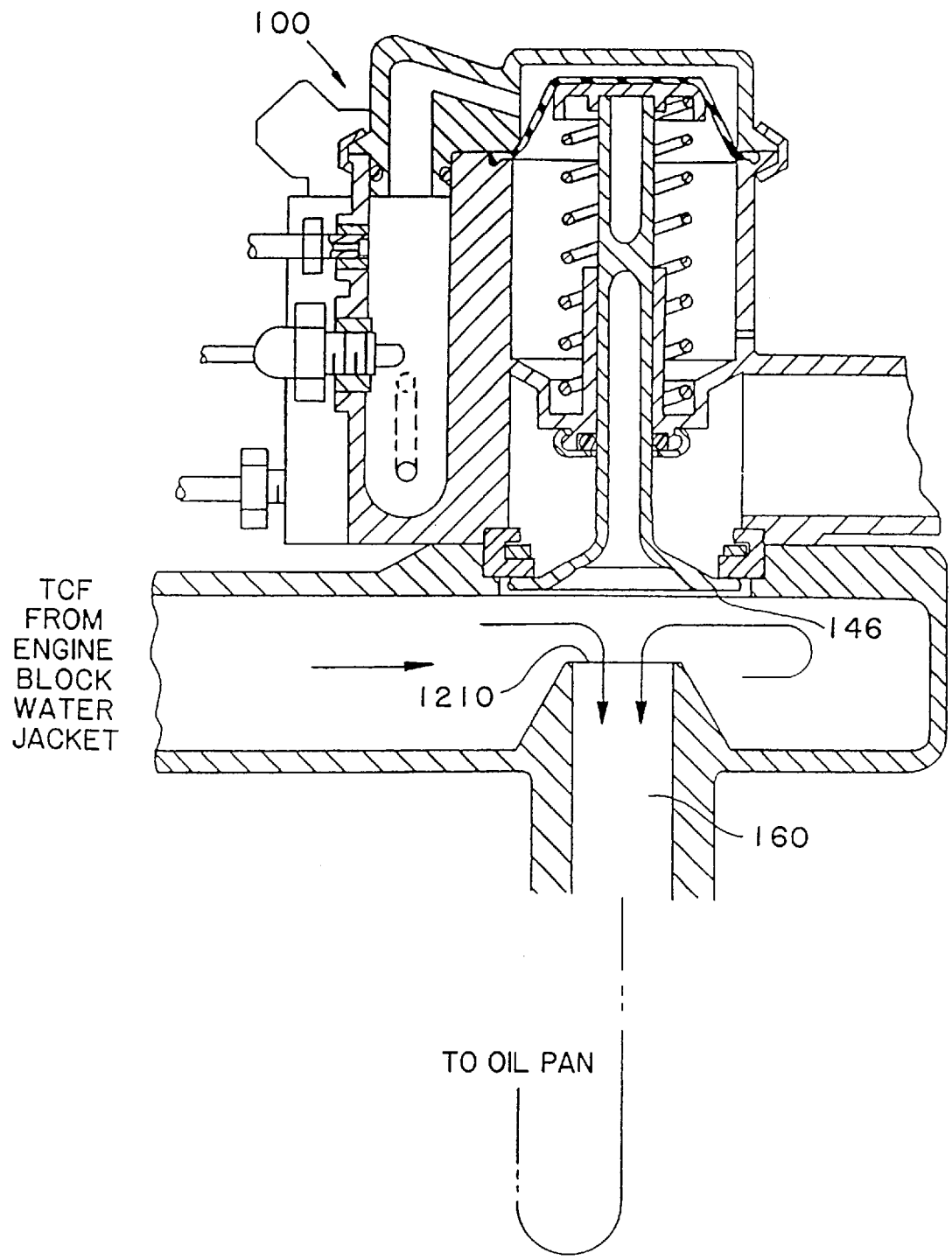
FIG. 43 is a sectional side view of a preferred form of a multifunction valve which controls the flow of temperature control fluid to plural parts of an engine.

FIG. 43 shows how the EETC valve 100 can be employed to create this idealized system. FIG. 43 is similar to FIGS. 7 and 8, except that the opening 158 shown in FIGS. 7 and 8 is an orifice 1210 and this orifice 1210 is the only fluid flow path for the TCF when the EETC valve 100 is in the first position shown in FIG. 7. That is, there is no alternative path to the water pump when the EETC valve 100 is in the first position which corresponds to the embodiments illustrated FIGS. 14A through 14F. This is in contrast to the system in FIG. 7 wherein a portion of the TCF flows through the opening 158 and into the passageway 160, and the remaining portion of the TCF flows to the water pump.

Figure 42:
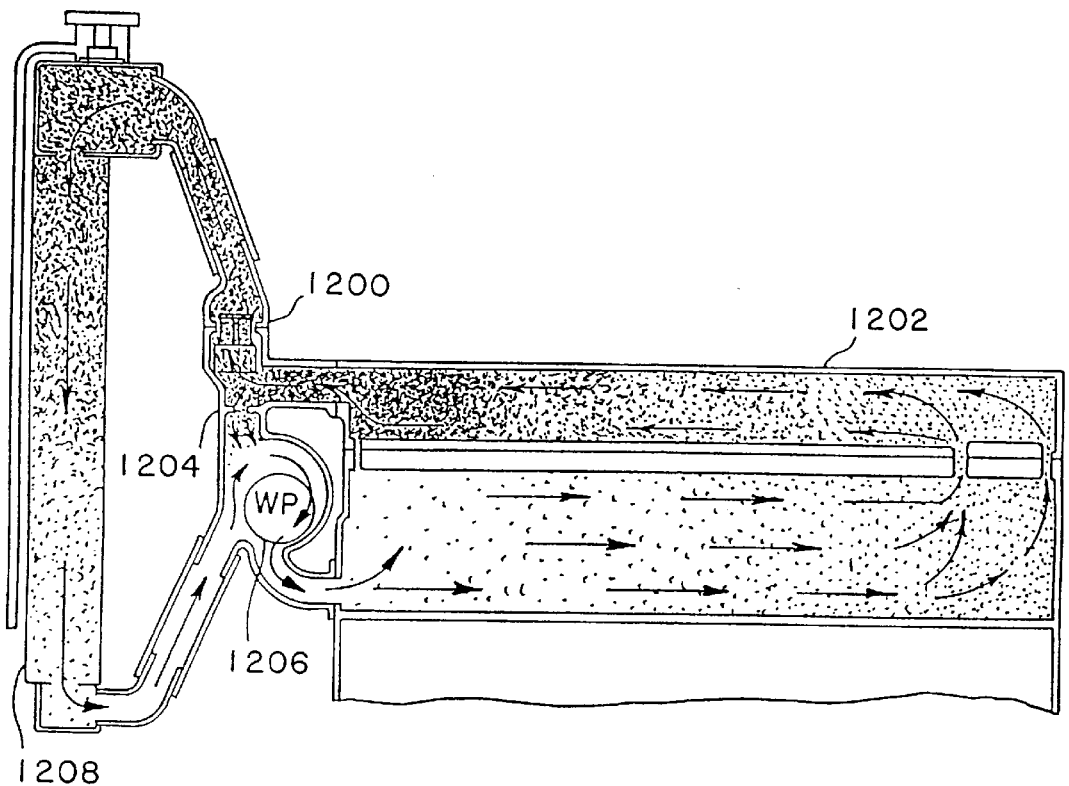
FIG. 42 is an actual diagrammatic view of the coolant circulation flow path through a prior art engine when a thermostat is open.

Since the orifice 1204 shown in FIGS. 40–42 merely functions as a path for coolant to return to the water pump 1206 for recirculation through the water jacket 1202, the system in FIG. 43 takes advantage of this already existing return path (shown in FIG. 18) to achieve the same function.

Figure 18:
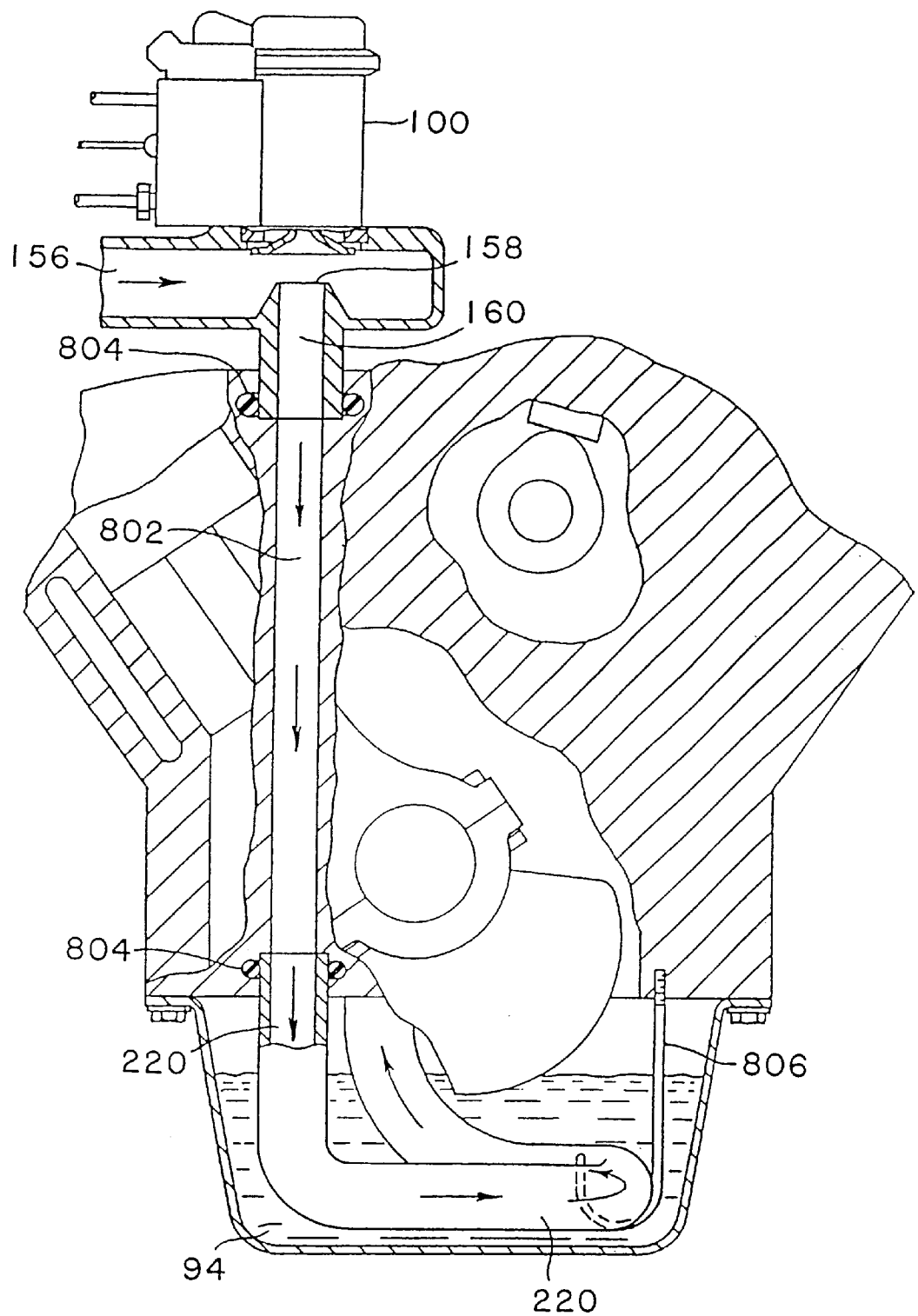
FIG. 18 is a diagrammatic sectional view of an engine block showing a temperature control fluid passageway through the engine block to an oil pan, for use with the valve shown in FIG. 7.

The orifice 1210 can be sized as large as allowed by the valve member 146, and thus need not be restricted in size by the constraints described above with respect to the prior art engine cooling systems. The TCF flowing through the orifice 1210 travels through the passageway 160 and follows the same path as shown in FIG. 18. When the EETC valve 100 in the configuration shown in FIG. 43 is in the second position (not shown, but similar to FIG. 8), no TCF can flow through the orifice 1210, thereby achieving the idealized "no flow" state unattainable in the prior art system described above.

The EETC valve 100 can also be employed in an anticipatory mode to address one problem in prior art engine cooling systems, specifically, the problem of sudden engine block temperature peaks caused when a turbocharger or supercharger is activated. These sudden peaks, in turn, may cause a rapid rise in coolant temperature and engine oil temperature to levels which exceed the ideal range. Since prior art cooling systems typically cannot shut off flow of coolant to the intake manifold, the rise in engine block temperature causes even more unnecessary heat energy to flow around the already overheated intake manifold. Furthermore, if the engine is still warming up, the prior art wax pellet type thermostat might not even be open. The thermostat might also be closed even if the coolant temperature has reached the range in which it should open, due to hysteresis associated with melting of the wax.

The invention herein can employ the EETC valve 100 to lessen the temperature rise effects of the turbocharger or supercharger. When the turbocharger or supercharger is activated, a signal can be immediately delivered to the EETC valve 100 to cause it to move into its second position, as shown in FIG. 8, if it is already not in that position. This will stop the flow of TCF to the engine oil and through the intake manifold, in anticipation of a rapid temperature rise in the oil and the intake manifold due to the action of the turbocharger or supercharger. Likewise, the flow of TCF through the radiator will lessen any peaking of the engine block temperature. A short time after the turbocharger or supercharger is deactivated, the EETC valve can then be returned to the state dictated by the ECU.

Although the preferred embodiment of the invention employs a diaphragm valve in valves 10 and 100, other types of hydraulically activated chamber-type valves can be employed in place of the diaphragm valve. One particularly suitable type of valve is a piston valve having a piston head which reciprocates within the bore of a piston housing, wherein the piston head includes a piston shaft and a cup.

Figure 9:
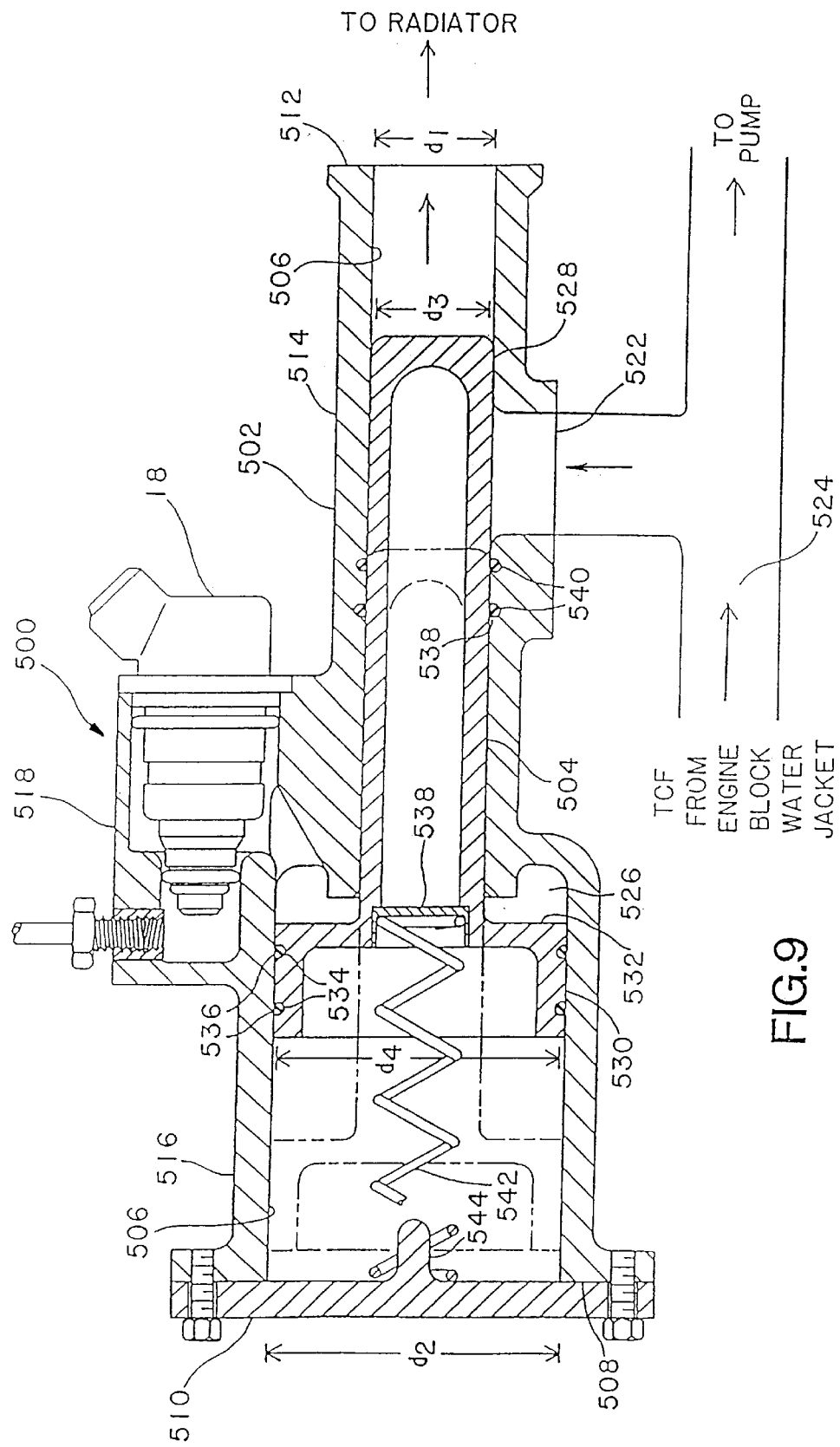
FIG. 9 is a sectional side view of a piston type hydraulically operated electronic engine temperature control valve for controlling the flow of temperature control fluid in an engine.
Figure 10:
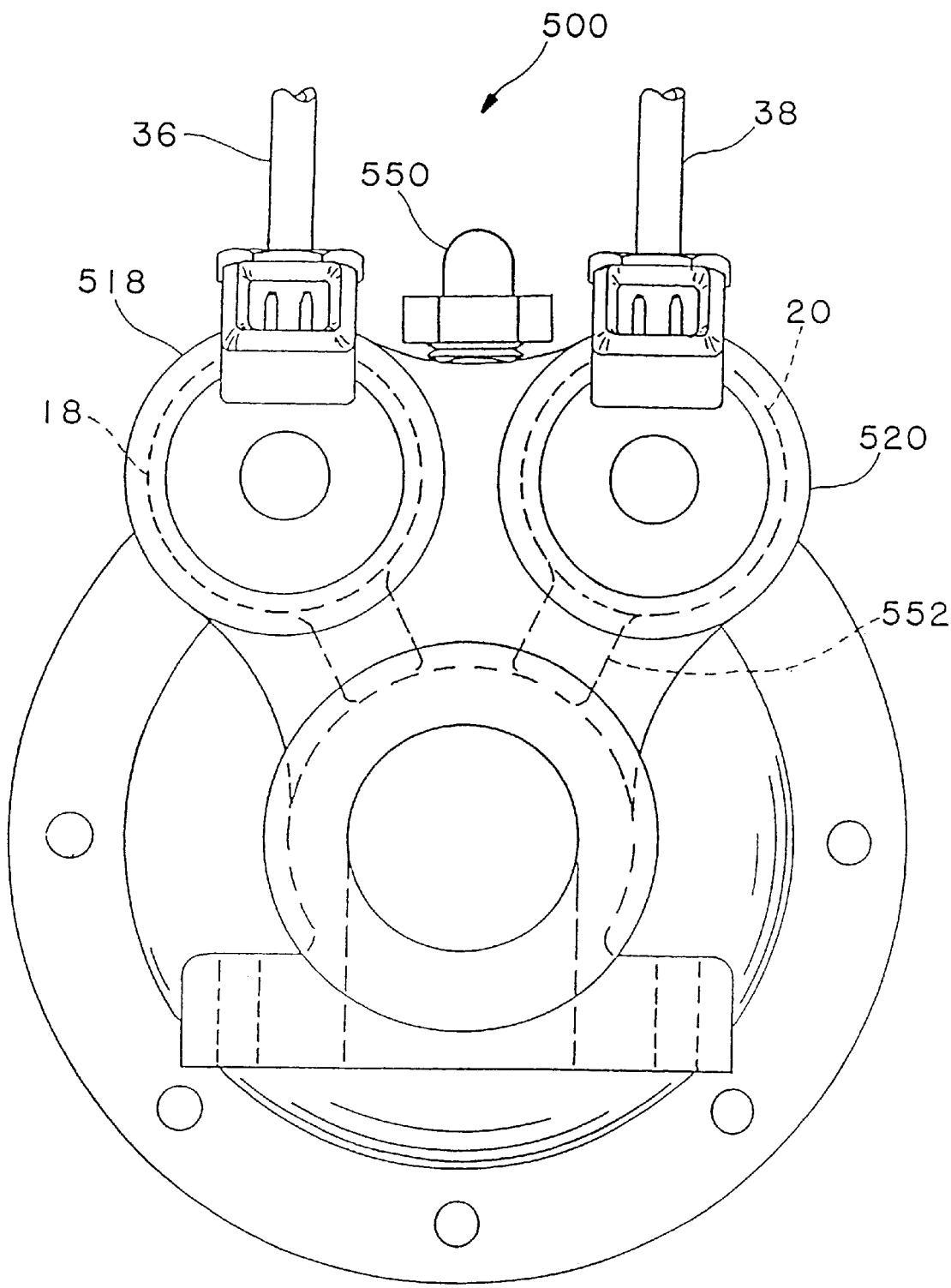
FIG. 10 is an end view of the valve in FIG. 9.
Figure 11:
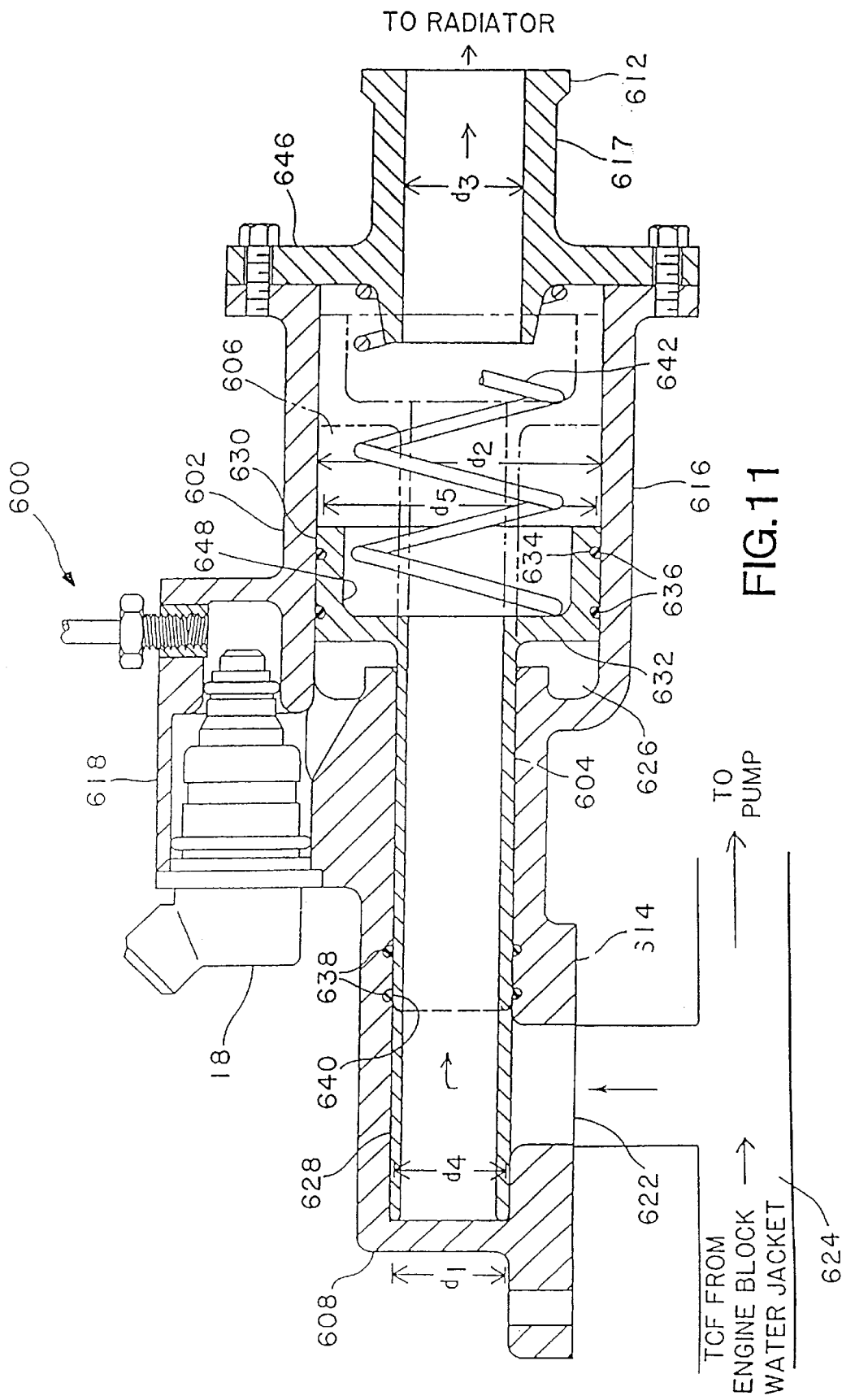
FIG. 11 is a sectional side view of another embodiment of a piston type hydraulically operated electronic engine temperature control valve for controlling the flow of temperature control fluid in an engine.
Figure 12:
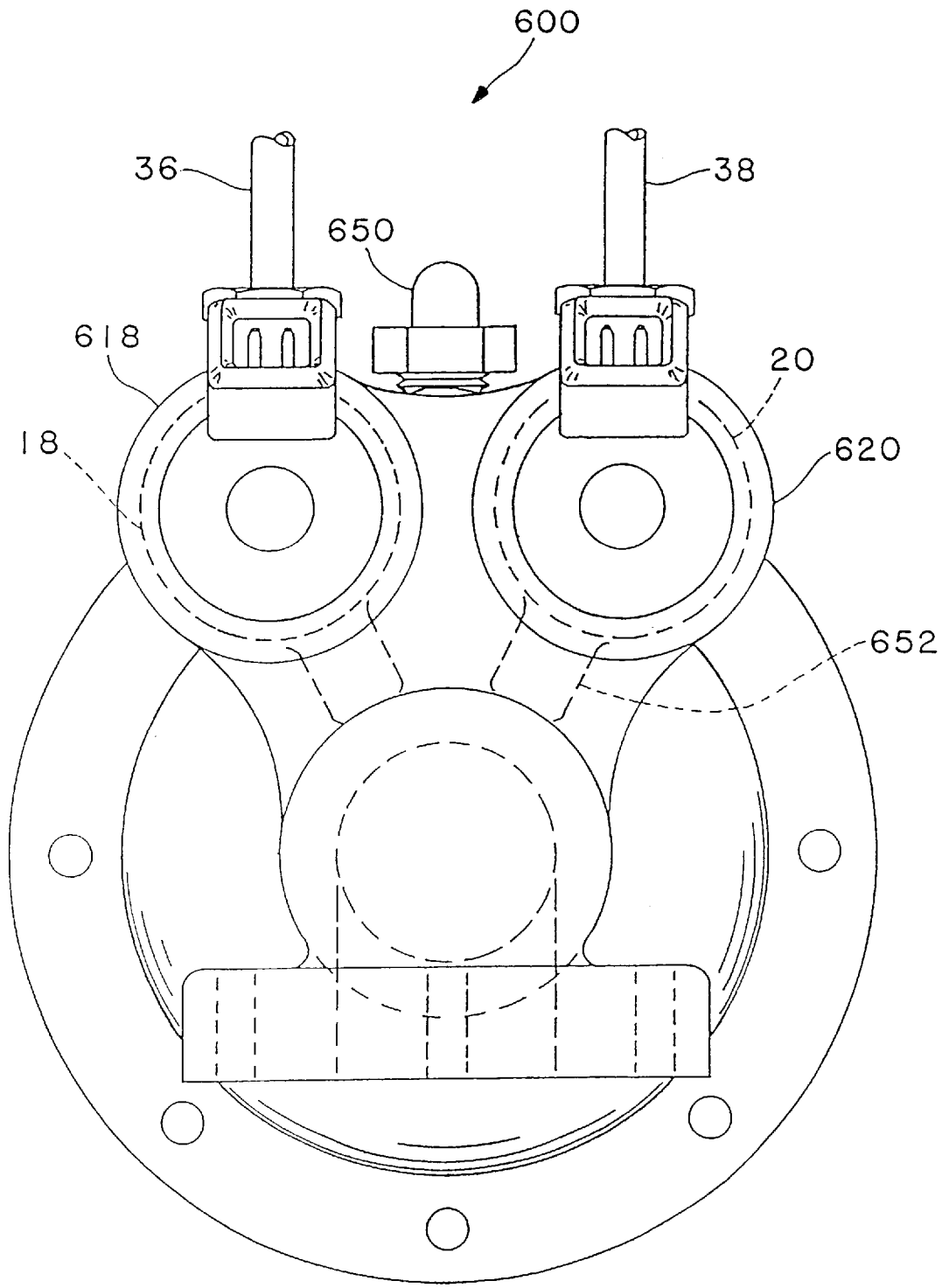
FIG. 12 is an end view of the valve in FIG. 11.

FIGS. 9 and 10 disclose one embodiment of a piston valve and FIGS. 11 and 12 disclose another embodiment of a piston valve. Both types of valves provide a fluid flow passageway through at least a portion of the housing when the valve is open and block off the fluid flow passageway through that portion of the housing when the valve is closed. Both types of valves employ the outer circumferential wall of their piston shafts to block a fluid passageway opening through the housing, thereby preventing fluid flow through any portion of the housing. The valves allow flow of fluid through the portion of the housing by moving the outer circumferential wall of their piston shafts wall away from the opening. The valve embodiment in FIGS. 11 and 12 is a flowthrough type of valve. That is, when the valve is open, the fluid controlled by the valve flows through the interior of the piston head. In contrast, in the embodiment in FIGS. 9 and 10, the fluid does not flow through the piston head.

In both of the piston valve embodiments, the piston head is moved from the closed to the open position by the force of hydraulic fluid pressure against a rear surface of the cup, and is moved back to the closed position by the force of a biasing spring, in a manner similar in principle to movement of the diaphragm valves in valves 10 and 100. The hydraulic fluid enters and leaves the piston valve through a pair of hydraulic fluid injectors in the same manner as in the valves 10 and 100.

FIG. 9 shows a sectional side view of EETC valve 500 and FIG. 10 shows a right end view of the EETC valve 500 in FIG. 9. The solid lines in FIG. 9 shows the EETC valve 500 in its first position which is associated with a valve "closed" state. FIG. 9 also shows the valve's second position in phantom which is associated with a valve "open" state. For clarity, FIGS. 9 and 10 are described together.

The EETC valve 500 includes valve mechanism casing or housing 502, piston head 504, an inlet hydraulic fluid injector 18 and an outlet hydraulic fluid injector 20. Only the inlet hydraulic fluid injector 18 is visible in FIG. 9, whereas both injectors 18, 20 are visible in FIG. 10. Injector 18 is connected to fluid inlet tube 36 and injector 20 is connected to fluid outlet tube 38, in the same manner as the valves 10 and 100.

The housing 502 is a generally cylindrical solid structure having a bore 506 therethrough. The housing 502 is bolted closed at one end 508 by cover 510 and open at the other end 512. The housing 502 is defined by five main parts, the cover 510, a first cylindrical portion 514 having an inner diameter of about $d_1$, a second cylindrical portion 516 having an inner diameter of about $d_2$ and two barrels 518, 520 extending from the housing 502, each barrel housing one of the fluid injectors 18, 20. Barrel 518 and injector 18 are visible in FIG. 9. Only the barrel 518 is visible in FIG. 9, whereas both barrels 518, 520 are visible in FIG. 10. The diameter $d_2$ is larger than $d_1$.

The housing 502 also includes two openings therethrough. A first opening 522 located in a mid-region of the first cylindrical portion 514 allows temperature control fluid (TCF) from passageway 524 to pass therethrough when the first opening 522 is not obstructed by the piston head 504. A second opening (not shown) allows hydraulic fluid to flow into and out of a chamber 526 within the housing's second cylindrical portion 516, to and from the pair of fluid injectors 18, 20. Fluid pressure sensor 550 is in communication with the chamber 526. The sensor 550 is visible in FIG. 10 but is not visible in FIG. 9. This sensor 550 performs the same function as the fluid pressure sensor 28 in the EETC valve 10.

The piston head 504 is a unitary solid structure defined by two main parts, a piston shaft 528 and a piston cup 530 connected to one end of the shaft 528. The other end of the shaft 528 is closed. The piston cup 530 and the left hand portion of the piston shaft 528 reciprocate within the second cylindrical portion 516 of the housing 502. The piston shaft 528 is a preselected length which allows its outer circumferential wall to block the first opening 522 when the piston head 504 is in the first position and allows its outer circumferential wall to move completely away from the first opening 522 when the piston head 504 is in the second position. The piston shaft 528 has an outer diameter $d_3$ which is slightly less than $d_1$, thereby allowing the shaft 528 to fit tightly within the bore's first cylindrical portion 514. Likewise the piston cup 530 has an outer diameter $d_4$ which is slightly less than $d_2$, thereby allowing the cup 530 to fit tightly within the bore's second cylindrical portion 516. The cup 530 has a rear surface 532 which faces the piston shaft 528. The cup includes grooves 534 around its outer circumferential surface for seating piston O-rings 536 therein. Likewise, the inner circumferential surface of the bore's first cylindrical portion 514 includes grooves 538 around its circumference for seating O-rings 540 therein. The cup 530 also includes a cup-shaped insert 538 for holding one end of biasing spring 542 therein.

The EETC valve 500 is biased in the closed position by the biasing spring 542 which is mounted at the one end to an inner surface of the cup's insert 538 and at the other end to an inner surface of the cover 510. To hold the other end of the spring 542 in place, the cover 510 includes knob 544 which extends perpendicularly into the bore 506 from the center of its inner surface, the other spring end being seated around the knob 544.

To move the EETC valve 500 from its first position to its second position, the valve associated with the fluid injector 18 is opened in response to a control signal from an ECU (not shown). Simultaneously, the valve associated with the fluid injector 20 is closed, if it is not already closed. Pressurized hydraulic fluid from the fluid inlet tube 36 flows through the injector 18 and into the chamber 526, where it pushes against the piston cup's rear surface 532. When the fluid pressure against the cup's rear surface 532 exceeds the opposing force of the biasing spring 542, the piston head 504 moves to the left until it reaches the second position shown in phantom, thereby causing the piston shaft 528 to move away from the first opening 522. The TCF in the passageway 524 can now flow through the right hand portion of the housing 502 and into the radiator. A pressure sensor (not shown) and the ECU (not shown) cooperate in the same manner as described with respect to the EETC valve 10 to determine when to close the valve of the hydraulic fluid injector 20, thereby trapping the hydraulic fluid in the chamber 526. Thus, the piston shaft 528 will remain in the second position as long as the fluid injector valves remain closed. The O-rings 536 and 540 prevent the hydraulic fluid in the chamber 526 from leaking out into other parts of the housing 502. Likewise, the O-rings 540 prevent the TCF from leaking into other parts of the housing 502.

When it is desired to close the EETC valve 500, those steps are reversed. That is, the ECU sends a control signal to the solenoid of the hydraulic fluid injector 18 to close the injector's valve, if it is not already closed. Simultaneously, the ECU sends a control signal to the solenoid of the hydraulic fluid injector 20 to open that injector's valve. The pressurized hydraulic fluid inside the chamber 526 flows out through the housing's second opening (not shown), through the open valve of the hydraulic fluid injector 20 and into the fluid outlet tube 38. As the hydraulic fluid empties out of the chamber 526, the biasing spring 542 pushes the piston head to the right and into the first position, thereby causing the piston shaft 528 to block the first opening 522 and shut off fluid flow through the EETC valve 500. When the pressure sensor (not shown) detects that the chamber 526 is no longer pressurized, it causes the ECU to send a control signal to the solenoid of the hydraulic fluid injector 20 to close that injector's valve.

FIGS. 11 and 12 show a flow-through version of a piston valve suitable for use as an EETC valve. FIG. 11 shows a sectional side view of EETC valve 600 and FIG. 12 shows a right end view of the EETC valve 600 in FIG. 11. The solid lines in FIG. 11 shows the EETC valve 600 in its first position which is associated with a valve "closed" state.

FIG. 11 also shows the valve's second position in phantom which is associated with a valve "open" state. For clarity, FIGS. 11 and 12 are described together.

The EETC valve 600 includes valve mechanism casing or housing 602, piston head 604, an inlet hydraulic fluid injector 18 and an outlet hydraulic fluid injector 20. Only the inlet hydraulic fluid injector 18 is visible in FIG. 11, whereas both injectors 18, 20 are visible in FIG. 12. Injector 18 is connected to fluid inlet tube 36 and injector 20 is connected to fluid outlet tube 38, in the same manner as the valves 10 and 100.

The housing 602 is a generally cylindrical solid structure having a bore 606 therethrough. The housing 602 is closed at one end 608 and open at the other end 612. The housing 602 is defined by five main parts, including three cylindrical portions and two barrels. The three cylindrical portions are, from left to right, a first cylindrical portion 614 having an inner diameter of about $d_1$, a second cylindrical portion 616 having an inner diameter of about $d_2$ and a third cylindrical portion 617 having an inner diameter of about $d_3$. The diameter $d_2$ is larger than $d_1$ and the diameter $d_3$ is about the same as $d_1$. The first cylindrical portion 614 is closed at the left end (which corresponds to the closed housing end 608) and open at the right end. The second and third cylindrical portions 616 and 617 are open at both ends. The right end of the third cylindrical portion 617 corresponds to the open housing end 612. The third cylindrical portion 617 is a separate structural piece and is bolted to the second cylindrical portion 616 by an integral circular flange 646. The left end of the third cylindrical portion 617 extends slightly into the right end of the second cylindrical portion 616. Two barrels 618, 620 extend from the housing 602, each barrel housing one of the fluid injectors 18, 20. Barrel 618 and injector 18 are visible in FIG. 9. Only the barrel 618 is visible in FIG. 11, whereas both barrels 618, 620 are visible in FIG. 12.

The housing 602 also includes two openings therethrough. A first opening 622 located near the left end of the first cylindrical portion 614 allows temperature control fluid (TCF) from passageway 624 to pass therethrough when the first opening 622 is not obstructed by the piston head 604. A second opening (not shown) allows hydraulic fluid to flow into and out of a chamber 626 within the housing's second cylindrical portion 616, to and from the pair of fluid injectors 18, 20. Fluid pressure sensor 650 is in communication with the chamber 626. The sensor 650 is visible in FIG. 12 but is not visible in FIG. 10. This sensor 650 performs the same function as the fluid pressure sensor 28 in the EETC valve 10.

The piston head 604 is a unitary solid structure defined by two main parts, a hollow piston shaft 628 and a piston cup 630 connected to one end of the shaft 628. Unlike the other end of the shaft 528 in the piston head 504, the other end of the shaft 628 (i.e., the left end) is open. Also, a center region of the piston cup 630 is hollow. The piston cup 630 and the right hand portion of the piston shaft 628 reciprocate within the second cylindrical portion 616 of the housing 602. The piston shaft 628 is a preselected length which allows its outer circumferential wall to block the first opening 622 when the piston head 604 is in the first position and allows its outer circumferential wall to move completely away from the first opening 622 when the piston head 604 is in the second position. The piston shaft 628 has an outer diameter $d_4$ which is slightly less than $d_1$, thereby allowing the shaft 628 to fit tightly within the bore's first cylindrical portion 614. Likewise the piston cup 630 has an outer diameter $d_5$ which is slightly less than $d_2$, thereby allowing the cup 630 to fit tightly within the bore's second cylindrical portion 616. The cup 630 has a rear surface 632 which faces the piston shaft 628. The cup includes grooves 634 around its outer circumferential surface for seating piston O-rings 636 therein. Likewise, the inner circumferential surface of the bore's first cylindrical portion 614 includes grooves 638 around its circumference for seating O-rings 640 therein.

The EETC valve 600 is biased in the closed position by biasing spring 642 which is seated at one end against the cup's inner surface 648, and at the other end around the outer circumference of the left end of the third cylindrical portion 617. The far end of the spring's other end lies against the circular flange 646.

To move the EETC valve 600 from its first position to its second position, the valve associated with the fluid injector 18 is opened in response to a control signal from an ECU (not shown). Simultaneously, the valve associated with the fluid injector 20 is closed. Pressurized hydraulic fluid from the fluid inlet tube 36 flows through the injector 18 and into the chamber 626, where it pushes against the piston cup's rear surface 632. When the fluid pressure against the cup's rear surface 632 exceeds the opposing force of the biasing spring 642, the piston head 604 moves to the right until it reaches the second position shown in phantom, thereby causing the piston shaft 628 to move away from the first opening 622. The TCF in the passageway 624 can now flow through the hollow interior of the piston head 604,. through the right hand portion of the housing 602 (i.e., the third cylindrical portion 617) and into the radiator. The hydraulic fluid remains trapped in the chamber 626 because the only outlet passageway, the valve of the hydraulic fluid injector 20, is closed. Thus, the piston shaft 628 will remain in the second position as long as the states of the fluid injector valves are not changed. The O-rings 636 and 640 prevent the hydraulic fluid in the chamber 626 from leaking out into other parts of the housing 602. Likewise, the O-rings 640 prevent the TCF from leaking into other parts of the housing 602.

When it is desired to close the EETC valve 600, those steps are reversed. That is, the ECU sends a control signal to the solenoid of the hydraulic fluid injector 18 to close the injector's valve. Simultaneously, the ECU sends a control signal to the solenoid of the hydraulic fluid injector 20 to open that injector's valve. The pressurized hydraulic fluid inside the chamber 626 flows out through the housing's second opening (not shown), through the open valve of the hydraulic fluid injector 20 and into the fluid outlet tube 38. As the hydraulic fluid empties out of the chamber 626, the biasing spring 642 pushes the piston head 604 to the left and into the first position, thereby causing the piston shaft 628 to block the first opening 622 and shut off fluid flow through the EETC valve 600.

The hydraulic fluid flow paths in the EETC valves 500 and 600 differ slightly from the paths in the EETC valves 10 and 100. In the EETC valves 500 and 600, the hydraulic fluid does not flow through any common passages or passageways between the injectors and the valve chamber. Instead, each injector is in direct communication with the valve chamber. This feature is illustrated in FIGS. 10 and 12 by respective phantom dashed lines 552 and 652 which extend from the fluid injectors into the valve chamber.

Figure 16A:
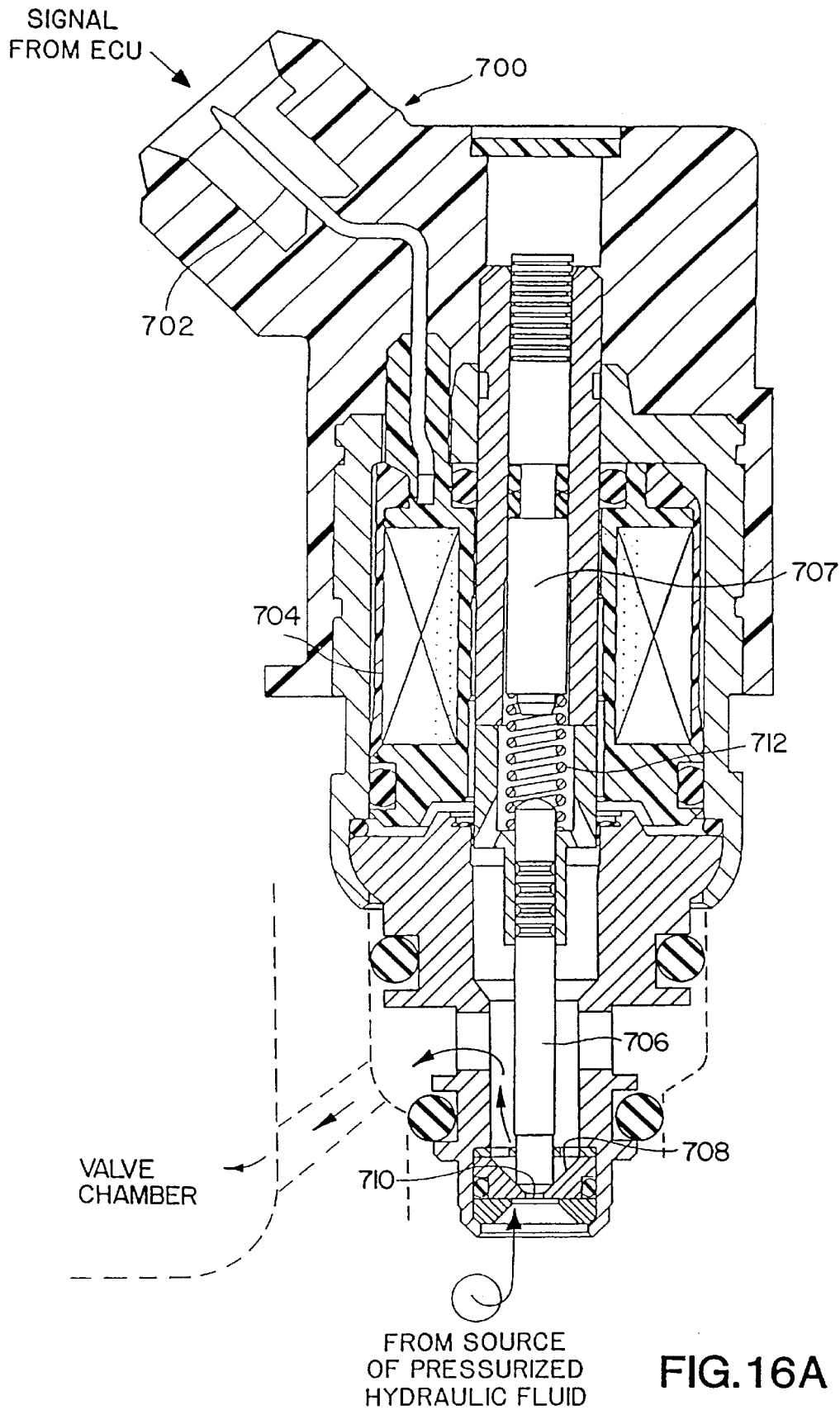
FIGS. 16A and 16B are sectional views of a hydraulic fluid injector suitable for controlling the state or position of the valves in the invention.
Figure 16B:
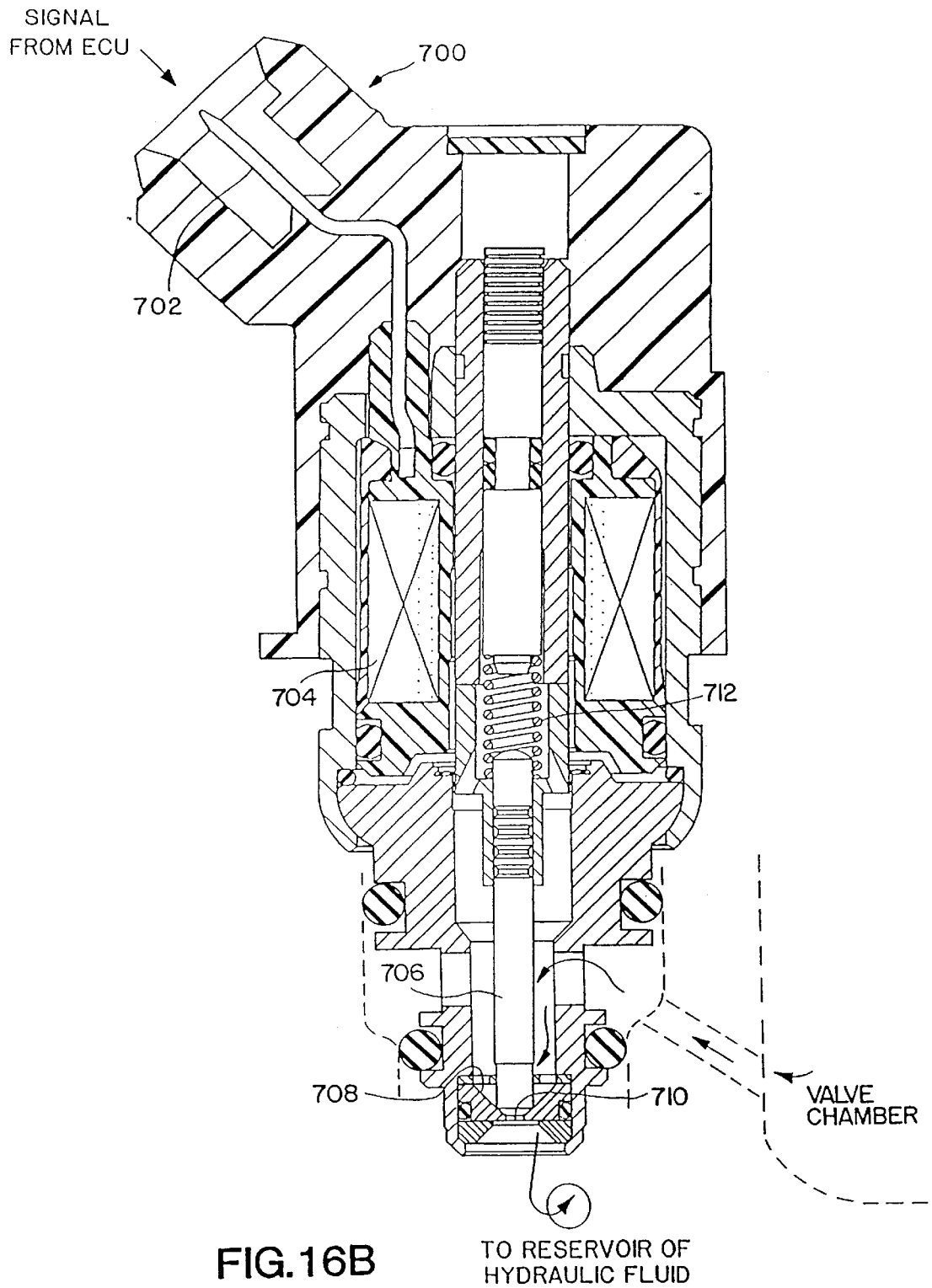

FIGS. 16A and 16B show a hydraulic fluid injector 700 in cross-section which is suitable for controlling the state or position of the EETC valves in the invention. As noted above, the fluid injector 700 is solenoid activated and includes an electrical terminal 702 connected at one end to injector solenoid 704 and at the other end to an ECU (not shown). When the solenoid 704 is energized, it causes needle valve 706 to move up, thereby moving it away from seat 708 and opening orifice 710 to fluid flow. When the solenoid 704 is deenergized, biasing spring 712 causes the needle valve 706 to return to the closed position.

FIG. 16A shows the inlet fluid flow path from a source of pressurized hydraulic fluid, through the injector and to the valve chamber. The valve in this figure thus performs the function of the valve 18 in FIG. 4. FIG. 16B shows the outlet fluid flow path from the valve chamber, through the injector and to a reservoir of hydraulic fluid. The valve in this figure thus performs the function of the valve 20 in FIG. 4.

The fluid injector 700 is similar to a DEKA Type II bottom feed injector, commercially manufactured by Siemens Automotive, Newport News, VA. Although this injector is typically employed to inject metered quantities of gasoline into the combustion chamber of an engine, it can also function as a valve to pass other types of hydraulic fluid therethrough.

When the hydraulic fluid is engine lubrication oil, the Siemens type injector can be employed with only minor modifications such as an increased lift or stroke (e.g., 0.016 inches, instead of 0.010 inches) and a larger flow orifice 710 (e.g., 0.060 Ø area) for increased flow capacity. The biasing spring 712 is preferably a heavy armature spring to seal against up to 80 psi pressure in a reverse position. The needle valve 706 preferably includes a 3% silicon iron armature 707 to obtain the appropriate lift. The metal housing of the injector is slightly modified and arranged to allow for twist snap-in assembly. The O-rings are smaller and relocated to be on the valve body. Also, since engine oil is not as corrosive as gasoline, internal components of the Siemens type injector do not need to be plated. Furthermore, the filter associated with commercially available injectors is not employed.

The inlet fluid injector 700 is preferably operated in a reverse flow pattern. That is, fluid flows through the inlet injector 700 in an opposite direction as the injector is normally employed in a gasoline engine. When the inlet injector 700 is operated in this manner, pressure from the valve chamber tends to seal the needle valve 706 against its seat 708, thereby lessening the tendency of the injector 700 to leak. This also ensures that the EETC valve remains open during engine off "hot soak" if conditions warrant an open state.

Figure 16C:
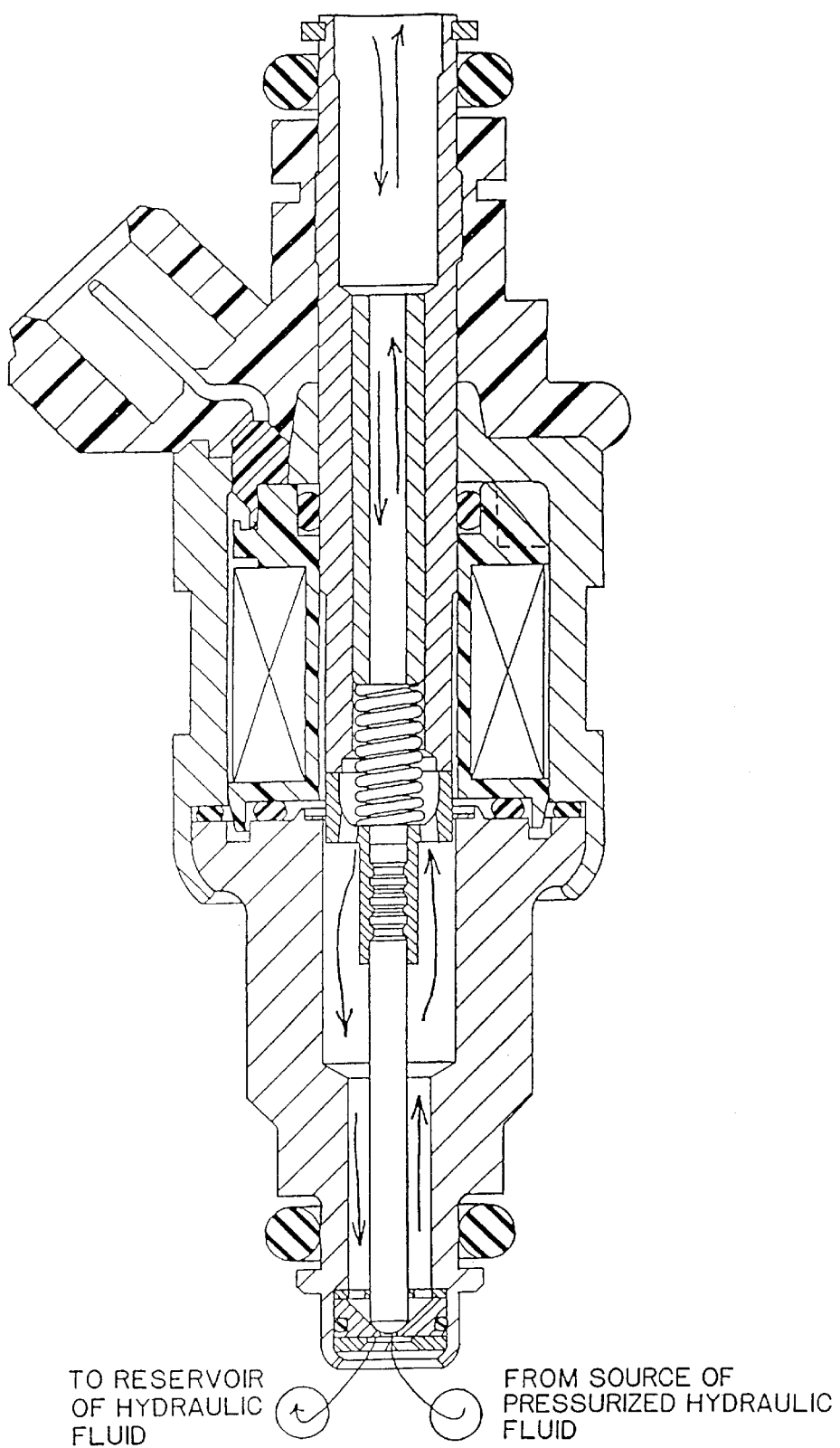
FIG. 16C is a sectional view of an alternative type of hydraulic fluid injector suitable for controlling the state or position of the valves in the invention.

FIG. 16C shows an alternative type of hydraulic fluid injector 800 in cross-section which is suitable for controlling the state or position of the EETC valves in the invention. The injector 800 is similar to a DEKA Type I top feed injector, commercially manufactured by Siemens Automotive, Newport News, Va. In this type of injector, the hydraulic fluid flows through the entire length. Although FIG. 16C shows both fluid flow paths through the same injector 800, only one injector 800 is employed for each path. The injector 800 is also preferably operated in a reverse flow pattern and without a filter. This type of injector has a numerous advantages over the DEKA Type II injector.

When employing the injector 800 in an EETC valve, the top of the injector 800 is connected directly to the EETC valve's upper chamber, not to a common passage. This allows for more versatile packaging configurations because the inlet and outlet injectors do not need to be physically near each other. It also reduces the amount of retained trapped air in the EETC valve, potentially eliminating the need to bleed out trapped air when filling the chamber. The injector 800 is also smaller and cheaper than the injector 700. One disadvantage of this type of injector is that it is more difficult to get hydraulic fluid such as oil to flow smoothly therethrough.

Figure 17:
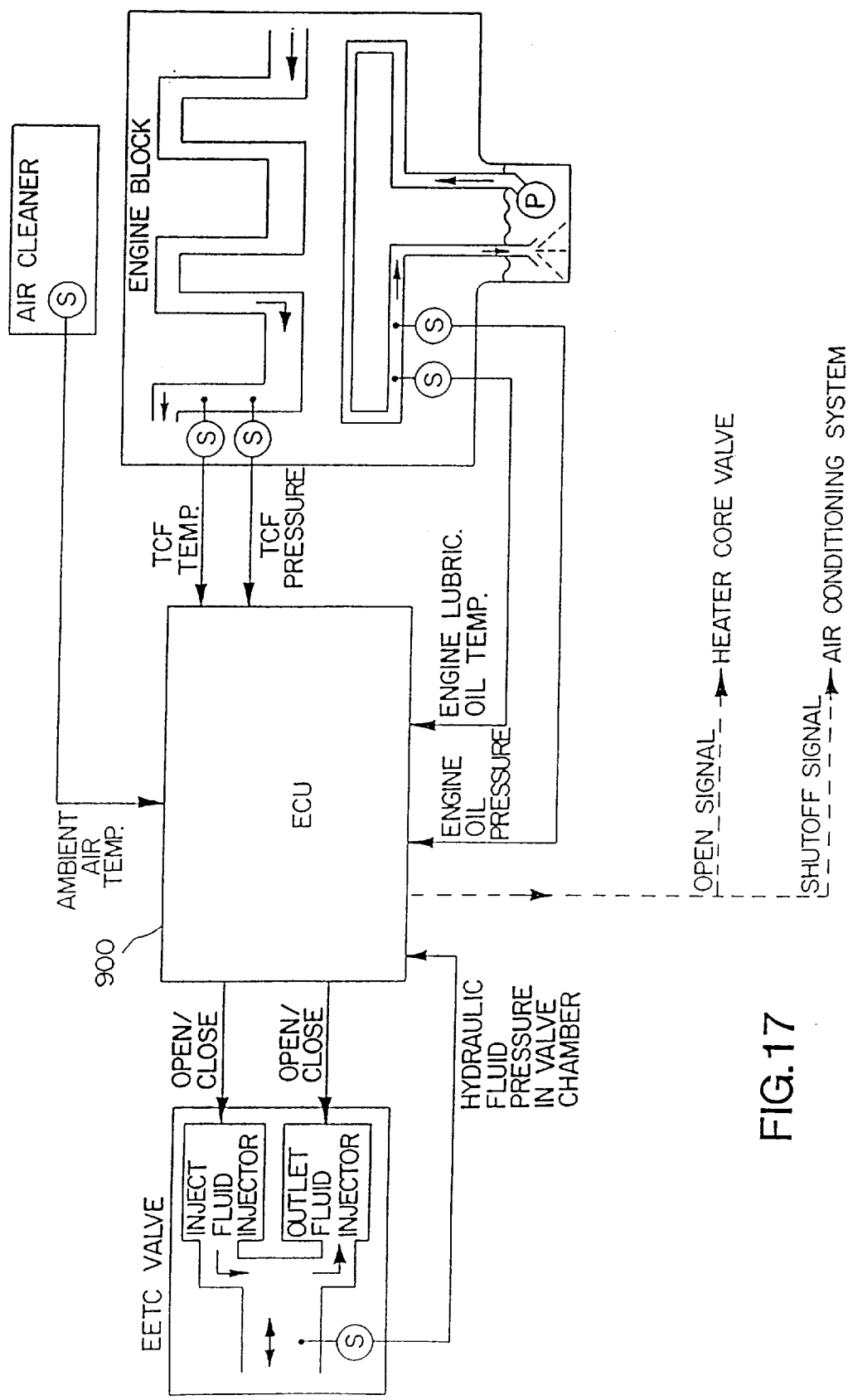
FIG. 17 is a block diagram circuit of the connections to and from an engine computer for controlling the state or position of the valves in the invention.

FIG. 17 shows a block diagram circuit of the connections to and from ECU 900 for controlling the state or position of the EETC valves. The preferred embodiment of the ECU 900 receives sensor output signals from at least the following sources:

1. an ambient air sensor in an air cleaner (clean side) or other suitable location;
2. a temperature sensor at the end of the engine block's (or the inlet to the cylinder head) temperature control fluid water jacket;
3. a pressure sensor in the engine block's temperature control fluid water jacket;
4. a temperature sensor in the engine block oil line;
5. a pressure sensor in the engine block oil line; and
6. a pressure sensor in the EETC valve's hydraulic fluid passageway.

The ECU 900 utilizes some or all of those sensor signals to generate open/close command signals for the fluid injectors of the EETC valve. As noted above, the hydraulic fluid pressure signals are also employed to detect unsafe operating conditions. The engine oil fluid pressure signal can be employed to detect unsafe operating conditions and/or to determine when the oil lubrication system is sufficiently pressurized to allow for proper operation of the EETC valve.

A typical control routine for opening a diaphragm type EETC valve sized to replace a prior art wax pellet or bimetallic coil type thermostat and employing fluid injectors connected to the engine lubrication oil system is as follows:

1. If engine is being started, wait appropriate amount of time until engine oil is adequately pressurized. It will typically take two to three seconds to allow it to reach a minimum pressure of 40 psi.
2. Activate solenoid of inlet fluid injector to open its valve. (Close valve of outlet fluid injector, if it is not already closed.)
3. Wait until chamber pressure (as measured by the fluid pressure sensor) reaches about 25 psi.
4. Activate a two second timer in the ECU.
5. After two seconds, deactivate the solenoid of the inlet fluid injector to close its valve.
6. If the fluid pressure sensor detects a pressure drop below 25 psi, repeat steps 2–5.

If the engine oil is warm, the total time to complete steps 2–5 will be about six seconds. If the engine oil is cold, step 2 will take longer, thereby lengthening the total time.

The ECU 900 can also perform other emergency control functions to maintain the TCF in a safe range. For example, in extremely hot ambient air conditions, the temperature of the TCF might exceed a safe range, even if the EETC valve is fully open. In typical prior art vehicles, an overheating condition will be signalled to the driver through a dashboard mounted engine warning light or the like. The novel system shown in FIG. 17 can respond to this condition by temporarily opening the heater core valve and/or shutting off the vehicle's air conditioning system. The first of these measures will assist in removing excess heat from the engine block. The second of these measures will reduce the load on the engine, thereby reducing its heat energy output. If these measures still fail to reduce the temperature of the TCF to a safe range, the system can then activate the engine warning light. Another dashboard mounted light can indicate when the ECU has taken emergency control of the vehicle's climate control system.

Likewise, in extremely cold, sub-zero ambient air temperatures, the heater core valve can be automatically deactivated or restricted to avoid draining heat energy from the engine block until the temperature of the TCF reaches an acceptable minimum level.

One example of how the ECU 900 controls the state or position of an EETC valve based on specific parameters is described in FIGS. 19–21 of this disclosure, and will be discussed in more detail hereinbelow.

FIG. 18 diagrammatically shows the flow path of the TCF diverted from the passageway 156 in FIG. 7. When the EETC valve 100 is in its first position, at least a portion, if not all, of the TCF in the passageway 156 flows through the opening 158 and into the passageway 160. The passageway 160 is connected to one end of passage 802 drilled through the engine block. The other end of the passage 802 is connected to the inlet end of the heat conductive tube 220 inside the engine block oil pan 94. The passage 802 is sealed at both ends by O-rings 804 to prevent leakage of the TCF into the oil pan 94. The O-rings 804 also function to insulate the passage 802 from the oil pan 94 and the passageway 160. Alternatively, if drilling a passage through the engine block is not practical or desired, the passageway 160 and the inlet end of the tube 220 can be connected to ends of an insulated tube exterior to the engine block. The outlet end of the heat conductive tube 220 is connected to a passageway leading to the water pump inlet (not shown). The tube 220 is secured inside the oil pan 94 by hanger 806 attached to the engine block. The hanger 806 is insulated to prevent it from conducting heat energy from the tube 220 into the engine block. The hanger 806 also cushions the tube 220 from engine vibrations. Suction through the tube 220 is enhanced by placing the outlet end close to the water pump inlet.

The passageway 160 can also lead to other passages and tubes disposed in other engine parts, thereby allowing the TCF to warm or heat those other parts too. For example, additional TCP passages can lead to tubes disposed in the reservoir of the automatic transmission, the brake system's master cylinder or ABS system, windshield washer fluid or the like. The TCF would then flow to these parts whenever it flows to the oil pan. Alternatively, flow to one or more of these parts can be controlled by a separate flow control valve so that when the TCF flows to the oil pan, the fluid selectively flows to desired parts in accordance with different temperature parameters.

The EETC valves described herein are designed to replace the prior art wax pellet type or bimetallic coil type thermostat. These thermostats are typically located in an opening connecting a radiator inlet passage to an outlet of an engine water jacket. Accordingly, the EETC valves are dimensioned to fit into that opening. Likewise, the EETC valve housing includes holes to allow the valves to be mounted in that opening in the same manner as the prior art thermostats are mounted within the engine. Thus, the EETC valves can be retrofitted into existing engine TCF passageways. The only additional apparatus required to install the EETC valve 10, 500 and 600 are the hydraulic fluid lines and electrical wires for connection to the inlet and outlet hydraulic fluid injectors. These lines and wires can be placed inside the engine compartment wherever space permits. To install the EETC valve 100, the TCF passageway must be slightly modified to provide the extra passageways 160 and/or 216 shown diagrammatically in FIGS. 14A through 14F and FIG. 18. Likewise, if the EETC valve 100 is employed to control the intake manifold flow control valve 300 and/or the cylinder head valve 400, the fluid outlet tube 174 must be provided from the EETC valve 100 to the valve 300, as shown in FIG. 8.

Notwithstanding the above discussion of the valve location, the EETC valve can alternatively be located wherever it can properly perform the function(s) attributed thereto. Likewise, the EETC valve can have other sizes which are appropriate for its alternative location.

The EETC valves are suitable for any form of internal combustion engine which opens and closes an engine block TCF passageway to a radiator. Thus, both gasoline and diesel engine environments are within the scope of the invention.

Although the hydraulic fluid which controls the state or position of the EETC valve is preferably engine oil, it can be any type of pressurized hydraulic fluid associated with a vehicle powered by an internal combustion engine. In one alternative embodiment, the hydraulic fluid is power steering fluid wherein the source of the pressurized hydraulic fluid is the high pressure line of a power steering pump. The hydraulic fluid emptied from the EETC valve flows into the power steering fluid reservoir. In this embodiment, the power steering pump is modified so that it provides high pressure at all times. That is, high pressure can be tapped from the pump when the wheel is not being turned and when the engine is off, in addition to when the wheel is being turned. Also, this version employs a prior art pressure regulating valve in the high pressure line to achieve a constant output pressure of about 10 to about 120 psi, regardless of the varying input pressure of the power steering unit, which can range up to 1000 psi. In this manner, the EETC valve is never exposed to pressures exceeding about 120 psi, regardless of the output pressure of the power steering unit.

In another alternative embodiment, a separate hydraulic fluid system operates the EETC valve. This embodiment would require many components to be uniquely dedicated to the task, such as a separate hydraulic pump, and thus would significantly increase the cost of the system.

The invention also contemplates the use of alternate means for controlling the EETC valve, although these may not be preferred. For example, TCF fluid could be fed to a separate pump which pressurizes the fluid. The pressurized TCF is then fed into the injectors for actuating the diaphragm. In yet another embodiment of the invention, an electromechanical servo could actuate the valve member 146. Those skilled in the art would readily appreciate the variations that are possible within the scope of this invention.

Dead heading or restricting TCF flow through portions of the water jacket reduces heat loss from the engine block. It also reduces the mass of TCF circulating through the water jacket, thereby raising the temperature of the circulating mass above what it would be if the mass was larger. Both of these effects allows the engine block to warm up more quickly. As noted above, heat energy is primarily transferred to and from the engine block by the flow of fluid. Therefore, dead heading or restricting the flow will have almost the same effect as shutting off the flow. Since dead heading or restricting TCF flow effectively traps all or part of the TCF in the dead headed or restricted passageway, the trapped TCF acts as an insulator. That is, the hot fluid in the water jacket prevents the engine heat from readily dissipating to the environment. This is due, primarily, to the fact that the TCF is a better insulator than a conductor. Accordingly, this insulating function further reduces heat loss from the engine block.

Some of the preferred materials for constructing the EETC valve and operating parameters were described above. In one embodiment of the invention, the following materials and operating parameters were found to be suitable for a diaphragm type EETC valve.

Biasing spring—stainless steel

Valve housing and cover—glass filled nylon injection molded is preferred, aluminum is also acceptable Wall thickness of diaphragm valve body and cover—0.090 inches Air bleed opening—0.060 inches diameter Valve rod—cored out to obtain uniform thickness for injection molding Diaphragm stroke—up to one inch U-shaped tube in oil pan—two feet length, or more Minimum valve operation pressure—20 psi (i.e., valve will open at 20 psi.). This will be sufficient for most engines which operate with engine lubrication oil pressures in the range from about 37 psi. (at the lowest idle speed) to about 75 psi.

Maximum valve operation pressure—120 psi.

The ECU 900 can be programmed with specific information to control the state of the EETC valves and any restrictor/shutoff valves 300 and/or 400 associated therewith.

Figure 19:
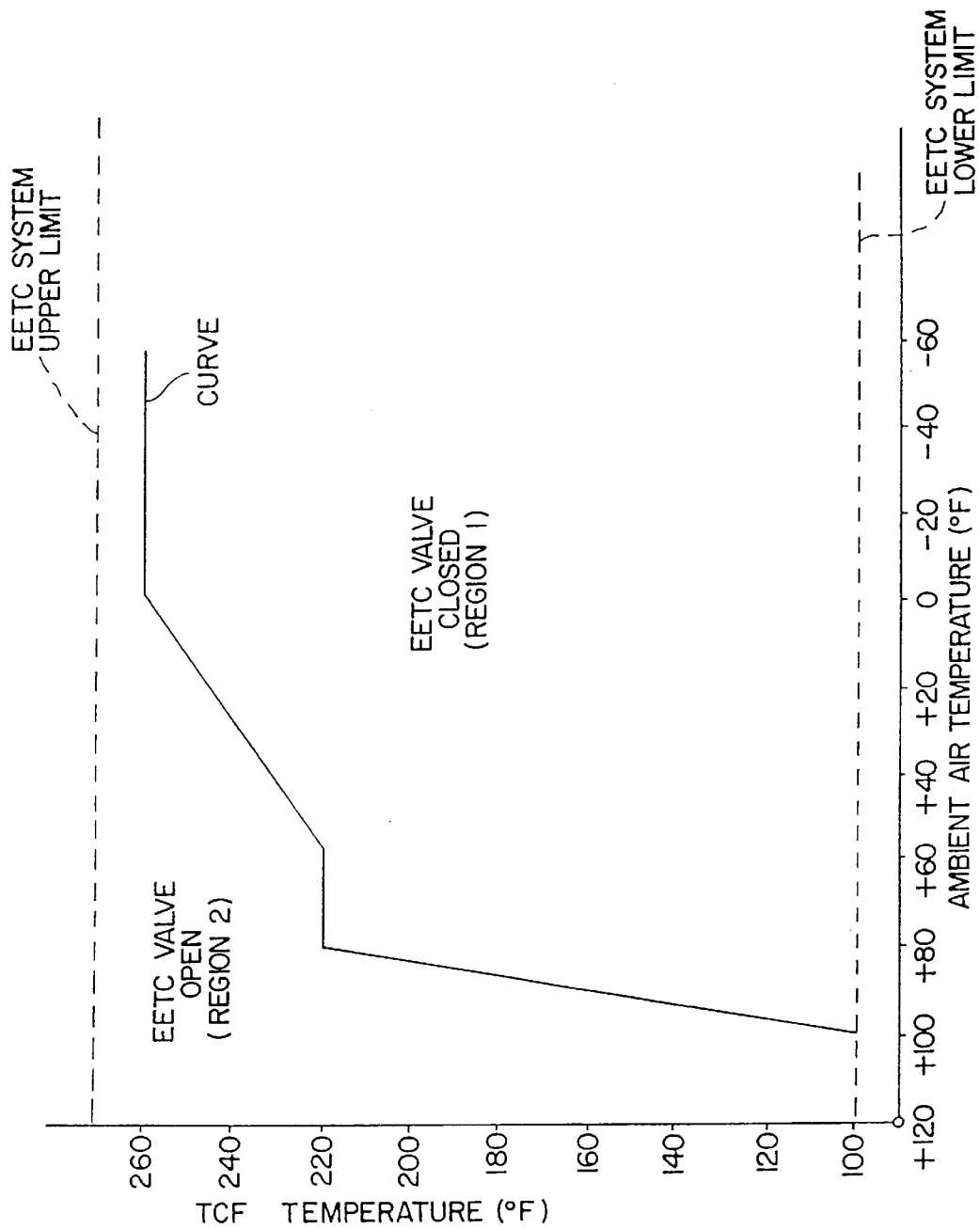
FIGS. 19 and 20 are graphs showing the state of a valve in the invention at selected temperature control fluid and ambient air temperatures.
Figure 20:
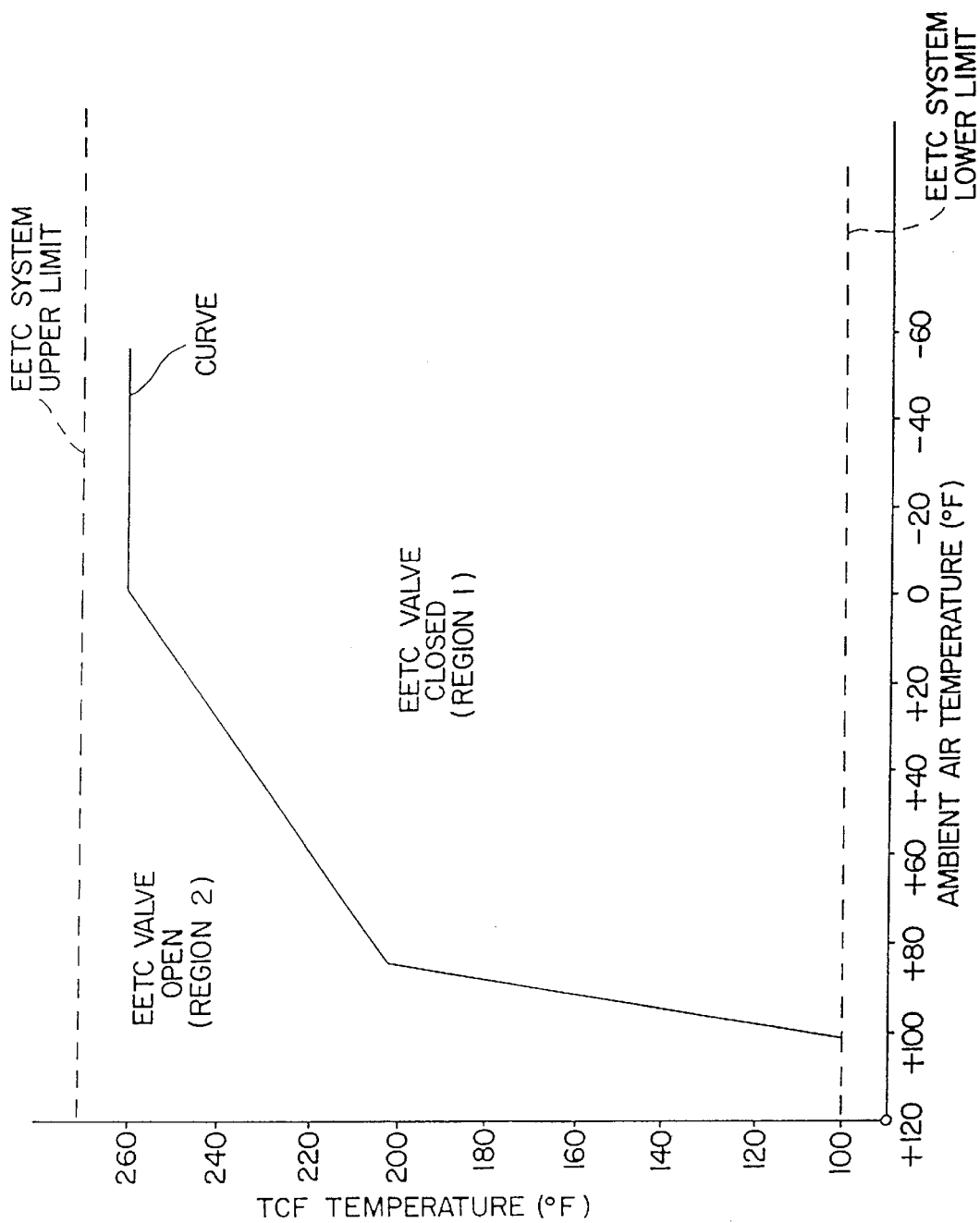
Figure 21:
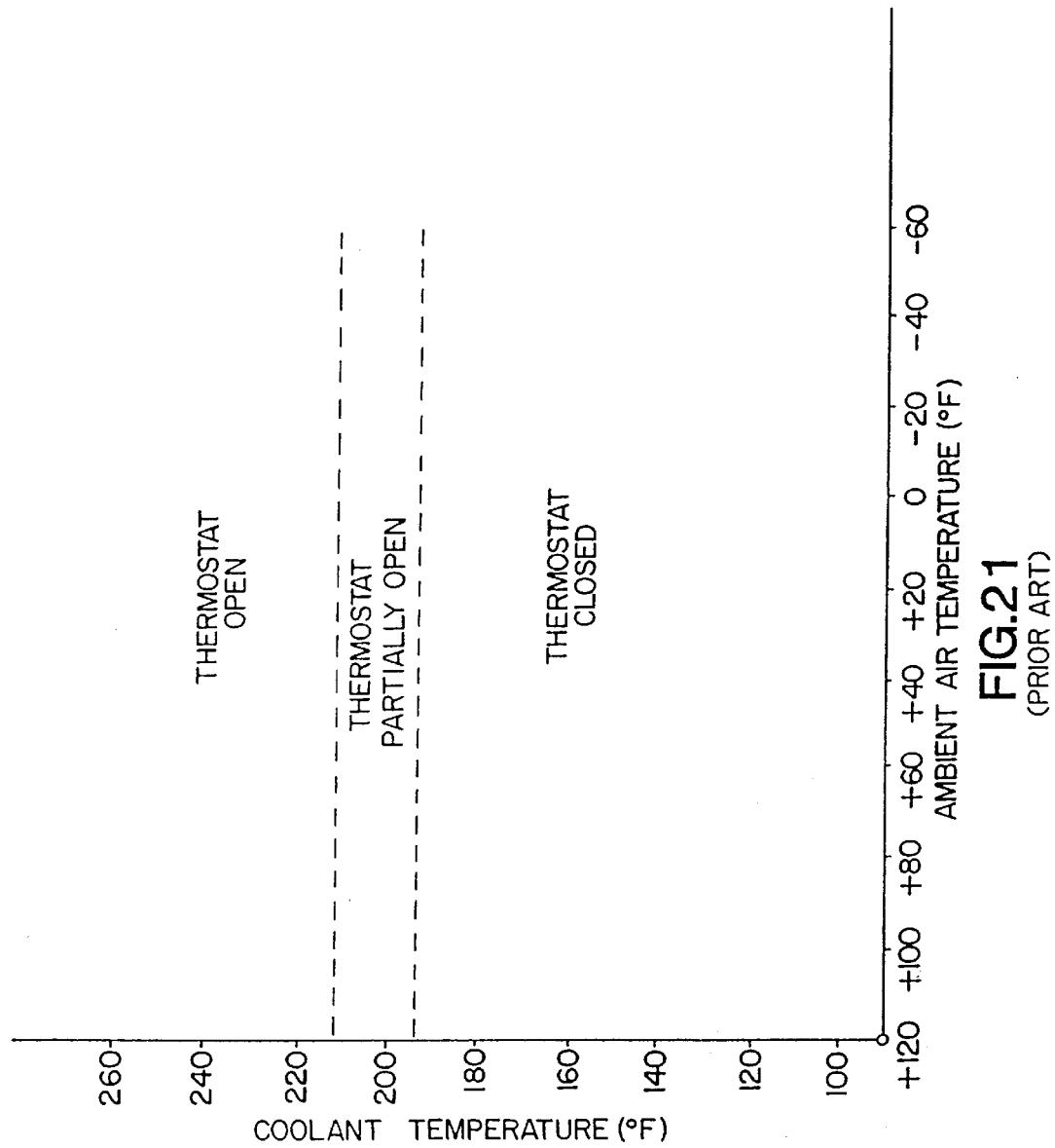
FIG. 21 is a graph showing the state of prior art wax pellet type or bimetallic coil type thermostats at the same selected temperature control fluid and ambient air temperatures of temperatures as in FIGS. 19 and 20.

FIGS. 19 and 20 show one example of how the ECU 900 is programmed with information to control the state of an EETC valve based upon the temperature of the TCF and the ambient air temperature, whereas FIG. 21 shows the state of prior art wax pellet type or bimetallic coil type thermostats within the same ranges of temperatures.

Turning first to FIG. 21, prior art wax pellet type or bimetallic coil type thermostats are factory set to open and close at a preselected coolant temperature. Thus, the state of these thermostats are not affected by the ambient air temperature. That is, no matter how cold the ambient air temperature becomes, these thermostats will open when the coolant temperature reaches the factory set value. A thermostat designed for use in a cooling system employing a permanent type antifreeze (as opposed to an alcohol type antifreeze) is typically calibrated to open at about 188 to about 195 degrees Fahrenheit and be fully open between about 210 to about 212 degrees Fahrenheit.

Since the EETC valves in the invention are computer controlled, their states can be set to optimize engine temperature conditions over a wide range of ambient air temperatures and TCF temperatures. In one embodiment, the ECU 900 in FIG. 17 is programmed with the curve shown in FIG. 19. The curve is defined by a two-dimensional mathematical function of $t1=f(t2)$, where $t1$ is the temperature of the TCF in the engine block and $t2$ is the ambient air temperature, $t1$ and $t2$ being axes on an orthogonal coordinate system. The curve divides the coordinate system into two regions, one on either side of the curve.

In operation, the ECU 900 continuously monitors the ambient air temperature and the TCF temperature to determine what state the EETC valve should be in. If coordinate pairs of these values lie in region 1 of the FIG. 19 graph, the EETC valve is closed (or remains closed if it is already in that state). Likewise, if coordinate pairs of these values lie in region 2, the EETC valve is opened (or remains open if it is already in that state). If coordinate pairs lie exactly on the curve, the ECU is programmed to either automatically select one of the two regions or to modify one or both of the values so that the coordinate pair does not lie exactly on the curve.

Figure 25:
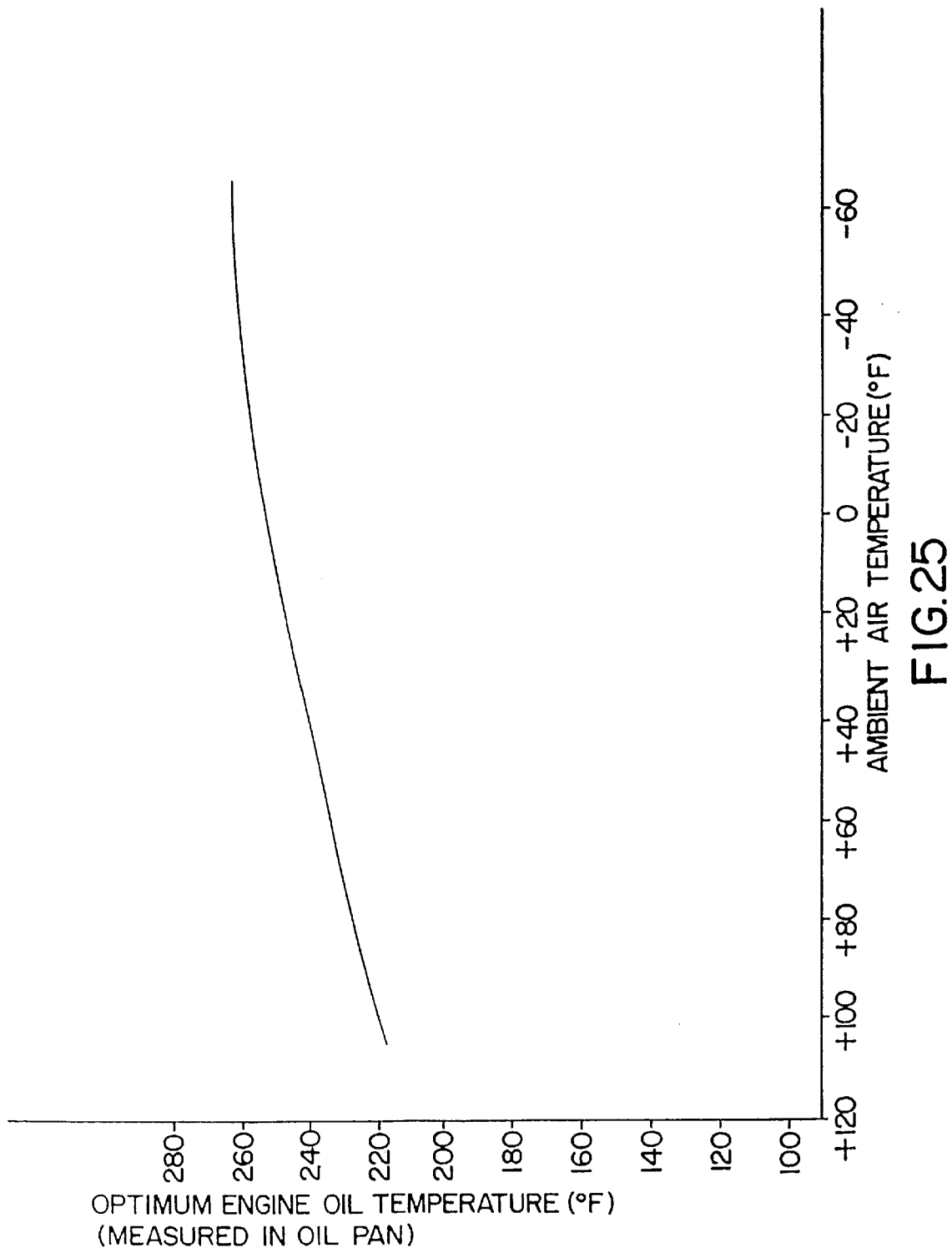
FIG. 25 shows a plot of the optimum engine oil temperature at selected ambient air temperatures.

Alternately, the state of the EETC valve could be controlled simply based on the actual engine oil temperature. In such an embodiment, the actual engine oil temperature would be compared to a predetermined optimum engine temperature as a function of the ambient temperature, as shown in FIG. 25. When the actual engine oil temperature is colder than the desired/optimum temperature, the EETC valve could be closed thereby raising the engine temperature. Similarly, if the actual engine oil temperature is higher than the desired/optimum temperature, the EETC valve could be opened, thereby circulating the TCF through the radiator to cool it down. One deficiency with using the engine oil temperature as a controlling factor is the lag time involved in bringing the oil to a prescribed temperature. Additionally, there are upper and lower temperature limits on the TCF that should not be exceeded in current automobile cooling systems. Therefore, it is preferable to control the operating state of the EETC valve through the monitoring of ambient air temperature and the TCF temperature.

The curve shown in FIG. 19 has been experimentally determined to provide optimum engine temperature control in a typical internal combustion engine when an EETC valve replaces the typical prior art thermostats described above. However, the curve can be different, depending upon the desired operating parameters of the engine and its accessories. An engine employing an EETC valve which is controlled according to the curve in FIG. 19 will have lower emissions, better fuel economy and a more responsive vehicle climate control system than the same engine employing the thermostat. These improvements will be greatest in the lower ambient temperature ranges.

To illustrate some advantages of the EETC system, consider a vehicle which is first started up when the ambient air temperature is zero degrees Fahrenheit. Until the coolant or TCF temperature reaches about 188 degrees Fahrenheit, the prior art system in FIG. 21 and the EETC system in FIG. 19 will both prevent the coolant or TCF from flowing through the radiator. However, when the coolant temperature exceeds about 188 degrees Fahrenheit, the prior art system will open the thermostat and allow either some or virtually all of the coolant to flow through the radiator, thereby lowering the coolant temperature. This reduces the ability of the vehicle's heater/defroster to deliver hot air (i.e., heat) to the vehicle interior and windows because the coolant flowing through the heater core will be cooler than if it did not flow through the radiator. Furthermore, this also unnecessarily removes valuable heat energy from the engine block.

When the ambient temperature is zero degrees Fahrenheit, typical internal combustion engines often do not need to be cooled by coolant flow through the water jacket since the ambient air presents a significant heat sink. Furthermore, when the ambient air temperature is about zero degrees Fahrenheit, the heat energy emitted by engine combustion often does not raise the oil temperature or the engine block above the level desired for safe and optimum operation. In fact, in sub-zero ambient air temperatures, the engine block of a typical internal combustion engine will have an average temperature of less than 150 degrees Fahrenheit which is less than the ideal operating temperature. Accordingly, high oil viscosity and sludge build-up, which increases emissions and lowers fuel economy, are virtually unavoidable conditions when operating engines having prior art thermostat controlled cooling systems in sub-zero ambient air temperatures.

Consider the same vehicle operating in the same ambient temperature environment with an EETC valve system. As shown in FIG. 19, the EETC valve will remain closed until the TCF exceeds about 260 degrees Fahrenheit, a condition that might not even occur unless the engine is driven very hard and/or fast. Consequently, the TCF flowing through the engine water jacket will not unnecessarily remove valuable heat energy from the engine block and engine lubrication oil. Furthermore, the TCF flowing through the heater core will become hot more quickly and will remain hotter than the coolant in the FIG. 21 scenario, thereby resulting in improved defrosting and vehicle interior heating capabilities.

In a control system employing the curve in FIG. 19, the EETC valve can be any of the valves described in the invention. If the EETC valve is employed in conjunction with one or more of the restrictor/shutoff flow control valves 300 or 400, the curve can be slightly modified to obtain optimum temperature control conditions. Specifically, the portion of the curve between about 58 to about 80 degrees Fahrenheit in FIG. 19 can have the same slope as the portion of the curve between about 60 degrees to about zero degrees Fahrenheit, as shown in FIG. 20.

When the EETC valve is employed in conjunction with the additional flow control valves, emission levels will even be lower, fuel economy even greater, and the vehicle climate control system even more responsive than the system employing only the EETC valve. If the EETC valve 100 is employed in the system, hot ETC will flow through the oil pan at virtually all times when the ambient air temperature is zero degrees Fahrenheit. This will improve the oil viscosity and reduce engine sludge build-up.

When the EETC valve is employed in conjunction with the intake manifold flow control valve 300, engine performance improvements will occur in high temperature environments as a result of avoiding excessive heating of the intake manifold, as discussed above with respect to the system in FIGS. 14A through 14C.

When the EETC valve is employed in conjunction with flow control valves associated with the cylinder head and/or cylinder block, as discussed above with respect to FIGS. 14A through 14C, very precise tailoring of engine temperature can be achieved. For example, when the ambient temperature is very low and the EETC valve is closed, the one or more flow control valves are likewise closed to restrict and/or dead head the TCF that would ordinarily flow through certain portions of the engine block. Preferably, the TCF is allowed to flow only through the hottest portions of the engine block, such as areas of the cylinder head jacket closest to the cylinders. This achieves at least two desired effects. First, the TCF flowing through the limited portions of the engine water jacket will not unnecessarily remove valuable heat energy from the engine block and engine lubrication oil. Second, the limited amount of the TCF which exits the water jacket will be hotter than if the TCF flowed through all parts of the engine block. Thus, the TCF flowing through the heater core will become hot more quickly and will remain hotter than if the TCF flowed through all parts of the engine block, thereby resulting in improved defrosting and vehicle interior heating capabilities.

Figure 22A:
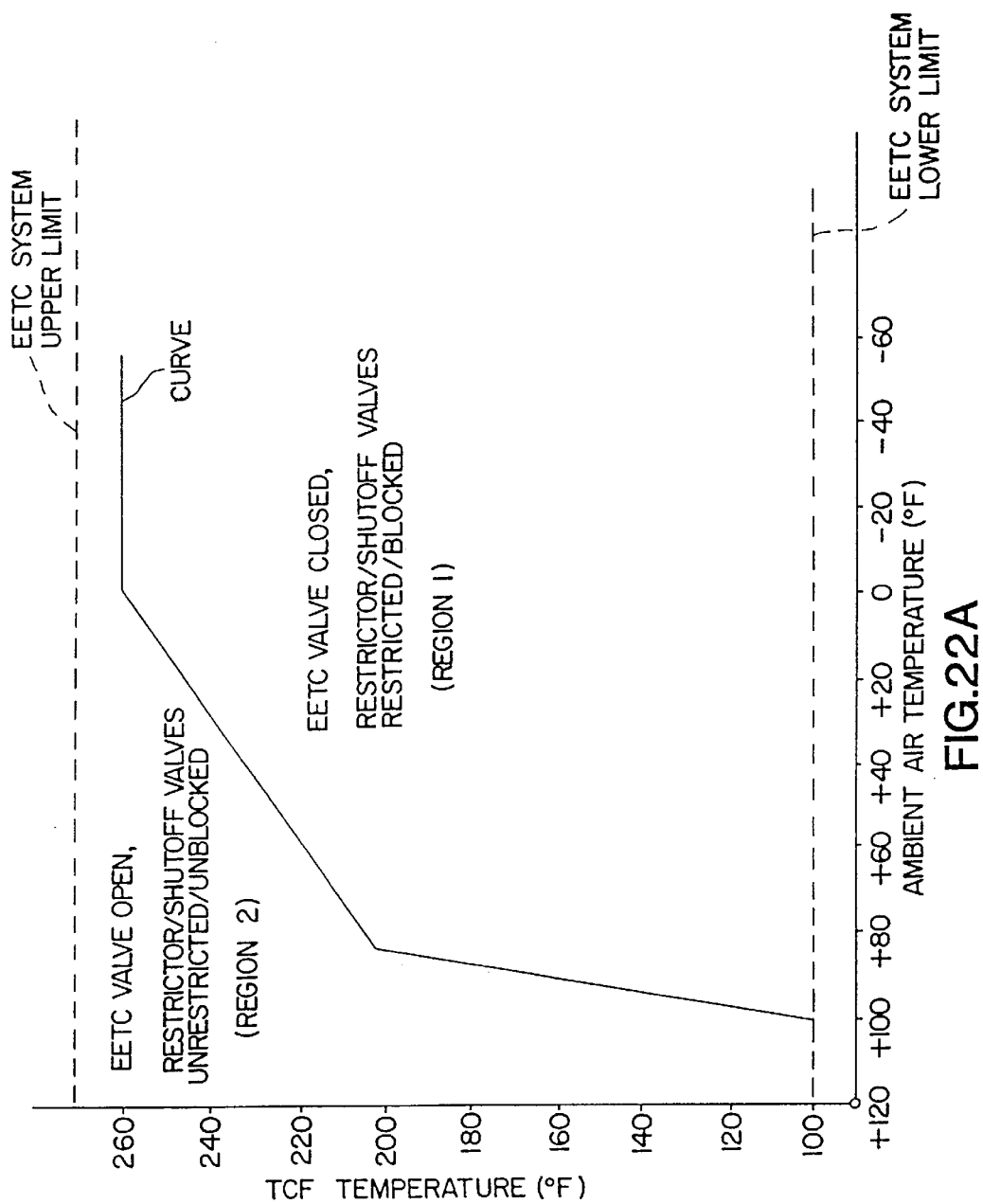

FIG. 22A shows a valve state graph which employs a curve similar to the curve in FIG. 20 but which employs the valve states to control the state of the EETC valve and two restrictor/shutoff valves. In region 1, the EETC valve is closed and the restrictor/shutoff valves are in an restricted/blocked state. In region 2, the EETC valve is open and the restrictor/shutoff valves are in an unrestricted/unblocked state.

Figure 23:
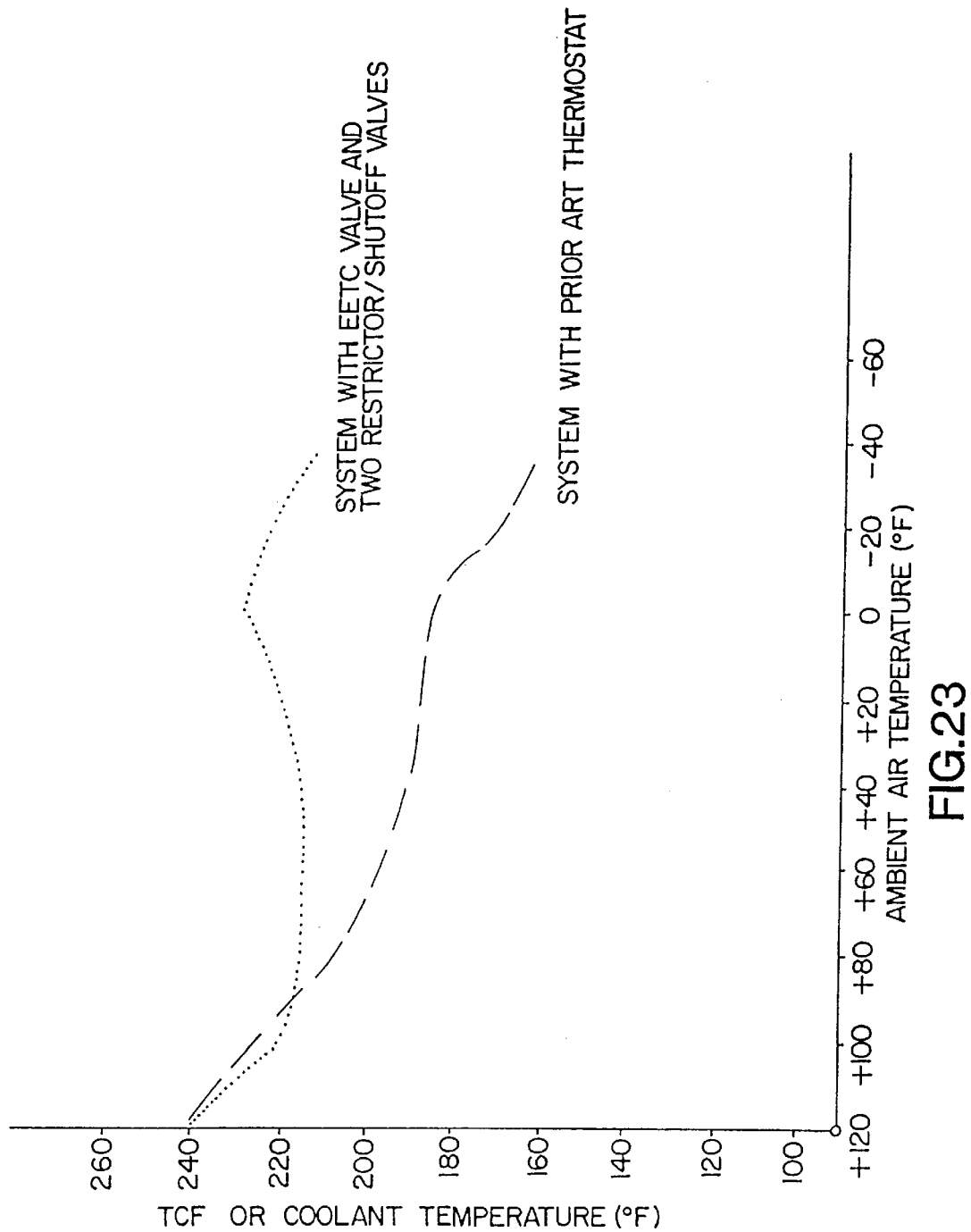
FIG. 23 is a graph showing the actual temperature of the temperature control fluid when controlling the plurality of valves referred to in FIG. 22A according to the FIG. 22A scheme, compared to the actual temperature of engine coolant when a prior art thermostat is employed and controlled according to the FIG. 21 scheme.

FIG. 23 graphically shows a dotted curve of the actual temperature of the temperature control fluid measured in an engine block of a GM 3800 transverse engine equipped with an EETC valve and two restrictor/shutoff valves when the state of the valves are controlled according to the FIG. 22A scheme. The restrictor/shutoff valves are located on either side of a V-shaped engine block in the outer TCF flow passages around the cylinder liner, and together restrict the flow through the engine block by about 50 percent in their fully restricted state. FIG. 23 also shows a dashed curve of the actual temperature of engine coolant measured in the engine block when a prior art wax pellet type or bimetallic coil type thermostat is employed and its state determined according to the prior art FIG. 21 scheme.

The prior art thermostat operates to try to maintain a constant coolant temperature in a range from about 180 to about 190 degrees Fahrenheit. However, when the ambient air temperature is very hot (e.g., 100 degrees Fahrenheit), the coolant temperature will exceed the desired range even if the thermostat is fully open. This is because the ability of the vehicle's cooling system to cool the coolant is dependent upon the capacity of the radiator. It is usually impractical and too expensive to install a radiator large enough to maintain temperatures below 200 degrees Fahrenheit at all times. Thus, regardless of the type of flow control valves employed in the vehicle's engine, coolant temperatures will exceed the optimal range in hot weather conditions.

In very cold ambient temperatures such as sub-zero temperatures, the coolant temperature in the prior art system will be below the desired range and will continue to decrease with decreasing ambient air temperatures. This will cause a significant decrease in fuel economy and a significant increase in exhaust emissions for all of the reasons discussed above. Sludge formation will also be a significant problem.

The system employing the EETC valve and restrictor/shutoff valves show an improved TCF temperature curve because it maintains the TCF temperature more closely to the optimum range throughout a greater ambient temperature range. When the ambient air temperature is very hot (e.g., 100 degrees Fahrenheit) and full flow through the radiator has begun, the TCF temperature will be slightly less than the coolant temperature in the prior art system, mainly as a result of the greater flow allowed through the EETC valve, as compared to the prior art wax pellet type thermostat. However, the cooling capability of the system in the invention will still be limited by the fixed capacity of the radiator.

In cold ambient air temperatures, especially sub-zero temperatures, the system in the invention maintains the TCF temperature at values significantly higher than the coolant temperature in the prior art system. This is because the restrictor/shutoff valves have been placed in the state where they restrict or shut off a portion of flow through the engine block. This flow restriction reduces the heat energy loss from the engine block, thereby allowing the limited amount of flowing TCF to reach a greater temperature. The engine block heat energy loss is reduced in at least two ways. First, less mass of TCF flows through the water jacket so less heat energy is transferred to the TCF where it is lost to the atmosphere. Second, the restricted and/or trapped TCF acts as an insulator around portions of the engine block. Since the limited amount of flowing TCF is at a greater temperature than the prior art coolant, the TCF improves the operating capability of the vehicle interior heater and defroster. Furthermore, since the engine operates at a hotter temperature, engine out exhaust emissions are lower, fuel economy is greater than in the prior art system. Also, sludge is less likely to form in the engine.

Instead of controlling the state of the EETC valve and restrictor/shutoff valves in accordance with the curve shown in FIG. 22A, the EETC valve and restrictor/shutoff valves can be controlled according to separate curves, as shown in FIG. 22B. By employing separate curves, the flow of TCF can be more precisely tailored to achieve a more optimum actual TCF temperature in FIG. 23. At very high ambient air temperatures, the EETC valve should normally be fully open and the restrictor/shutoff valves should normally be fully unrestricted/unblocked. At very low ambient air temperatures, the EETC valve should normally be fully closed and the restrictor/shutoff valves should normally be fully restricted/blocked. However, it may be more desirable for ideal engine operating conditions to keep one or both of the restrictor/shutoff valves open in mid-temperature ranges, even after the EETC valve has closed. FIG. 22B shows a region 3 wherein these dual states are achieved. In one embodiment of the invention, a TCF temperature differential of about 15 degrees Fahrenheit is employed.

A system employing the curves shown in FIG. 22B will allow the restrictor/shutoff valve(s) to open or unblock the TCF passageway shortly before the EETC valve opens flow to the radiator at a given ambient air temperature. One advantage of this system is that the temperature of the TCF circulating through the engine block's water jacket will become more homogeneous by opening the restrictor/shutoff valves before the EETC valve is opened, thereby improving the overall accuracy of the system in determining when to open the EETC valve. This is because the total TCF mass will be heated to the desired programmed temperature (as determined by the EETC valve curve) before TCF flow is introduced to the radiator. Time delays can be incorporated to prevent the EETC and/or restrictor valve from oscillating between open and closed positions. Alternately, additional curves could be utilized as will be discussed below.

When the restrictor/shutoff valves are in their restricted or blocked position, the temperature TCF in different portions of the engine block can vary significantly. For example, if the fluid in the outer water jacket passageways is dead headed, it will be colder than the fluid in the inner water jacket passageways. When the restrictor/shutoff valves are opened, the hotter and colder fluids immediately begin to mix, thereby reducing the variation in temperature of the TCF in different portions of the water jacket. Thus, as the TCF continues to heat up, the measured TCF temperature, which determines when to open the EETC valve, will be more accurate.

Some engines, like the GM 3800 V-6 engine, utilize a random pattern of openings to connect the waterjackets between the engine block and the cylinder head. Accordingly, the restrictor/shutoff flow control valves must be properly located so as to restrict or block the continuous flow path between the block and the cylinder head so as to maintain a mass of TCF in the block for faster warm up. Alternately, the engine waterjackets themselves could be designed to operate with the EETC valve to provide additional efficiency. An example of such an embodiment is illustrated in FIGS. 44A and 44B, and designated generally as 1400, wherein two individual waterjacket flow paths are incorporated into the engine, 1402 and 1404, respectively. The waterjackets are schematically shown external to the associated engine components for sake of clarity. However, it should be understood that the waterjackets are, preferably, integral with the engine components. One flow path 1402 would be the normal waterjacket path from the water pump 1406 through the engine block 1408 into the cylinder head 1410 and intake manifold 1412. The second waterjacket 1404 would flow from the water pump 1406 directly to the cylinder head 1410, intake manifold 1412, heater/defroster circuit (not shown), and engine oil pan 1414, by-passing the engine block 1408. An EETC valve as described hereinabove or, alternately, a rotary valve 1416 would be incorporated to direct the TCF between the two waterjackets depending on the operational state of the engine.

FIG. 44A illustrates the novel system during engine warm-up. The EETC valve 100 is in its closed position, inhibiting TCF flow to the radiator. Hence, substantially all the TCF is directed to the intake manifold and the oil pan 1414 where it exchanges heat with the oil. The TCF is then directed through the water pump 1406 to a second control valve 1416. Control valve 1416, during warm-up, is in a state wherein preferably all the TCF is directed along the by-pass waterjacket 1404 into the cylinder head 1410 and intake manifold. Waterjacket 1402 is, effectively, blocked, thereby trapping a mass of TCF within the engine block. The TCF flowing through the by-pass waterjacket 1404 into the cylinder head will quickly increase in temperature since there is less mass being exposed to the heat of the cylinder heads. Meanwhile, the TCF trapped in the engine block 1408 will function as an insulator, preventing unneeded heat loss and, consequently, resulting in lower exhaust emissions, better fuel economy and quicker heater/defroster capabilities. Restrictor valves may be incorporated between the cylinder head 1410 and the intake manifold 1412 (similar to FIGS. 14E and 14F). These valves may be actuated to prevent or reduce TCF flow therethrough when the TCF reaches a predetermined temperature which may have an adverse effect on the combustion of the fuel, as described above. Alternately, and more preferably, the EETC valve 100 controls the TCF flow into the intake manifold, as well as, the oil pan.

Restrictor valves (not shown) may also be incorporated between the engine block 1408 and the cylinder head 1410 to inhibit the flow of TCF between the two during warm-up. However, the continuous flow of the TCF through the by-pass water jacket 1404 will obstruct the passage of TCF from engine block 1408 to the cylinder head 1410. Accordingly, depending on the design of the waterjacket, restrictor valves may not be required.

The last portion of the Background of the Invention describes that the prior art technique of controlling internal engine temperature solely by controlling engine coolant temperature is crude and inaccurate. The Background of the Invention also describes how this technique often causes overheating or overcooling of the engine, even when the coolant temperature is maintained at a predesired level. The invention described in FIGS. 19–23 significantly reduces the amount of engine overheating and overcooling.

To even more accurately control the internal engine temperature, the invention described in FIGS. 19–23 may be modified to employ two or more different curves for controlling the state of the EETC valve and the restrictor/shutoff valves. The appropriate curve is selected by comparing the actual engine oil temperature to a preselected engine oil temperature value. In the preferred embodiment of the invention, the preselected value is a temperature associated with optimum internal engine performance (e.g., the temperature which maximizes fuel economy and minimizes engine out exhaust emissions). In one embodiment of the invention, this value may be fixed. However, in the preferred embodiment of the invention, this value is related to the current ambient air temperature.

Selecting between different curves further improves the performance of the engine temperature control system because the state of the EETC valve and restrictor/shutoff valves becomes more responsive to the actual internal engine temperature (as measured by engine oil temperature) rather than when only a single curve is employed for controlling each of the valves.

Figure 24:
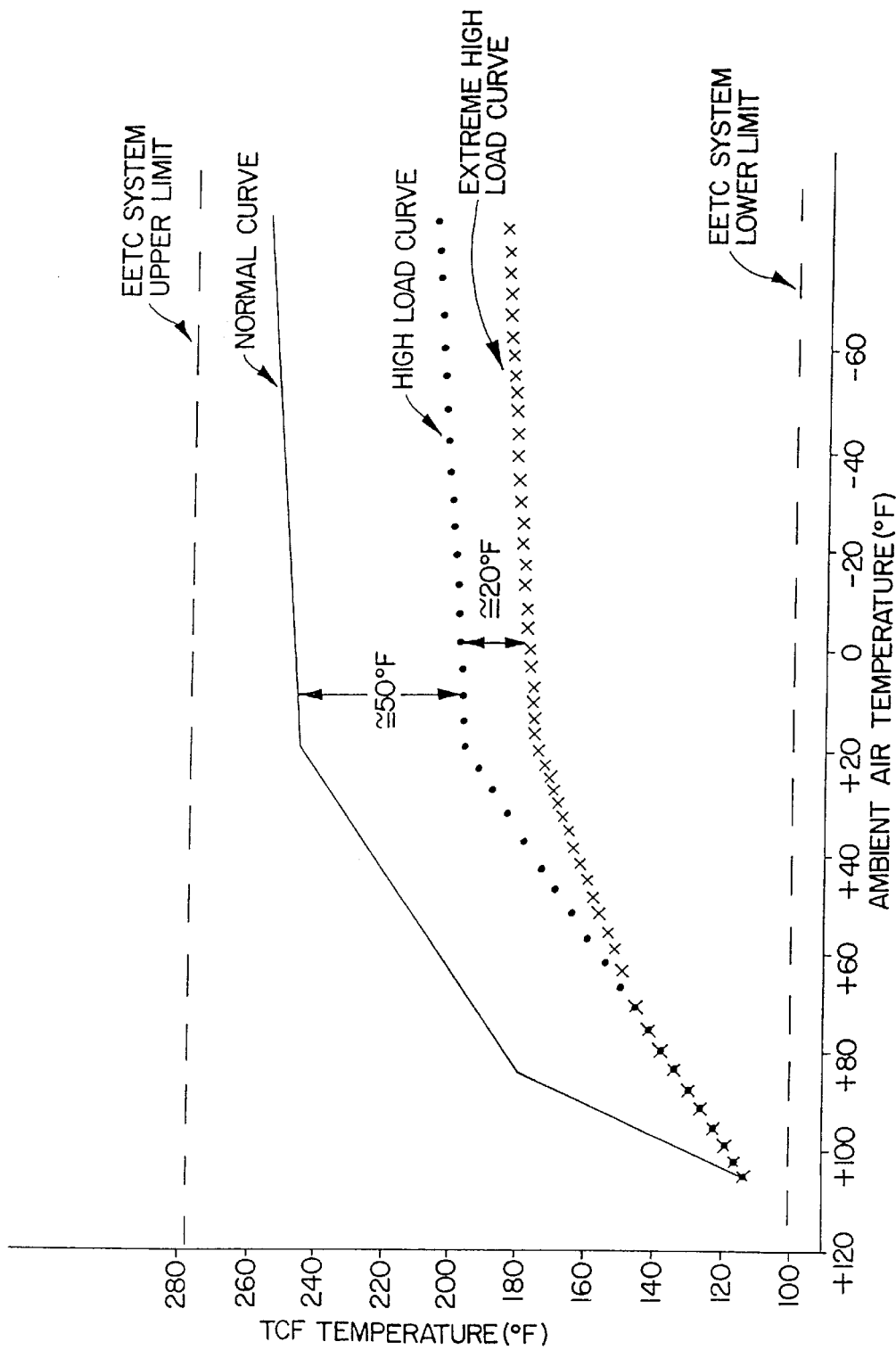
FIG. 24 is a graph showing the state of a valve in the invention at selected temperature control fluid and ambient air temperatures for normal (low) engine load and high engine load conditions.

FIG. 24 is generally similar to FIG. 20, except that FIG. 24 shows three EETC valve curves, a solid line "Normal Curve", a dotted "High Load Curve", and an Xed line "Extreme High Load Curve." The "Normal Curve" is generally similar to the curve shown in FIG. 20. However, the curves in FIG. 24 are based upon empirical data for the GM 3800 transverse engine. Thus, the "Normal Curve" in FIG. 24 differs slightly from the curve shown in FIG. 20, which is not necessarily optimized for that engine. To simplify the explanation of the multiple curve embodiments, the valve states and regions are not labelled in the multiple curve figures.) The state of the EETC valve is controlled in accordance with the "Normal Curve" whenever the actual engine oil temperature is at or below a preselected engine oil temperature. The state of the EETC valve is controlled in accordance with the heavy load or "High Load Curve" whenever the actual engine oil temperature exceeds the preselected engine oil temperature. The state of the EETC valve is controlled in accordance with the "Extreme High Load Curve" whenever there is a frequent rate of shifting between the "Normal Curve" and the "High Load Curve." Such frequent shifting indicates that the EETC valve is closing too often to maintain the desired engine oil temperature, as further explained below.

The "Normal Curve" will typically be employed when the vehicle is driven under light load conditions. This will occur approximately 80% of the time. The "High Load Curve" will typically be employed during the remaining time. Heavy load conditions may occur when a vehicle is driven at high speed, when the vehicle is fully loaded or pulling a trailer, or while climbing a mountain in hot ambient air temperatures.

The "High Load Curve" may have the same overall general appearance as the "Normal Curve," except that the "High Load Curve" is shifted down from the "Normal Curve" by about 50 degrees Fahrenheit. Likewise, the "Extreme High Load Curve" may have the same overall general appearance as the "High Load Curve," except that the "Extreme High Load Curve" is shifted down from the "High Load Curve" by about 20 degrees Fahrenheit.

The preselected engine oil temperature is a value associated with the preferred operating temperature of the engine. Each engine has an optimum operating temperature for maximizing performance (i.e., horsepower output), maximizing fuel economy and minimizing engine out exhaust emissions. The optimum operating temperature may be different for each of these parameters, although the optimum temperature for maximizing fuel economy tends to be similar to that for minimizing emissions. The examples described herein focus primarily on fuel economy and emissions, not engine performance. Thus, the preselected value described herein is one which optimizes internal engine performance as defined by fuel economy and engine out exhaust emissions. However, at low temperatures, a system with the EETC valve and restrictors should also generate increased engine horsepower.

In one embodiment of the invention, this value is fixed. That is, a single optimum engine oil temperature is selected which results in the greatest fuel economy and the lowest engine out exhaust emissions for the most frequently encountered ambient air temperature. In this embodiment, the actual engine oil temperature (as measured in the oil pan) is compared to the preselected optimum value. The result of the comparison is employed to select the appropriate curve, as described above.

In the preferred embodiment of the invention, the preselected value is not fixed. Instead, it is dependent upon the current ambient air temperature. The Background of the Invention explains that as the ambient air temperature declines, the internal engine components lose heat more rapidly to the environment. Also, there is an increased cooling effect on the internal engine components from induction air. To counter these effects and thus maintain the internal engine components at the optimum operating temperature, the engine oil should be hotter in cold ambient air temperatures than in hot ambient air temperatures. The optimum engine oil temperature can be plotted against the ambient air temperature based on empirical data and known engine specifications. To determine the preselected optimum value for use in the comparison, the current ambient air temperature is measured and the optimum engine oil temperature is selected based on the value indicated on the plot.

FIG. 25 shows one such empirically determined plot for a GM 3800 transverse engine. The plot shows that the optimum engine oil temperature increases as the ambient air temperature decreases. The plot in FIG. 25 may be shifted upwards or downwards when the vehicle is operating in high or low altitudes. Empirical testing of each engine in high and low altitude conditions is required to determine whether the plot will be shifted upwards or downwards. Of course, the plot will be slightly different if a specific parameter is more important (e.g., fuel economy, engine out exhaust emissions, engine performance). Hence, it is possible to vary the curve shown in FIG. 25 during a typical engine operation. For example, the ECU could receive signals indicating that a large sudden increase in acceleration has been commanded, e.g., significant depression of gas pedal on entering a highway. Accordingly, the curve could be altered or changed to a curve which provides higher performance with less emphasis on fuel economy. Those skilled in the art would readily appreciate the variations to the system that could be practiced within the scope of this invention.

As noted in the Background of the Invention, engine coolant temperature rises more rapidly than the internal engine temperature during engine start-up or warm-up. Since the prior art thermostat is actuated by coolant temperature, it often opens before the internal engine temperature has reached its optimum value, thereby causing coolant in the water jacket to prematurely cool the engine. As described above, exhaust emissions from cold running engines are a major source of air pollution. For example, a delivery truck or taxi operating in a city environment during the cold weather season ordinarily covers short distances at slow speed and makes frequent stops. Accordingly, the engine seldom gets hot enough to drive the water and vapor out of the crankcase resulting in the formation of sludge. In order to prevent the sludge from forming in the oil it is desirable to maintain the engine oil at an elevated temperature. However, prior art thermostats are set to open at about 195 degrees Fahrenheit which, during start-up, corresponds to an engine oil temperature which is considerably below the desirable temperature for preventing sludge. Furthermore, opening the thermostat and permitting low temperature coolant to flow into the engine block slows the heating of the oil. This results in a "slowing" effect in obtaining the optimum engine oil temperature value.

By employing the novel EETC valve and a special curve during engine start-up, the optimum engine oil temperature value is reached sooner than with a prior art thermostatic system. As a result, the engine oil operates at or near its optimum temperature value for a longer period of time during engine operation. Moreover, the maintenance of engine oil at a higher temperature for a longer period of engine operation, almost entirely prevents the formation of sludge in the crankcase and oil pan. The quicker heat-up of the oil also provides improved engine out exhaust emissions during warm-up and in cold environments thereby providing significant environmental benefits. As an added benefit, the quicker heat-up of the engine greatly improves the vehicle heater/defroster responsiveness and effectiveness. An engine operating at or near optimum temperature will also have better fuel economy when compared with a cold running engine. Hence, the EETC and restrictor valves, in combination with the operational curves, provide an optimum system for controlling engine performance. Whenever the engine is started, no heat will escape through the radiator until the TCF temperature reaches its maximum operational level (e.g., approximately 240° F. to 250° F. range) and remains at that temperature level until the engine oil, preferably as measured in the oil pan, reaches and sustains its optimum running temperature.

Figure 26:
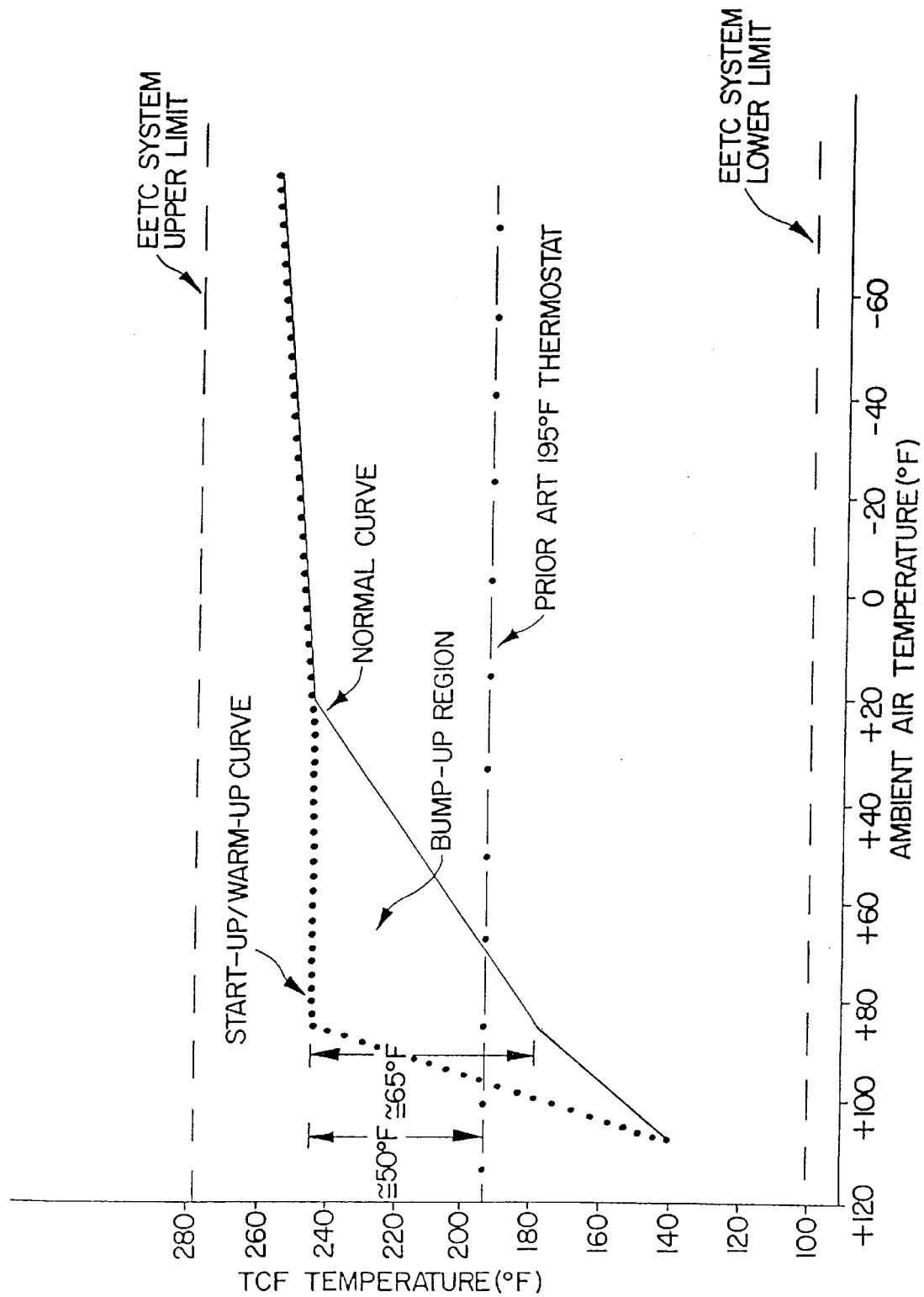
FIG. 26 is a graph showing the state of a valve in the invention at selected temperature control fluid and ambient air temperatures for normal (low) engine load conditions and during start-up/warm-up.

FIG. 26 shows two EETC valve curves, a "Normal Curve" similar to that shown in FIG. 24, and a "Start-Up/Warm-Up Curve." The "Start-Up/Warm-Up Curve" is generally similar to the "Normal Curve," except that the "Start-Up/Warm-Up Curve" has a "bump-up" region from about 110 degrees Fahrenheit to about 20 degrees Fahrenheit. The bump-up region has a maximum bump-up of about 65 degrees Fahrenheit when the ambient air temperature is about 85 degrees Fahrenheit. The bump-up becomes smaller as the ambient air temperature approaches about 20 degrees Fahrenheit. The maximum bump-up is about 50 degrees Fahrenheit compared to the prior art thermostat.

During engine start-up or warm-up, the engine oil will almost always be colder than the optimum temperature. Thus, in most situations, the "Start-Up/Warm-Up Curve" will be employed during initial vehicle operation. Once the engine oil reaches its optimum temperature, as determined by FIG. 25, the system switches to the "Normal Curve." In rare instances, the initial engine oil temperature will be at or greater than the optimum temperature during engine start-up. This may occur if the engine is only shut off for a few seconds, or if the engine is started shortly after a period of heavy loading. In these instances, the EETC valve is operated according to the "Normal Curve", instead of the "Start-Up/Warm-Up Curve".

The inventions illustrated in FIGS. 24 and 26 are preferably employed in the same system. Thus, the EETC valve actually follows at least three curves during vehicle operation, one curve during warm-up/start-up, one curve during normal operation subsequent to warm-up/start-up, and one curve during high load conditions subsequent to warm-up/start-up. A fourth curve for extreme high load conditions may be included, if desired.

Although FIGS. 24 and 26 illustrate the operation of an EETC valve, the restrictor/shutoff valves are also controlled in a similar manner. Preferably, the restrictor/shutoff valves follow their own curves, as shown in FIG. 22B. These curves are shifted down versions of the EETC valve curve. If this feature was shown in FIG. 24, there would be a total of four curves. The extra curve would represent the normal curve for the restrictor/shutoff valves. (There will be no high load curve for the restrictor/shutoff valves because in a high load condition, the restrictor/shutoff valves should be fully retracted.) FIG. 26 would show a total of four curves (excluding the prior art curve). The two extra curves in that figure would represent the normal curve and the startup/warm-up curve for the restrictor/shutoff valves. For simplicity, this feature is merely described, but not illustrated.

Figure 27:
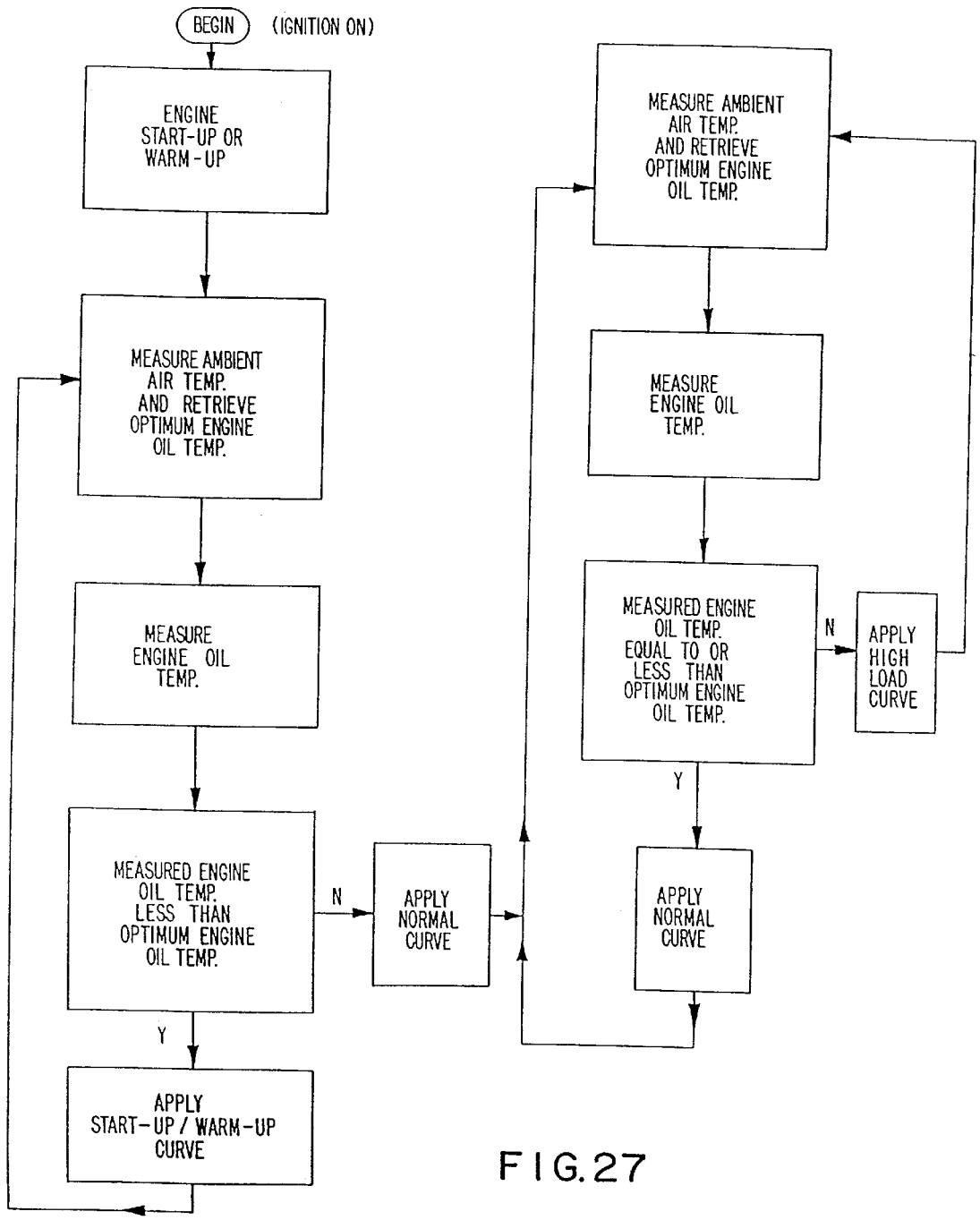
FIG. 27 is a flowchart showing a system for determining valve states based on multiple engine operating conditions shown in FIGS. 24 and 26.

FIG. 27 is a flowchart of the system for employing the startup/warm-up curve, normal curve and high load curve of FIGS. 24 and 26. The steps in the flowchart are fully explained in the discussion above.

Figure 28:
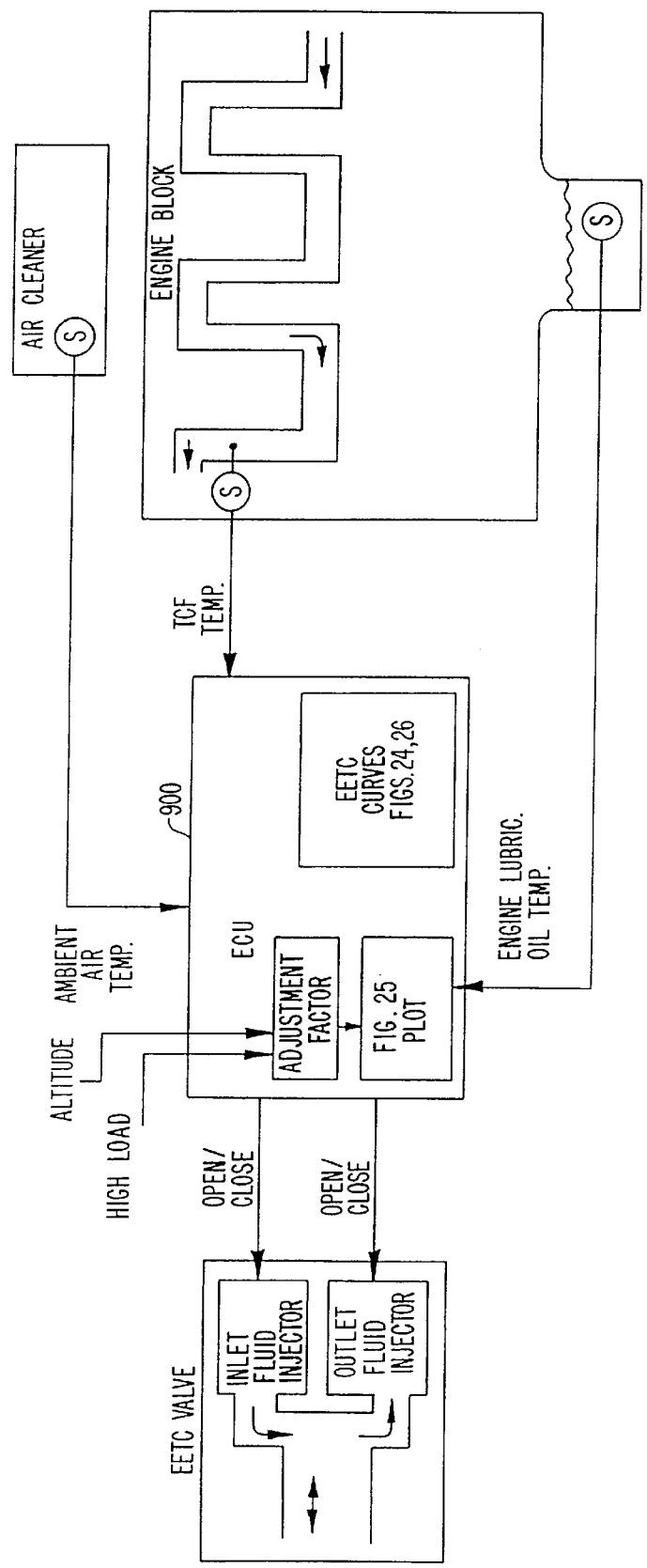
FIG. 28 is a block diagram circuit of the connections to and from an engine computer for controlling the state or position of the valves in the invention according to the multiple engine operating conditions shown in FIGS. 24 and 26.

FIG. 28 shows a block diagram circuit of the connections to and from ECU 900 for controlling the state or position of the EETC valve. FIG. 28 is generally similar to FIG. 17, except that the ECU 900 in FIG. 28 processes the received sensor output signals according to the flowchart in FIG. 27. The ECU 900 may also receive an altitude signal for shifting the plot in FIG. 25 upwards or downwards when the vehicle is operating in a high altitude. FIG. 28 does not show the hydraulic fluid pressure signals and engine oil fluid pressure signal in FIG. 17. However, these features may be optionally included in a full operating embodiment of FIG. 28.

The ECU 900 in FIG. 28 preferably receives sensor output signals from at least the following sources:

1. an ambient air sensor in an air cleaner (clean side) or other suitable location;
2. a temperature sensor at the end of the engine block's temperature control fluid water jacket, or other suitable location;
3. an oil temperature sensor in the engine oil pan;
4. an altitude sensor; and
5. an optional "High Engine Load" sensor.

The ECU 900 utilizes some or all of those sensor signals to generate open/close command signals for the fluid injectors of the EETC valve. Although FIGS. 27 and 28 do not describe the operation of the restrictor/shutoff valves, it should be understood that these valves are also operated in accordance with the same principles as the EETC valve.

An added benefit of a system utilizing the multiple curves discussed above is that the time between oil changes can be increased. Frequent oil changes become necessary when the internal engine temperature is not maintained at its optimum value during a significant percentage of driving time. The multiple curve system reduces this percentage, thereby prolonging the life of the oil.

Figure 29:
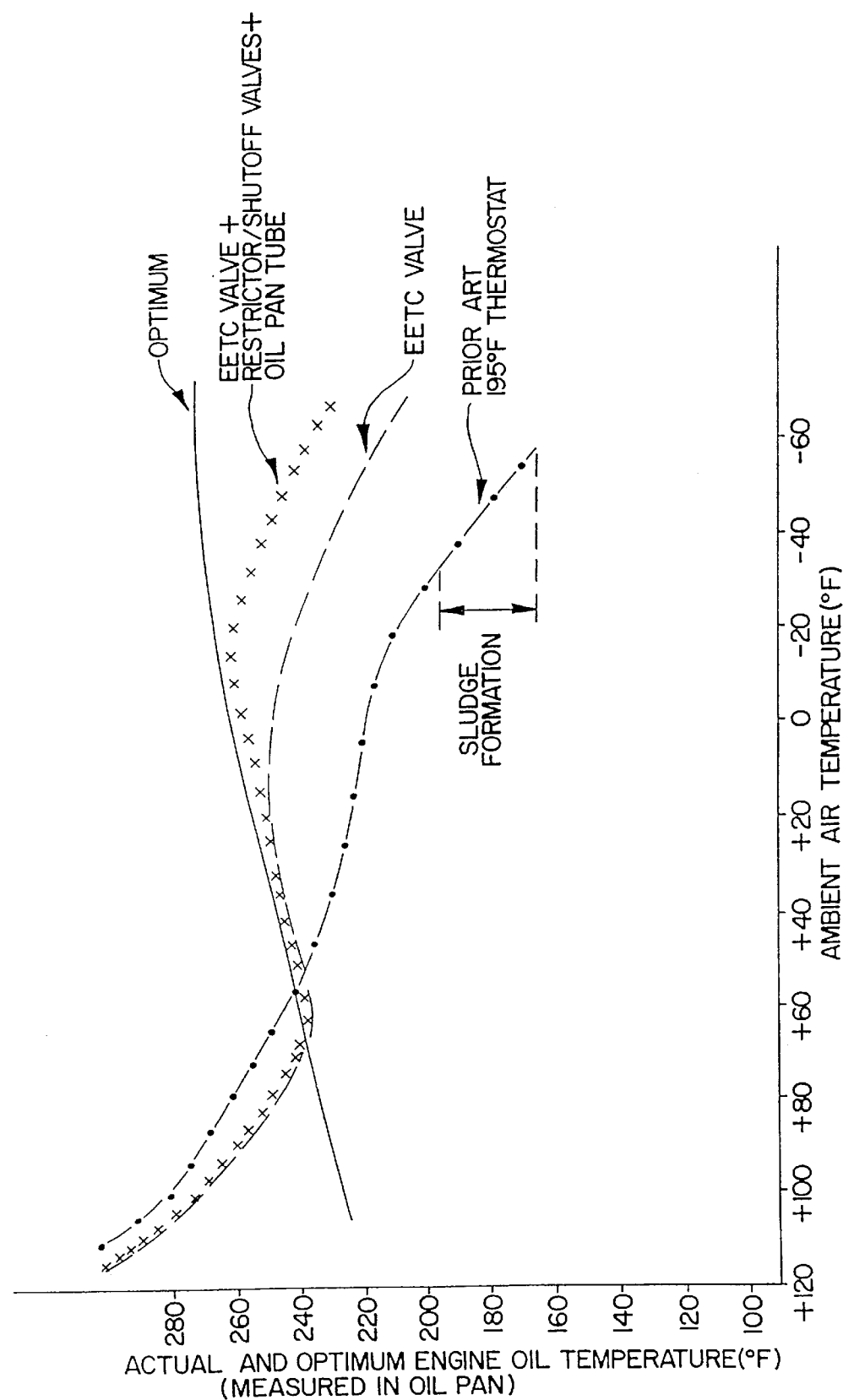
FIG. 29 is a graph of the actual engine oil temperature at selected ambient air temperatures when employing the invention in FIGS. 24–28.

FIG. 29 graphically shows the benefit of operating an engine in accordance with multiple curves. FIG. 29 shows a solid line plot of the optimum engine oil temperature at selected ambient air temperatures. (This is the same plot shown in FIG. 25.) FIG. 29 also shows a dashed line plot of the actual temperature of the engine lubrication oil measured in the oil pan of a GM 3800 transverse engine equipped with an EETC valve when the state of the EETC valve is controlled according to the curves shown in FIGS. 24 and 26. (No "Extreme High Load Curve" is employed in the system which generates the plots in FIG. 29.) For comparison, FIG. 29 also shows a dashed/dotted plot of the actual temperature of the engine lubrication oil when coolant flow to the radiator is controlled by a prior art thermostat calibrated to open at about 195 degrees Fahrenheit.

When the ambient air temperature is less than about 60 degrees Fahrenheit, the EETC valve system significantly out performs the prior art thermostat. That is, the EETC valve system maintains the actual engine oil temperature closer to the optimum value. When the ambient air temperature is greater than about 70 degrees Fahrenheit, the capacity of the radiator limits the ability of the cooling system to maintain the engine oil temperature at its optimum value. Thus, no matter what kind of flow control valve is employed, the engine oil will run hotter than desired. However, as is shown in FIG. 29, an engine incorporating the present invention will still operate closer to the optimum engine curve at higher temperatures compared to the prior art thermostatic system. This is due to the better flow capacity provided by the EETC valve, i.e., 50% more flow capacity than a restrictive thermostat. The EETC valve of the present invention also opens up sooner when operating in hotter temperatures than the thermostatic system and, therefore, maintains the engine at the coolest possible operating temperature (as shown in FIG. 24).

When the ambient air temperature is in a sub-zero degree Fahrenheit range, a prior art thermostat allows engine oil temperature to dip into a sludge forming range of temperatures. This occurs because the coolant temperature may reach a level sufficient to cause the prior art thermostat to open, even when the internal engine temperature is significantly below its optimum operating value.

FIG. 29 also shows an Xed line plot which represents actual engine oil temperature in a system employing an EETC valve, restrictor/shutoff valves and an oil pan tube for delivering heat to the engine oil. Such a system maintains actual engine oil temperature very close to the optimum value, even in sub-zero Fahrenheit ambient air temperatures. In ambient air temperatures above about zero degrees Fahrenheit, the plot of such a system generally follows the plot of a system employing only the EETC valve.

Figure 30:
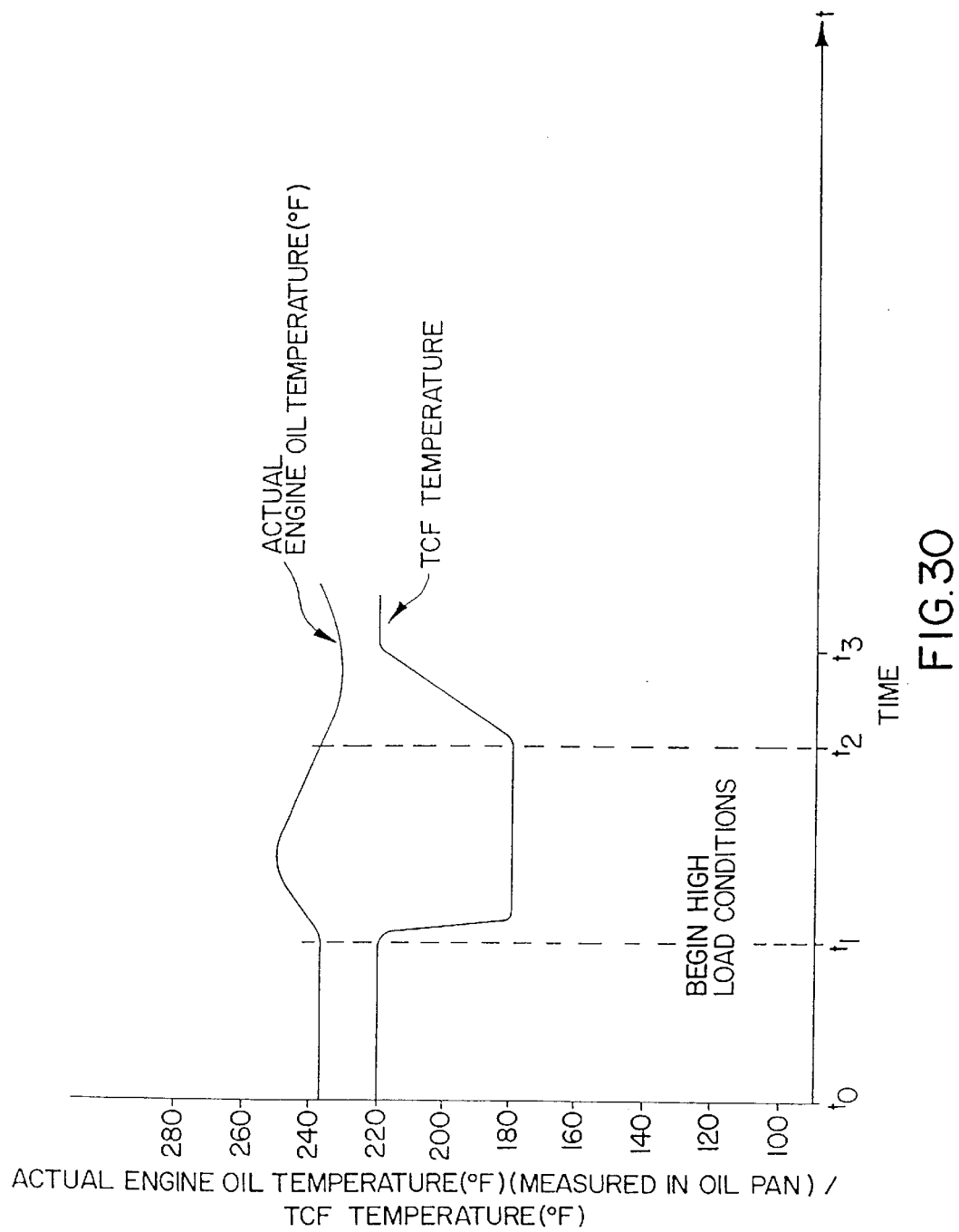
FIG. 30 shows a trend line of temperature control fluid temperature and oil temperature during vehicle operation when employing the invention in FIGS. 24–28.

FIG. 30 shows a trend line of TCF temperature and oil temperature during vehicle operation (and after engine start-up/warm-up). In this example, the ambient air temperature is about 40 degrees Fahrenheit. According to the FIG. 25 plot, the optimum engine oil temperature at this temperature is about 240 degrees Fahrenheit.

From time $t_0$ to $t_1$, the engine is operating under low load conditions and thus is following the "Normal Curve" in FIG. 24. The actual TCF temperature is about 220 degrees Fahrenheit. The EETC valve is closed, as dictated by the "Normal Curve." The actual engine oil temperature is about 238 degrees Fahrenheit, as expected from FIG. 29.

At time $t_1$, the vehicle engine begins to experience high load conditions. Almost immediately, the engine oil heats up and exceeds the optimum value in FIG. 25. Accordingly, the system shifts to the "High Load Curve" in FIG. 24. This causes the EETC valve to open, thereby allowing the TCF to flow to the radiator. Between times $t_1$ and $t_2$, the TCF temperature drops quickly and stabilizes at a lower value of about 180 degrees Fahrenheit. During this time period, the lower TCF temperature causes the engine oil temperature to slowly drop after its quick rise. At time $t_2$, the engine oil temperature returns to 238 degrees Fahrenheit and the system shifts back to the "Normal Curve." This causes the EETC valve to close. Between times $t_2$ and $t_3$, the TCF temperature rises slowly. Between times $t_2$ and $t_3$, the engine oil temperature may continue to drop slowly and then rise due to a lag time until the warmer TCF begins to heat the oil. Eventually, the engine oil temperature stabilizes at 238 degrees Fahrenheit.

After time $t_3$, the trend lines repeat themselves so long as the high load condition is still present. Thus, the system cycles between the "Normal Curve" and the "High Load Curve." If the system is equipped with the optional "Extreme High Load Curve," the frequency of cycling is tracked. If the frequency is too high, the system begins to switch between the "Normal Curve" and the "Extreme High Load Curve," and ignores the "High Load Curve." If the high load condition ceases, the system returns to the "Normal Curve" and the engine oil and TCF temperatures stabilize at the time $t_0$ values.

Although the multiple curve embodiments rely on engine oil temperature to determine when to switch curves, other internal engine temperature parameters may be employed instead and are within the scope of the invention. For example, a thermistor embedded in the engine block can be employed to obtain a more accurate reading reading of the actual engine operating temperature.

Figure 31A:
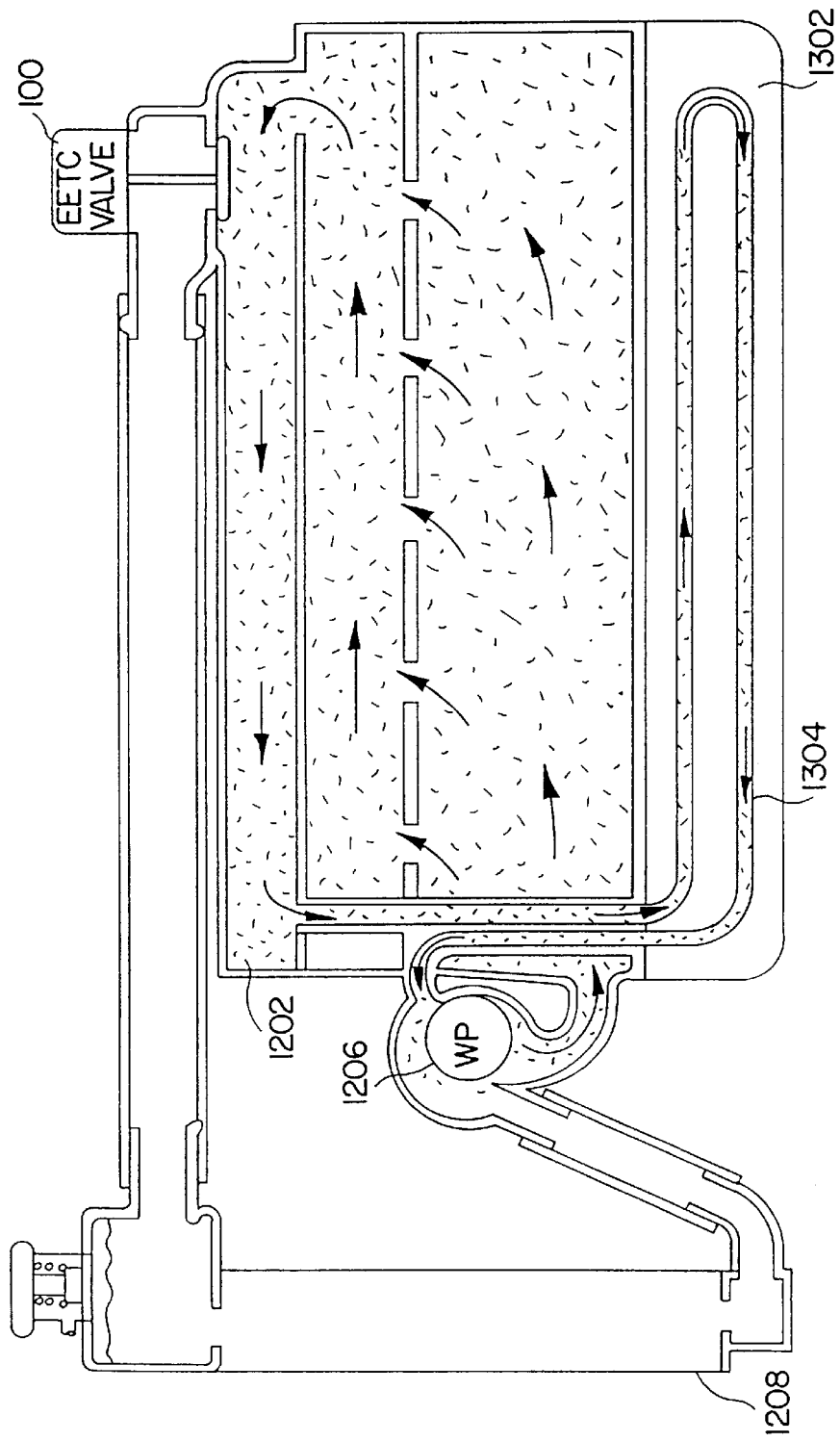
FIG. 31A is an idealized diagrammatic view of temperature control fluid flow paths through an engine including the intake manifold and the oil pan during warm-up.
Figure 31B:
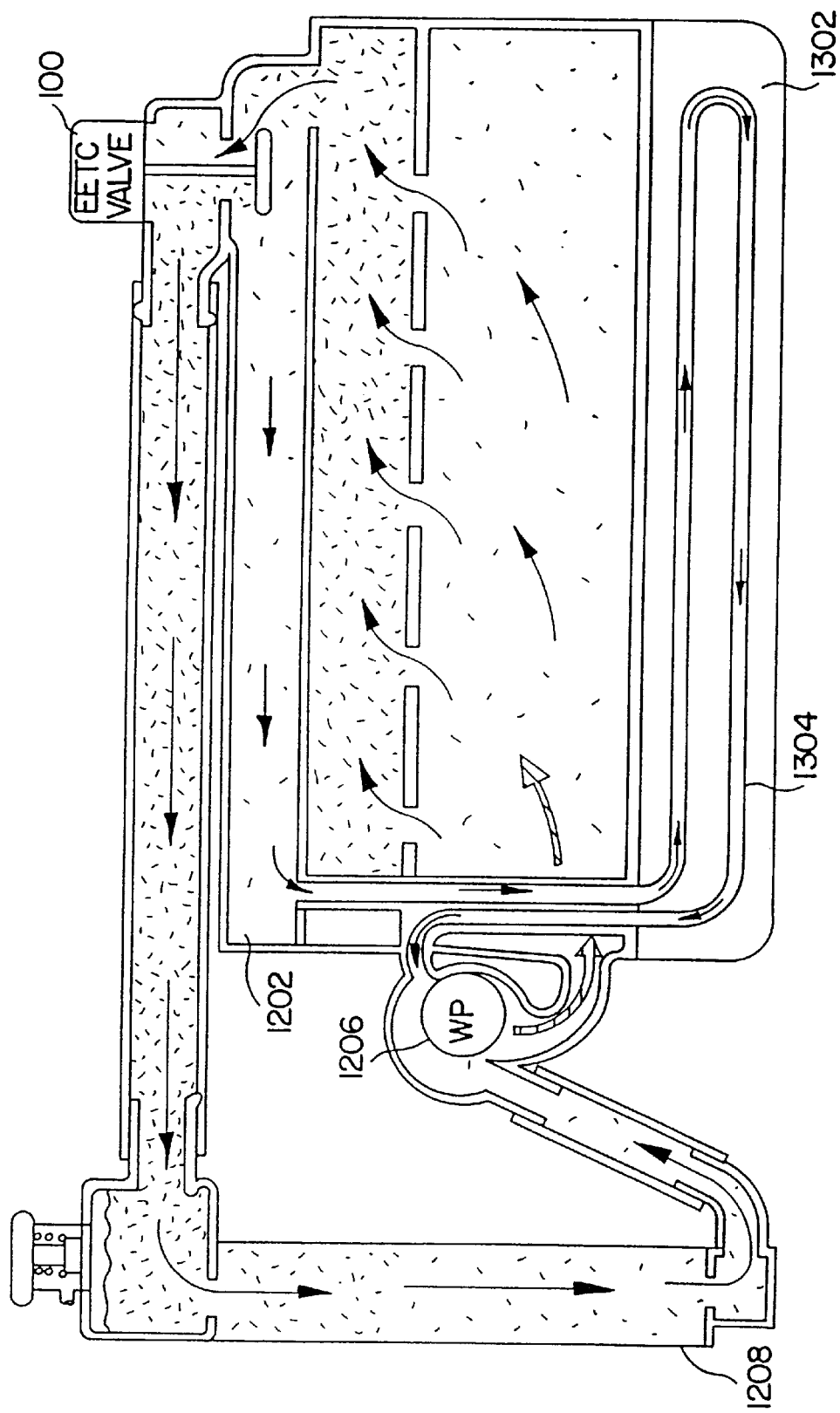
FIG. 31B is an idealized diagrammatic view of temperature control fluid flow paths through an engine including the intake manifold and the oil pan during normal operation with the EETC valve partially open.

FIGS. 31A and 31B illustrates a novel optional oil heating feature for the system described in FIGS. 24–30. FIG. 31A is an idealized diagrammatic view of the TCF circulation flow path through a GM 3800 V6 transverse engine equipped with an EETC valve in the closed state. FIG. 31A is similar to prior art FIG. 40, except that the prior art thermostat 1200 in FIG. 40 is replaced with EETC valve 100. Also, in FIG. 31A, the outlet of the water jacket 1202 does not flow directly into the inlet of the water pump 1206, as in FIG. 40. Instead, the outlet of the water jacket 1202 flows into TCF flow path 1300. This configuration was previously discussed with respect to FIGS. 14A through 14F. Hence, TCF flow path 1300 corresponds to passageway 216 in those figures. The TCF flow path 1300 flows through oil pan 1302 and into the inlet of the water pump 1206 in a series manner. Thus, preferably all of the TCF which leaves the water jacket 1202 flows through the oil pan 1302 before it is returned to the water pump 1206 for recirculation. The TCF flow path 130 includes heat conductive tube 1304 which is similar to the heat conductive tube 220 shown in FIG. 18. For illustration purposes only, FIG. 31 exaggerates the length of the conductive tube 1304 and the size of the oil pan 1302.

In operation, preferably all of the TCF at the outlet of the water jacket 1202 flows through the heat conductive tube 1304 whenever the EETC valve 100 is closed. During engine start-up/warm-up, the EETC valve 100 is usually closed and the internal engine temperature is most likely colder than the optimum value. Since the TCF temperature in the water jacket 1202 rises more rapidly than engine oil temperature during engine start-up/warm-up, heat energy from the hotter TCF in the conductive tube 1304 is transferred to the engine oil in the oil pan 1302, thereby promoting faster engine warm-up.

FIG. 31B illustrates the temperature control system of FIG. 31A when the EETC valve 100 is in the open position. Substantially all of the TCF is transferred through the valve to the radiator 208. However, a small amount of TCF may still transfer through the intake manifold to the oil pan if the EETC valve is designed so that it does not completely block the flow therethrough.

Figure 32A:
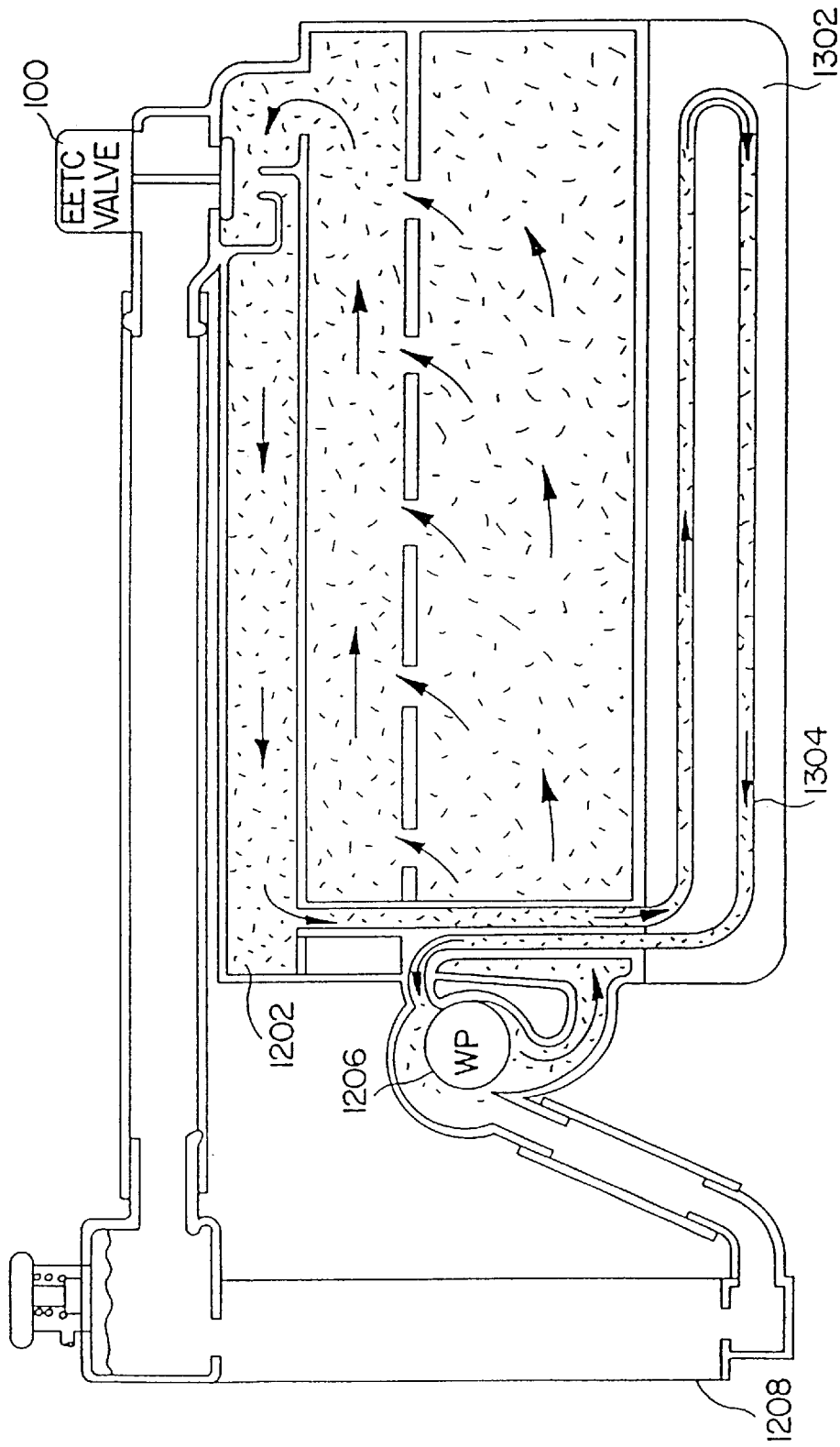
FIG. 32A is an idealized diagrammatic view of a second embodiment showing the temperature control fluid flow paths through an engine including the intake manifold and the oil pan during warm-up.

FIGS. 32A and 32B illustrate an alternate embodiment of the temperature control system wherein the TCF can be utilized to cool the engine oil. FIG. 32A is an idealized diagrammatic view of the TCF circulation flow path through a GM 3800 V6 engine equipped with an EETC valve in the closed state and is similar to FIG. 31A. FIG. 32B illustrates the valve in its open state which completely obstructs the passage of the TCF into the intake manifold and the oil pan. Accordingly, all of the TCF will flow through the radiator 208 in this state.

Turning again to FIG. 30, when the engine experiences high load conditions and the engine oil exceeds its optimum value, the system shifts to the "High Load Curve." If the EETC valve 100 is not already open, it will most likely open, resulting in a relatively quick and sharp drop in the TCF temperature. If the TCF in the TCF flow path 1300 is cooler than the engine oil, the TCF circulating through the conductive tube 1304 will draw heat away from the engine oil, promoting engine oil cooling. This will shorten the time period between $t_1$ and $t_2$ in FIG. 30.

There may be instances when the EETC valve 100 is open and the engine oil temperature is already at or near the optimum value. In this instance, flow through the flow path 1300 is not desirable because it will cause unnecessary cooling of the engine oil. Although the flow path 1300 in FIG. 32A does not include a flow control valve, such a valve may be employed to ensure that flow only occurs when the engine oil temperature exceeds the optimum value.

An added benefit of the extra flow path 1300 is that the heat energy in the TCF transfers to the oil pan 1302 when the engine is off. This helps to keep oil temperatures above sludge forming conditions when the vehicle is not in use. The system shown in FIGS. 32A and 32B also will result in a more uniform temperature differential throughout the entire system, thereby resulting in a lower temperature of the TCF than the oil.

The EETC valve described herein can be employed with one or more restrictor/shutoff flow control valves to improve the temperature control function of the system over that which would be achieved when employing only the EETC valve, with or without its optional oil pan heating feature. As noted above, the restrictor/shutoff flow control valves 300 and 400 shown in FIG. 14A can be any type suitable for the task. However, one type of novel restrictor/shutoff flow control valve particularly suitable for this task is disclosed in FIGS. 33–39. The novel valve, labelled as 1000 in the figures, shares many characteristics with the flow-through piston type EETC valve 600 described with respect to FIG. 11, including the following similarities:

1. The state or position of the flow control valve 1000 is controlled by the position of a reciprocating piston mechanism.

2. The position of the reciprocating piston mechanism is controlled by pressurized hydraulic fluid in a valve chamber and a biasing spring.

3. The hydraulic fluid enter and exits the valve chamber through a pair of hydraulic fluid injectors.

Figure 33:
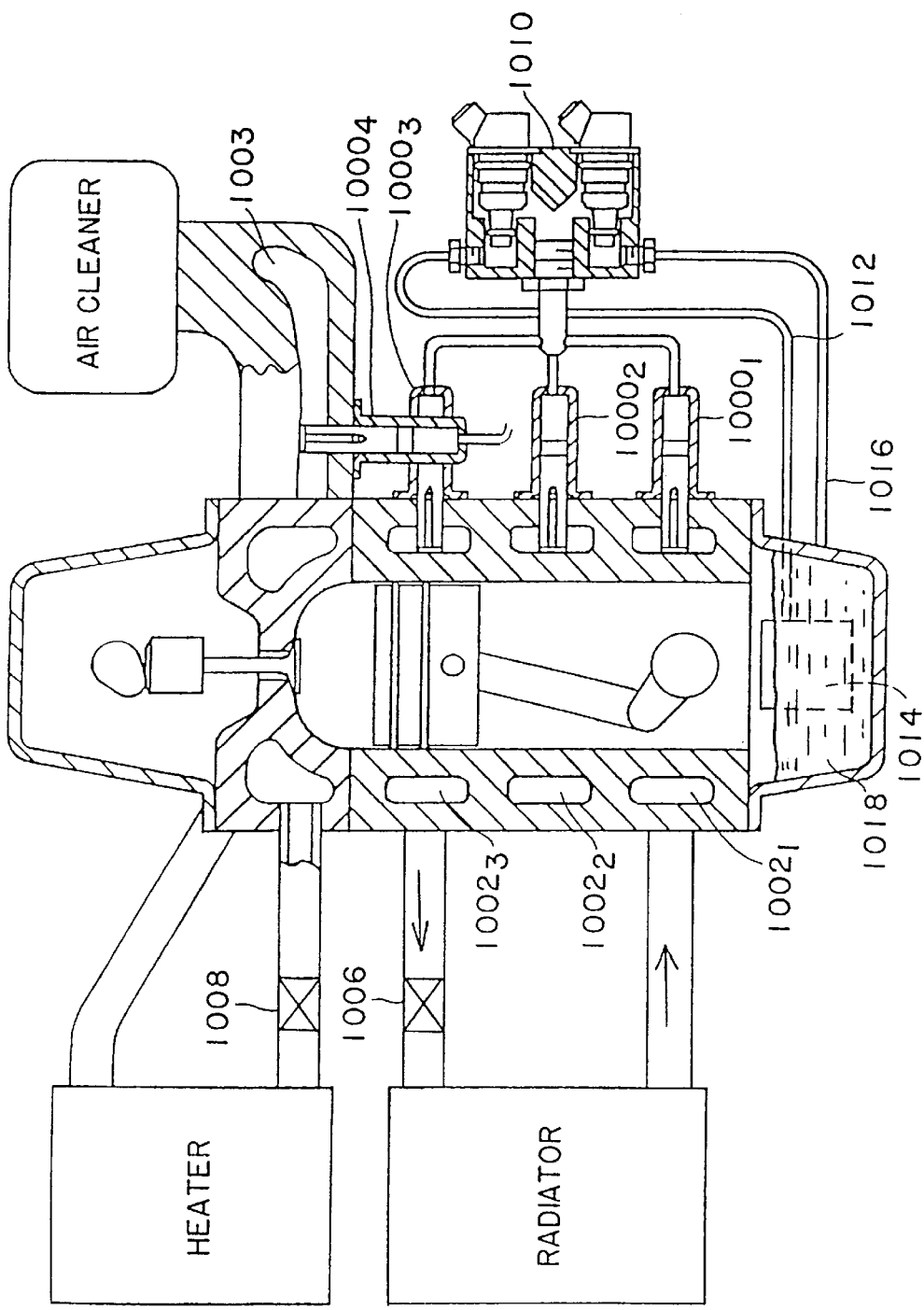
FIG. 33 is a diagrammatic sectional view of an engine block showing restrictor/shutoff flow control valves in accordance with the invention.

FIG. 33 is a diagrammatic sectional view of a typical prior art four cylinder engine block showing three flow control valves $1000_1$, $1000_2$ and $1000_3$ which restrict TCF flow through portions of engine block TCF passageways $1002_1$, $1002_2$ and $1002_3$, respectively, and one flow control valve $1000_4$ which blocks TCF flow through intake line 1003 associated with an intake manifold. (The outtake line associated with the intake manifold is not visible in this view.) The manner in which a flow control valve 1000 blocks flow, as opposed to restricting flow, is best illustrated with respect to FIG. 38, described below. In one embodiment of a system shown in FIG. 14A, the flow control valve 300 is similar to the flow control valve $1000_4$, whereas the flow control valve 400 is equivalent to one of the flow control valves $1000_1$, $1000_2$ and $1000_3$.

FIG. 33 also shows EETC valve 1006 for controlling flow of the TCF to the radiator, and heater control valve 1008 for controlling flow of the TCF to the heater core. The state or position of the EETC valve 1006 and the flow control valves $1000_1$, $1000_2$, $1000_3$ and $1000_4$ are controlled by hydraulic fluid injector pairs 1010, as described above. FIG. 33 only shows one pair of hydraulic fluid injectors 1010 which simultaneously controls the state of the flow control valves $1000_1$, $1000_2$ and $1000_3$. The state of the flow control valve $1000_4$ may be controlled by a separate pair of injectors 1010 (not shown), or may be controlled by the injectors associated with the EETC valve 1006 (not shown). The pair of injectors 1010 shown in FIG. 33 includes fluid inlet tube 1012 connected to a source of pressurized hydraulic fluid 1014 and fluid outlet tube 1016 connected to hydraulic fluid reservoir 1018. In this embodiment, the source of pressurized hydraulic fluid 1014 is engine lubrication oil from an oil pump, whereas the hydraulic fluid reservoir 1018 is the oil pan.

Figure 34:
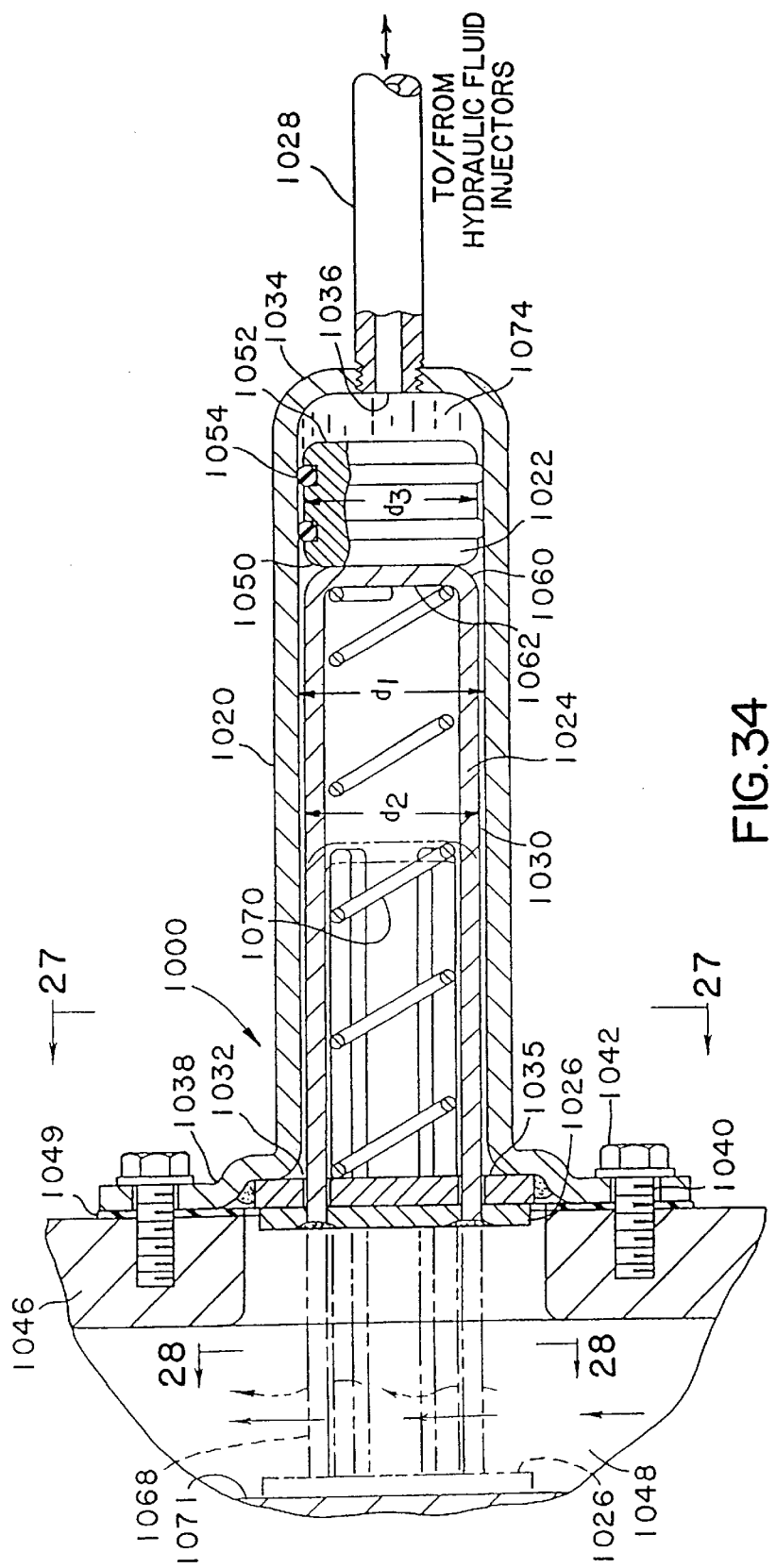
FIG. 34 is a sectional side view of the restrictor/shutoff valve mounted to a fluid passageway.
Figure 35:
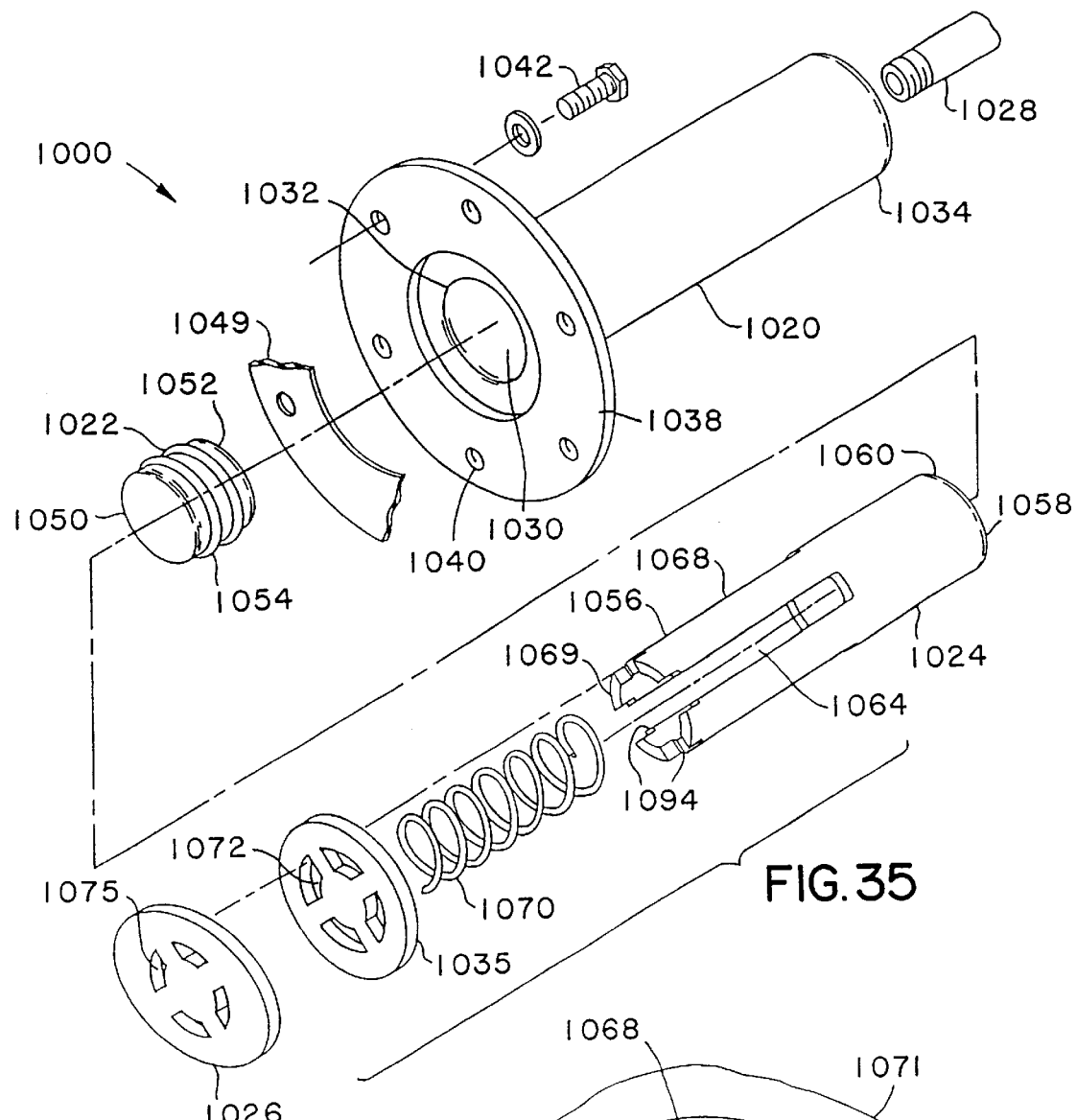
FIG. 35 is an exploded view of the parts of the restrictor/shutoff valve in FIG. 34.

FIGS. 34 and 35 show a preferred embodiment of the restrictor/shutoff valve 1000. FIG. 34 shows a sectional side view of the valve 1000 mounted in a TCF passageway. The solid lines in FIG. 34 show the valve 1000 in a first position which is associated with a valve "open" or unrestricted/unblocked state. FIG. 34 also shows, in phantom, the valve 1000 in a second position which is associated with a valve "closed" or restricted/blocked state. FIG. 35 shows an exploded view of the parts of the valve 1000. For clarity, FIGS. 33, 34 and 35 are described together.

The restrictor/shutoff valve 1000 includes, among other parts, valve mechanism casing or housing 1020, piston 1022, reciprocating shaft 1024 and piston valve seal or plug 1026. An inlet/outlet tube 1028 attached to the rear of the housing 1020 is in fluid communication with the pair of the hydraulic fluid injectors 1010 associated with the valve 1000. If the valve 1000 is not controlled by the remote pair of injectors .1010 (as shown in FIG. 33), the injectors 1010 are part of the valve 1000 itself. The pair of hydraulic fluid injectors 1010 are similar to the injectors 18, 20. The housing 1020 is a generally cylindrical solid structure having a bore 1030 therethrough. The bore 1030 has a generally uniform inner diameter of $d_1$. The housing bore 1030 is partially closed at left end or near end 1032 by circular plate 1035, described in more detail below. Circular mounting flange 1038 extends perpendicularly outward from the outer circumferential walls of the housing's near end 1032. The mounting flange 1038 includes a plurality of holes 1040 therethrough for receiving a series of bolts 1042 which attach the valve 1000 to solid wall 1046 surrounding first passageway 1048. Gasket 1049 is disposed between the mounting flange 1038 and the outer facing surface of the wall 1046. When the valve 1000 is employed in the environment described herein, the solid wall 1046 is either part of an engine block or intake manifold surrounding a TCF passageway.

The housing bore 1030 is closed at right end or far end 1034, except for opening 1036 therethrough. One end of the inlet/outlet tube 1028 is attached to the housing opening 1036, thereby placing the hydraulic fluid injectors 1010 in fluid communication with the housing bore 1030.

The piston 1022 and reciprocating shaft 1024 are disposed in the bore 1030 and have generally uniform outer diameters of $d_2$ and $d_3$, respectively. Diameters $d_2$ and $d_3$ are generally equal, and are slightly less than $d_1$, thereby allowing the piston 1022 and reciprocating shaft 1024 to fit tightly in the bore 1030. The piston 1022 includes front or left outer facing surface 1050 and rear or right outer facing surface 1052. The piston 1022 also includes grooves around its outer circumferential surface for seating O-rings 1054 therein. It is also contemplated that the O-rings 1054 could be configured similar to seal 136 and O-ring 138 shown in FIG. 13A. The reciprocating shaft 1024 is a generally cylindrical hollow solid structure which is open at left end or near end 1056 and closed at right end or far end 1058. The shaft's far end 1058 has an outer facing surface 1060 and an inner facing surface 1062. The outer facing surface 1060 lies adjacent to, and in contact with the piston's left outer facing surface 1050. The shaft 1024 includes four cut-outs along a near end or leftmost portion of its longitudinal axis. One cut-out 1064 is labelled in FIG. 35. The cut-outs 1064 are equally spaced around the shaft's outer circumference. In this manner, the cut-outs 1064 form four fingers 1068 from that portion of the shaft's outer circumferential wall. Each finger 1068 has an end surface 1069 with shouldered edges 1094.

Biasing spring 1070 is disposed inside of the hollow reciprocating shaft 1024. One end of the spring 1070 lies against the shaft's inner facing surface 1062 and the other end of the spring 1070 lies against an inner facing surface of the circular plate 1035.

The plate 1035 includes four cut-outs 1072 therethrough which have the same general shape as the shaft finger's end surfaces 1069 as they would appear without the shouldered edges 1094. The location of the cut-outs 1072 match the location of the fingers 1068 when the finger's end surfaces 1069 are adjacent to the plate 1035. Furthermore, the cut-outs 1072 are slightly larger than the finger's end surfaces 1069 (without the shouldered edges 1094) so that the fingers 1068 can reciprocally slide through the cut-outs 1072, and thus through the plate 1035.

The piston valve plug 1026 also includes four cut-outs 1075 therethrough which also have the same general shape as the shaft finger's end surfaces 1069. The location of the cut-outs 1075 match the location of the fingers 1068 when the finger's end surfaces 1069 are adjacent to the plug 1026. The cut-outs 1075 are slightly larger than the end surfaces 1069 to allow the end surfaces 1069 to fit snugly therein. The cut-outs 1075 function as attachment locations for welding or mechanically staking the fingers 1068 to the plug 1026.

During valve assembly, the shaft's fingers 1068 are slid through the plate 1035. Then, the end surfaces 1069 of the shaft's four fingers 1068 are welded or mechanically staked to the piston valve plug 1026 at the cut-out locations 1075. The shouldered edges 1094 of the finger' end surfaces 1069 prevent the fingers 1068 from pushing through the cut-outs 1075 and facilitate attachment of the fingers 1068 to the plug 1026.

The valve 1000 is biased in the first position (i.e., valve "open" or unrestricted/unblocked state) by the biasing spring 1070. In this position, the force of the spring 1070 biases the reciprocating shaft 1024 in its rightmost position within the housing bore 1030. The length of the shaft 1024 and valve housing 1020 is such that in the first position, the shaft 1024 is fully retracted into the housing 1020 and the inner facing surface of the plug 1026 lies adjacent to the outer facing surface of the housing plate 1035, and in the second position, the outer facing surface of the plug 1026 lies adjacent to far wall 1071 of the first passageway 1048. Also, in the first position, the piston 1022 is in its rightmost position within the bore 1030, and in the second position, the piston 1022 is in its leftmost position within the bore 1030. In the embodiment shown in FIG. 34, the bore 1030 includes a small amount of space, labelled as chamber 1074, between the piston's right outer facing surface 1052 and the bore's far end 1034.

To move the valve 1000 from its first position to its second position, the valve associated with the inlet fluid injector of the pair of hydraulic fluid injectors 1010 is opened in response to a control signal from an ECU (not shown). Simultaneously, the valve associated with the outlet fluid injector of the pair of fluid injectors 1010 is closed. Pressurized hydraulic fluid from the fluid inlet tube 1012 flows through the inlet fluid injector of the pair 1010, through the tube 1028 and into the chamber 1074, where it pushes against the piston's rear outer facing surface 1052. When the fluid pressure against the piston's rear surface 1052 exceeds the opposing force of the biasing spring 1070, the piston 1022 moves to the left, pushing the shaft 1024 along with it until the piston 1022 and the shaft 1024 reach the second position shown in phantom. This movement causes the shaft's fingers 1068 to move into the first passageway 1048, thereby partially restricting the flow of TCF therethrough.

FIG. 34 represents unrestricted flow of TCF through the first passageway 1048 by straight arrow lines and represents restricted flow by dashed squiggly arrow lines. When the valve 1000 is in the second position, the flow of TCF is only partially restricted because the TCF can still flow through the shaft's cut-outs 1072 (i.e., between the fingers 1068) and/or around the shaft 1024. The percentage of restriction flow is determined by a plurality of factors, including the following four factors:

1. The total area of the cut-outs 1072.
2. The total number of valves 1000 in the first passageway 1048.
3. The extent that the shaft 1024 projects into the first passageway 1048.
4. The area, if any, between the outer circumferential surface of the shaft 1024 and the inner circumferential wall of the first passageway 1048 when the valve 1000 is in the second position.

If the valve 1000 is employed as a two-position valve which is either in a first or second position, only the first two factors will be relevant to the percentage of restriction.

After the valve 1000 is placed in the second position, the hydraulic fluid in the chamber 1074 remains trapped therein because the only outlet passageway, the valve of the outlet hydraulic fluid injector of the pair 1010 is closed. Thus, the shaft 1024 will remain in the second position as long as the states of the fluid injector valves are not changed. The O-rings 1054 prevent the hydraulic fluid in the chamber 1074 from leaking out into other parts of the housing bore 1030, while also preventing the TCF (which may find its way into the housing bore 1030 and hollow shaft 1024 through the plate's cut-outs 1072) from leaking into the chamber 1074.

When it is desired to close the valve 1000, those steps are reversed. That is, the ECU sends a control signal to the solenoid of the inlet hydraulic fluid injector in the pair 1010 to close the injector's valve. Simultaneously, the ECU sends a control signal to the solenoid of the outlet hydraulic fluid injector of the pair 1010 to open that injector's valve. The pressurized hydraulic fluid inside the chamber 1074 flows out through the housing's opening 1036, into the tube 1028, through the open valve of the outlet hydraulic fluid injector and into the fluid reservoir 1018. As the hydraulic fluid empties out of the chamber 1074, the biasing spring 1070 pushes the shaft 1024 and piston 1022 to the right and back into the first position, thereby causing the shaft's fingers 1068 to retract out of the first passageway 1048.

The chamber filling and emptying procedure is the same as described above with respect to the EETC valves. For brevity's sake, this procedure is not repeated herein. However, it should be understood that the valve 1000 shown in FIG. 34 is only one of a plurality of similar valves which are all connected to a single pair of hydraulic fluid injectors 1010. Only a single pressure sensor is required for each grouping of valves connected to a common pair of injectors 1010. Thus, the valve 1000 shown in FIG. 34 relies upon a pressure sensor in another valve in this grouping for a measurement of its chamber pressure. Since the tube 1028 is in fluid communication with the other valve chambers, it is also in fluid communication with that pressure sensor. If it is desired to operate the valve 1000 in FIG. 34 independent of other valves, a pressure sensor and separate pair of injectors 1010 would be associated with the valve 1000.

Figure 36:
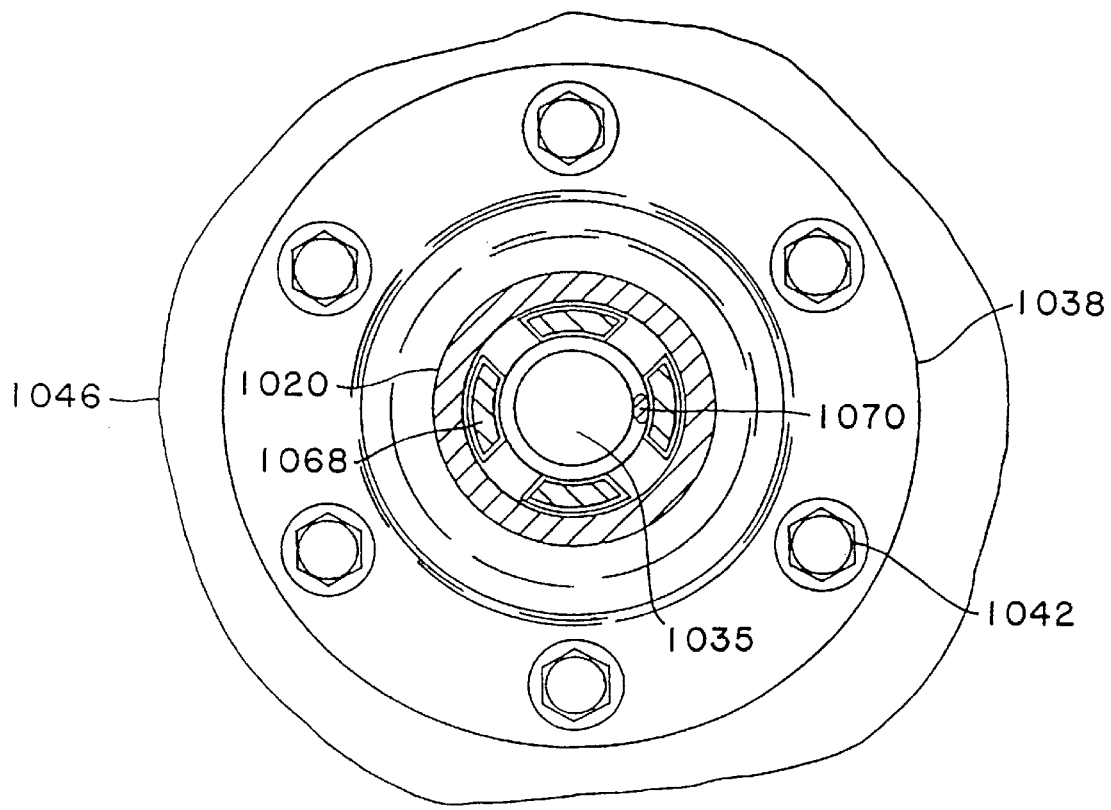
FIG. 36 is a sectional view of the restrictor/shutoff valve in FIG. 34, taken along line 36—36 in FIG. 34.

FIG. 36 is a sectional view of the valve 1000 in FIG. 34, taken along line 36—36 in FIG. 34. This view shows, from the center outward, the housing plate 1035, biasing spring 1070, four shaft fingers 1068, housing 1020, bolts 1042 and solid wall 1046.

Figure 37:
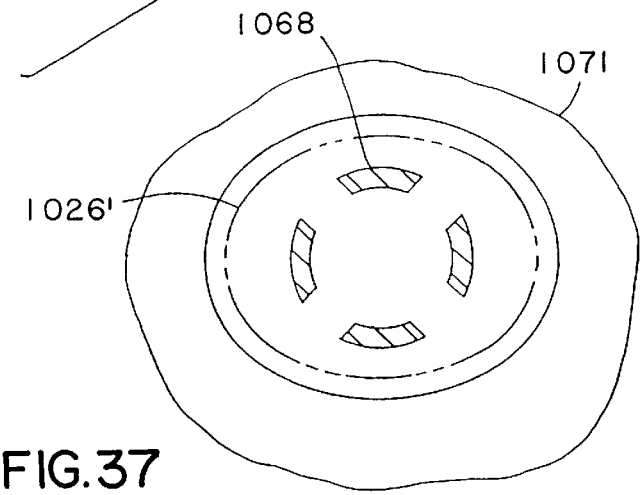
FIG. 37 is a sectional view of the restrictor/shutoff valve in FIG. 34, taken along line 37—37 in FIG. 34.

FIG. 37 is a sectional view of the valve 1000 in the second position shown in FIG. 34, taken along line 37—37 in FIG. 34. However, the valve 1000 represented by FIG. 37 has an oval shaped plug 1026' instead of the round plug shown in FIGS. 34 and 35. This view shows, from the center outward, the four shaft fingers 1068, plug 1026' and passageway far wall 1071. FIG. 37 highlights an important feature of the invention, that the plug-1026' can be shaped and sized to seat against a far wall 1071 having any shape or size. That is, the plug 1026' can have any desired footprint. Thus, although the plug 1026 shown in FIGS. 34 and 35 is a cylindrical disk, it need not have that shape.

Water jacket passageways and TCF passageways around an intake manifold typically include odd shaped bends, curves and the like which cannot be easily dead headed or blocked by simple-shaped plugs. The novel valve 1000 described herein accepts an infinite variety of plug sizes and shapes, as long as the plug 1026 includes a region for welding or mechanically staking the end surfaces 1069 of the shaft's four fingers 1068 thereto. Furthermore, while the four shaft fingers 1068 form the corresponding flow channels for the TCF in the preferred embodiment, different numbers and configurations of the flow channels are contemplated by the present invention. Also, the shape of the channels could be configured to direct the flow in a prescribed pattern, e.g., smooth or turbulent flow, flow to the right or left, etc.

Figure 38:
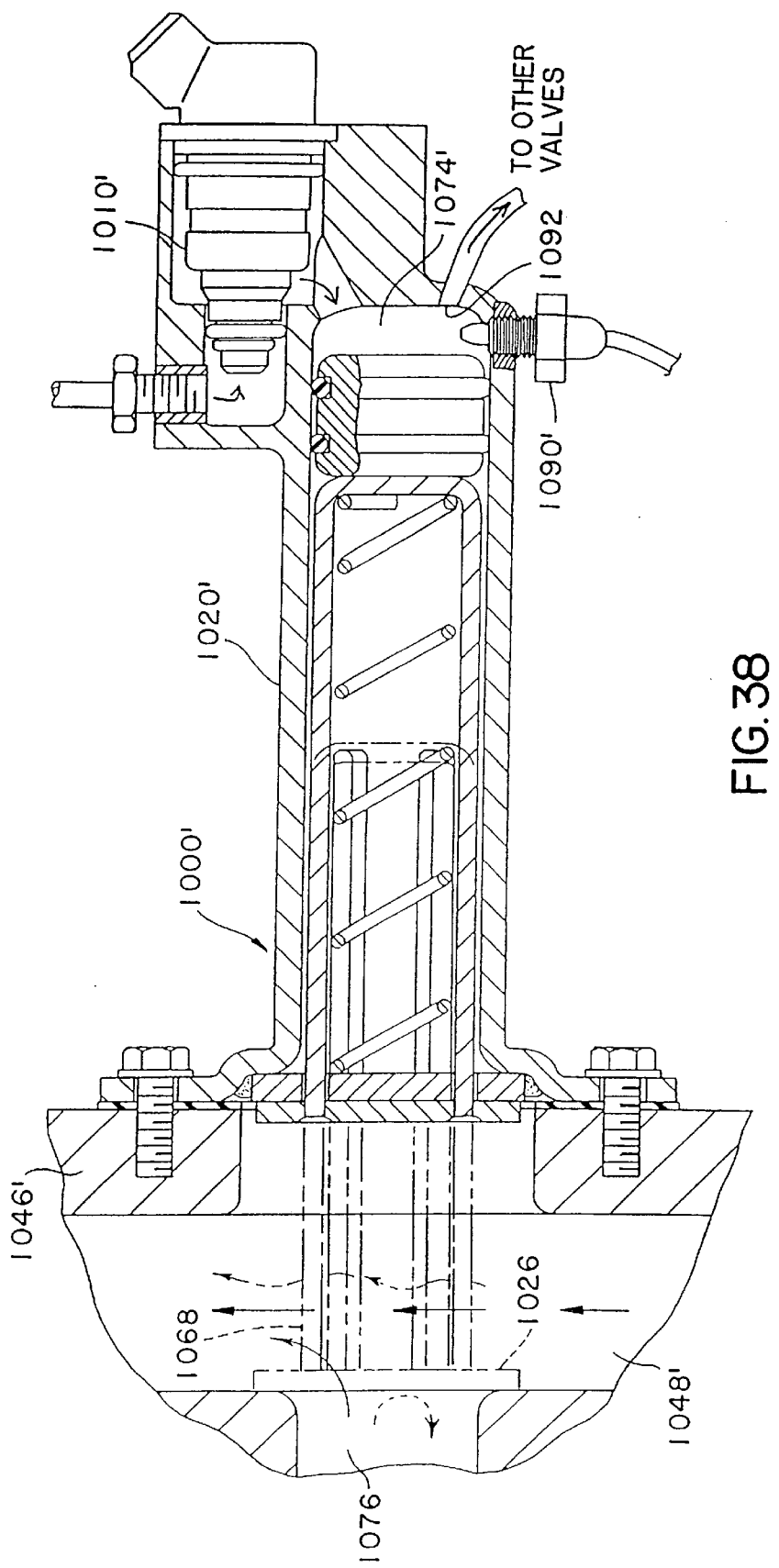
FIG. 38 is a sectional side view of an alternative embodiment of the restrictor/shutoff valve in its environment for simultaneously controlling fluid flow in two different passageways.

FIG. 38 shows a sectional side view of valve 1000' mounted to solid wall 1046' in first passageway 1048'. FIG. 38 illustrates how the valve 1000' can be employed for the dual function of restricting the first passageway 1048', while simultaneously dead heading or blocking a second passageway 1076.

This embodiment of the restrictor/shutoff valve is not controlled by remote pairs of fluid injectors. Instead, the fluid injectors are attached to housing 1020' in a manner similar to the integral fluid injectors associated with the EETC valves 500 and 600. In the section shown in FIG. 38, one of the pair of fluid injectors 1010' (the inlet injector) is visible. FIG. 38 also shows fluid pressure sensor 1090' for detecting the fluid pressure in the valve chamber 1074'. The valve 1000' also includes an optional opening 1092' for allowing the pair of fluid injectors 1010' to be in fluid communication with chambers of other valves 1000 or 1000'. In this manner, the pair of fluid injectors 1010' controls the state of these other valves.

In FIG. 38, the first and second positions of the valve 1000' are represented by solid and phantom lines, in the same manner as shown in FIG. 34. When the valve 1000' is in the first position, both passageways are unblocked and unrestricted by the valve's shaft 1024. When the valve 1000' is in the second position, the first passageway 1048' is restricted by the shaft's fingers 1068 and the second passageway 1076 is blocked by the plug 1026.

Alternatively, the plug 1026 may have openings (not shown) therethrough to allow a portion of the TCF in the second passageway 1076 to pass into the first passageway 1048'. In this embodiment, the valve 1000' functions as a restrictor/restrictor valve (i.e., it restricts, but not block the flow of TCF in the first and second passageways). The valve 1000' could also be designed to prevent transfer of the fluid past the restrictor in the first passageway 1048', yet permit fluid transfer from the first passageway 1048' to the second passageway 1076.

The major purpose of the restrictor/shutoff valves 1000 are to block or reduce the flow of TCF through TCF passageways. As shown in FIG. 38, the novel valve 1000 can simultaneously restrict flow through one passageway, while blocking or dead heading flow through a different passageway. This simultaneous restricting/dead heading function is particularly useful when one or more valves 1000 are employed in the engine block water jacket to selectively control flow of TCF through "interior" and "exterior" water jacket passageways. "Interior" passageways, as defined herein, are those which are associated with interior most regions of the engine block water jacket, whereas "exterior" passageways, as defined herein, are those which are associated with exterior most regions of the water jacket. In a typical engine, the interior passageways are closest to the engine's moving parts. Consequently, those passageways are typically closest to the oil lines which lubricate those moving parts and are closest to the hottest parts of the engine block.

Page 169 of the *Goodheart-Willcox Automotive Encyclopedia*, The Goodheart-Willcox Company, Inc., South Holland, Ill., 1995, notes that the heat removed by the cooling system of an average automobile at normal speed is sufficient to keep a six-room house warm in zero degree Fahrenheit weather. Although this passage refers to an operating mode where the thermostat is open and flow to the radiator is permitted, it is clear that tremendous quantities of heat energy are generated by an average automobile, even when the coolant is not hot enough to open the thermostat. Internal combustion engines manufactured today fail to take full advantage of such heat energy, especially in cold ambient temperature environments.

In such cold ambient temperature environments (e.g., sub-zero temperatures), it is most important to retain heat energy in the interior passageways to keep the oil temperature within its optimum range. It is also desirable to remove some heat energy from the interior so that the heater/defroster and intake manifold receive some warm or hot TCF. Furthermore, it is desirable to reduce the heat energy loss from the exterior passageways so that valuable heat energy from the engine block is not wasted to the atmosphere. The valve 1000 is ideally suited to perform this task.

Figure 39:
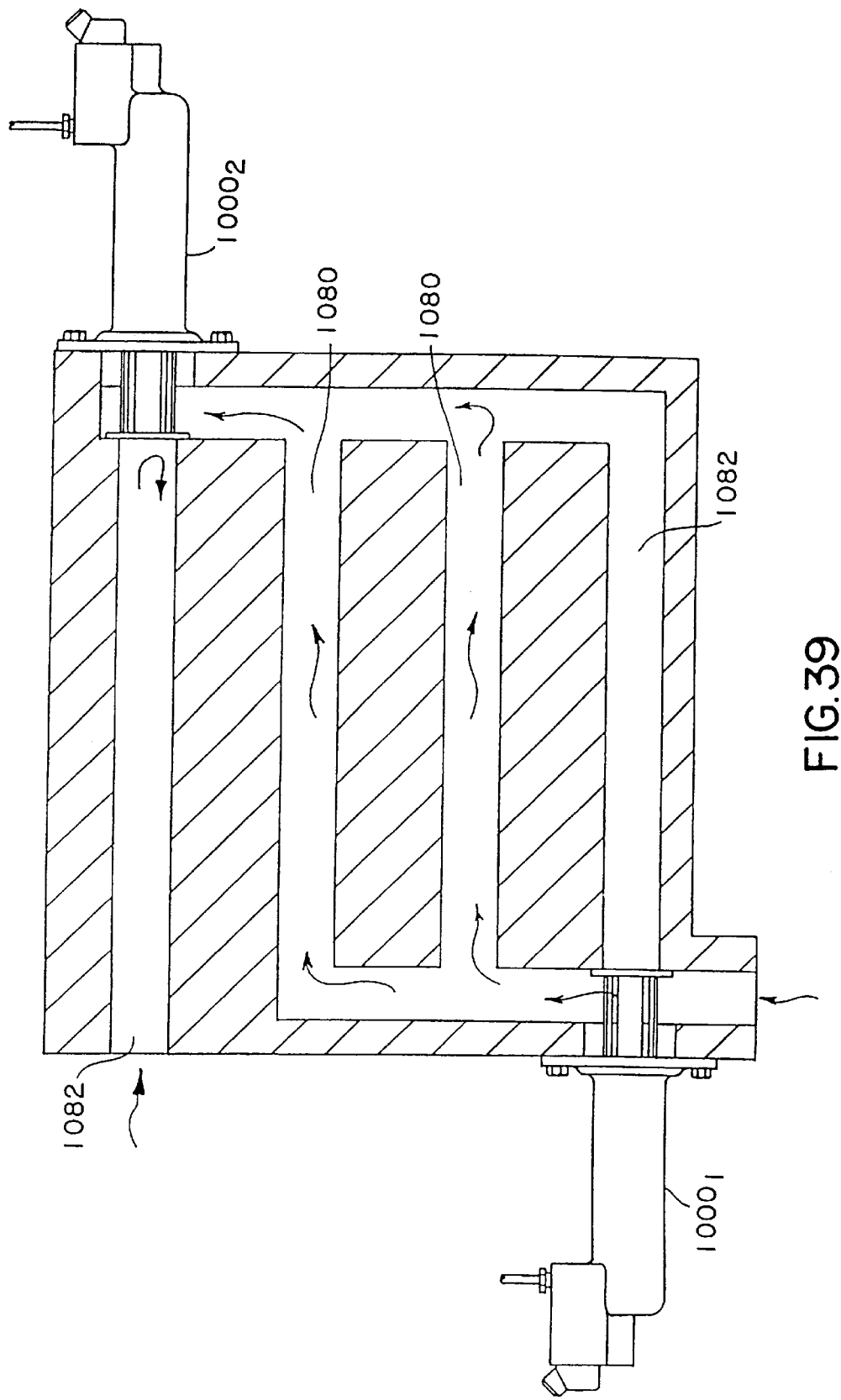
FIG. 39 is a diagrammatic sectional view of the water jacket in an engine block showing how the restrictor/shutoff valve controls fluid flow in interior and exterior passageways of the water jacket.

FIG. 39 is a simplified diagrammatic sectional view of the water jacket in engine block 1078 showing two interior passageways 1080, two exterior passageways 1882 and valves $1000_1$, $1000_2$ for respectively dead heading and restricting those passageways. That is, each valve $1000_1$ and $1000_2$ blocks flow through an exterior passageway 1082 and simultaneously restricts flow through an interior passageway 1080. In the embodiment shown in FIG. 39, the valve $1000_1$ blocks flow through the lower exterior passageway, whereas the valve $1000_2$ dead heads the flow through the upper exterior passageway. As noted above, dead heading the flow allows the TCF fluid trapped in the passageway to function as an insulator, further reducing undesired heat energy loss from the engine block 1078 to the ambient environment.

FIG. 39 thus shows how the valve 1000' shown in FIG. 38 is employed in a water jacket wherein the first passageway 1048' is equivalent to an interior passageway and the second passageway 1076 is equivalent to an exterior passageway.

Some of the preferred materials for constructing the restrictor/shutoff valve and operating parameters were described above. In one embodiment of the invention, the following materials and operating parameters were found to be suitable.

Biasing spring—stainless steel
Valve housing—aluminum die casting—machined or stainless steel sheet metal
Shaft, plug—powdered metal or aluminum die cast
Piston/shaft stroke—aluminum die casting—machined or stainless steel sheet metal
Flow restriction—variable from about 50 percent to about 100 percent Although the pair of hydraulic fluid injectors 1010 associated with the restrictor/shutoff valves may be similar to the injectors 18, 20, the preferred inlet fluid injector will most likely require a larger flow capacity than the inlet fluid injector 18. Likewise, the fluid inlet tube 1012 will also most likely require a larger flow capacity than the fluid inlet tube 36 associated with the injector 18.

The larger flow capacity may be required because the restrictor/shutoff valve will usually be operated (i.e., moved into a restricted or blocked position) in much lower ambient air temperatures than the EETC valve. If engine lubrication oil is employed as the hydraulic fluid, such oil will have a higher viscosity in a cold temperature environment. When the oil is thick and slow flowing, the valve chamber will fill more slowly than when the oil is at a higher temperature, and thus at a lower viscosity. If the ambient air temperature is very low (e.g., sub-zero degrees Fahrenheit), the filling time could become unacceptably long. By increasing the flow capacity through the inlet injector and into the chamber, the filling time is decreased to compensate for the higher viscosity oil.

To increase the flow capacity through the inlet fluid injector when employing a fluid injector such as the DEKA Type II injector shown in FIG. 16A, the orifice 710 should be increased. Also, the lift of the needle valve 706 should be greater. The greater lift will probably require a greater capacity solenoid 704.

The outlet fluid injector associated with the restrictor/shutoff valve is only opened when the valve is moved into an unrestricted or unblocked position. Since this will normally occur only after the engine has warmed up and the oil viscosity has decreased, this injector and its associated outlet tube need not necessarily be designed to handle a greater flow capacity. Likewise, since the chamber of the EETC valve is filled (thereby allowing TCF fluid flow to the radiator) only when the engine and engine oil are relatively hot, the injectors 18, 20 will usually not encounter this flow capacity problem either.

The slow filling of the valve chamber caused by high oil viscosity will not be a problem in prolonged extremely cold temperature environments (e.g., prolonged sub-zero degree Fahrenheit temperatures). In such conditions, it is entirely possible that the restrictor/shutoff valve will remain in a restricted or blocked position for days or weeks at a time without being moved into its unrestricted/unblocked state.

The restrictor/shutoff valves can be employed in an anticipatory mode to lessen the sudden engine block temperature peaks caused when a turbocharger or supercharged is activated, in the same manner as the anticipatory mode described above with respect to the EETC valves. When the turbocharger or supercharger is activated, a signal can be immediately delivered to the restrictor/shutoff valves to cause the valves to be placed in their unrestricted/unblocked state, if they are not already in that state. A short time after the turbocharger or supercharger is deactivated, the valves can then be returned to the state dictated by the ECU.

In extremely hot ambient air conditions, a system wherein the states of the EETC valve and restrictor/shutoff valves are controlled according to one or more of the curves will perform better upon engine start-up than a cooling system having a thermostat controlled solely by coolant temperature. This is because the curves allow the designer to anticipate expected engine operating conditions based on the present TCF and ambient air temperature. Accordingly, the EETC valve can be immediately opened and the restrictor/shutoff valves can be immediately placed in an unblocked/unrestricted state in anticipation of an expected engine operating condition that would call for such states.

Consider, for example, a prior art vehicle which has been sitting in the sunlight when the ambient air temperature is 100 degrees Fahrenheit. In such an environment, the underhood and vehicle interior is likely to be at least 120 degrees Fahrenheit. The coolant temperature will likely be at least 100 degrees Fahrenheit. When the driver enters the vehicle and starts the engine, the air conditioning is typically immediately turned on to its maximum setting. Due to the hot conditions and the extra stress on the engine due to the air conditioning system, the coolant temperature quickly rises. Although it is virtually certain that the coolant will need to flow to the radiator to keep the engine block at an optimal operating temperature, the thermostat must nevertheless wait until the temperature has reached the appropriate level before it opens to allow flow to the radiator. The result is that full engine cooling is temporarily delayed. If the vehicle is equipped with a prior art wax pellet type or bimetallic coil type thermostat, there will an even greater delay before the coolant can flow to the radiator due to thermostat hysteresis. These delays may cause a sudden engine block temperature peak which, in turn, may cause the coolant temperature and engine oil temperature to temporarily reach levels which exceed the ideal range.

However, if the vehicle is equipped with a novel EETC valve and restrictor/shutoff valves controlled by the programmed curve, all of the TCF will immediately flow through the radiator upon engine start-up. Accordingly, the likelihood of a sudden engine block temperature peak will be reduced. This is because the curves shown in FIGS. 19, 20, 22A, 22B, 24 and 26 indicate that at an ambient temperature of 100 degrees Fahrenheit and a TCF temperature above 100 degrees Fahrenheit, the EETC valve should be in the open state and the restrictor/shutoff valve should be in the unblocked/unrestricted state. Of course, there will be a two or three second delay before the valves can be placed in these states after starting the engine to allow the hydraulic fluid system to reach proper operating pressure. This anticipatory feature is an inherent benefit of controlling the state of a flow control valves according to a programmed curve.

As discussed above, in one embodiment of the invention, the ECU receives signals indicative of the ambient air temperature, the engine oil temperature, and the temperature control fluid temperature. The ECU compares these signals to one or more temperature control curves. In the preferred embodiment, the ECU compares the engine oil temperature to an optimum engine oil temperature curve. The ECU determines the operating state of the engine based on this comparison (e.g., normal, high or extremely high load). The ECU then compares the actual temperatures of the ambient air and the temperature control fluid to a curve or set of predetermined values for determining the desired state or position of the flow control valves (e.g., EETC valve, restrictor valves). The set of predetermined values preferably defines a curve which is a function of at least ambient air temperature and temperature control fluid temperature. A portion of the preferred curve has a non-zero slope. The ECU sends control signals to the solenoids to open and close the hydraulic fluid injectors. This, in turn, causes the opening and closing of the flow control valves as required.

In an alternate embodiment of the invention, the ECU compares the actual oil temperature against an optimum engine oil temperature value or series of values defining a curve. If the actual oil temperature is above the optimum or desired engine oil temperature value, then the ECU adjusts the Normal temperature control curve instead of switching to a High Load curve. Specifically, the ECU shifts the Normal temperature curve downward a predetermined amount so as to reduce the temperature of the temperature control fluid which causes actuation of the valves between their states or positions. In one embodiment of the invention, for every one degree Fahrenheit that the actual engine oil temperature is above the optimum engine oil temperature there is a corresponding two degree Fahrenheit decrease in the temperature control fluid temperature component which produces actuation of the valves. This effectively results in a downward shifting of the temperature control curve. Different engine configurations will, of course, result in different amounts that the temperature control fluid temperature component is shifted downward for a one degree rise in actual engine oil temperature. For example, a one degree rise in actual oil temperature above the optimum oil temperature value may produce a decrease in the actuation temperature of the temperature control fluid within a range of between about one and ten degrees. Furthermore, it is contemplated that the amount of downward shifting of the temperature component may not be constant (e.g., the amount of downward shifting may increase as the difference between the actual oil temperature and the optimum oil temperature increases).

Figure 45A:
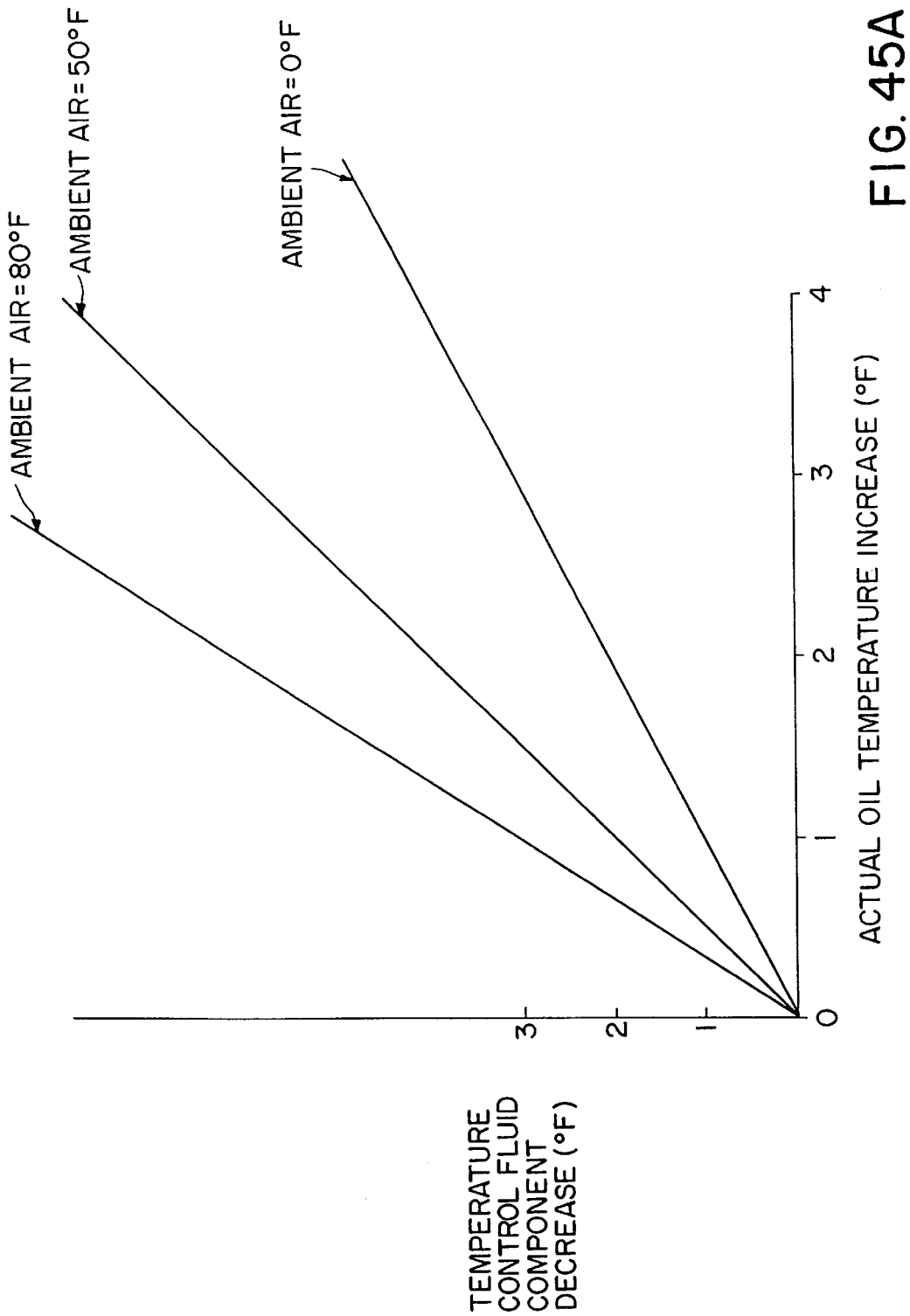
FIG. 45A is a graphical illustration of one method for adjusting the temperature control fluid temperature component.

In yet another embodiment, the amount of downward shifting of the temperature control fluid temperature component may also vary with changes in ambient temperature. For example, at 0 degrees ambient air temperature, every one degree that the actual oil temperature is above the optimum oil temperature produces a one degree decrease in the temperature control fluid temperature component. At 50 degrees ambient air temperature, every one degree that the actual oil temperature is above the optimum oil temperature produces a two degree decrease in the temperature control fluid temperature component. At 80 degrees ambient air temperature, every one degree that the actual oil temperature is above the optimum oil temperature produces a three degree decrease in the temperature control fluid temperature component. This embodiment of the invention may be graphically illustrated as shown in FIG. 45A wherein a control curve is selected by the ECU depending on the sensed ambient temperature. A plurality of control curves could be plotted representing a range of ambient temperatures. For example, control curves could be plotted from about −60 degrees Fahrenheit to about 110 degrees Fahrenheit, each having an associated adjustment factor for adjusting the temperature control fluid temperature component and/or for shifting the set of predetermined values. The adjustment factors may vary. The ECU may also be configured to interpolate between designated curves of providing an accurate adjustment factor. Although linear curves are illustrated in the exemplary embodiment, it should be understood that alternate non-linear curves may be incorporated for each ambient temperature. It is also contemplated that a single curve may be utilized for shifting the temperature control curve. One axis of the plot would represent the sensed ambient temperature. The second axis would represent the ratio of a one degree increase in engine oil over the corresponding downward shifting of the temperature control curve (e.g., 1/1, 1/2 or 1/3).

Figure 45B:
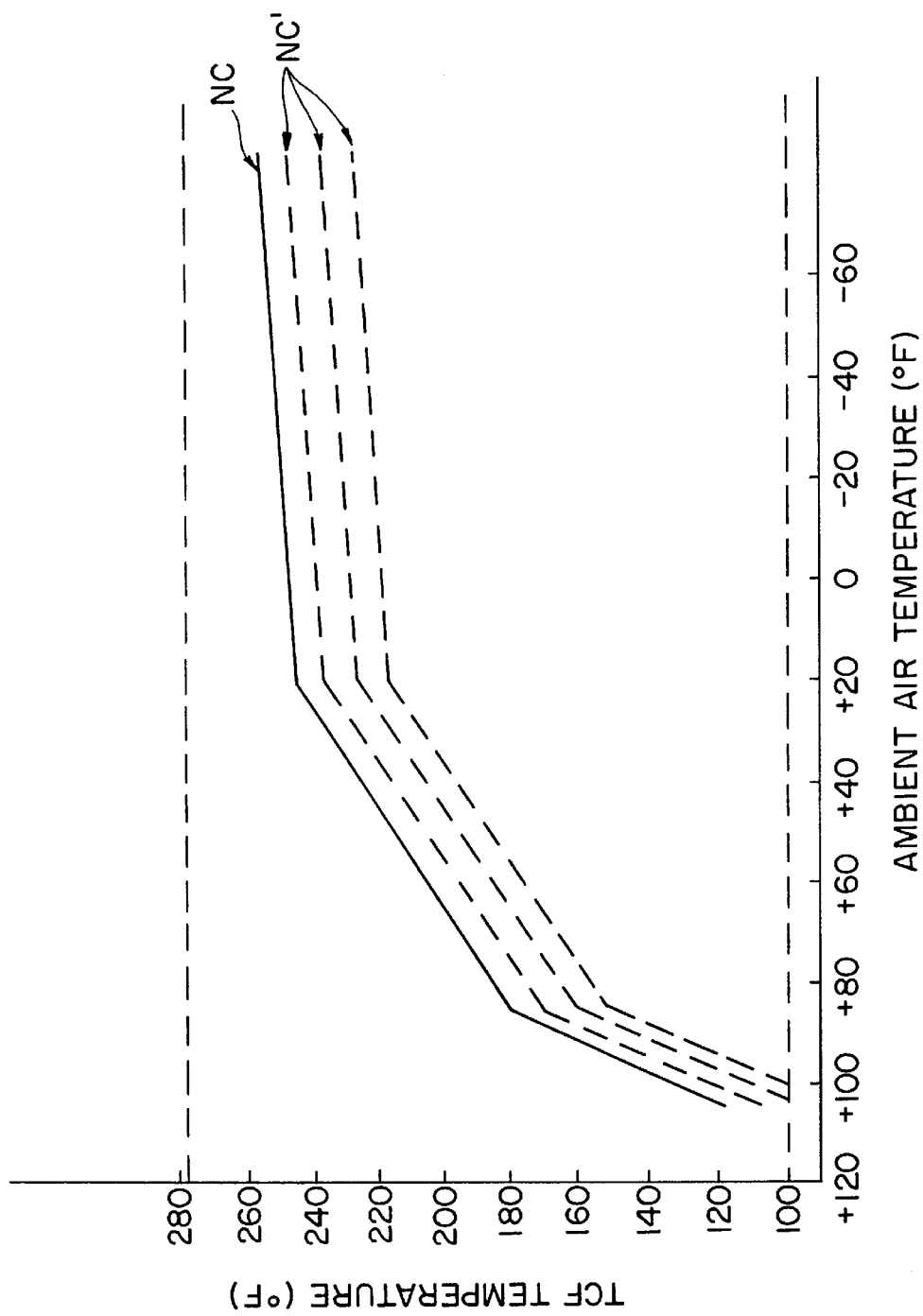
FIG. 45B is a graphical illustration of the result of adjusting the temperature control curve to account for engine conditions.

Alternately, it may be preferable to wait until the actual oil temperature exceeds the optimum oil temperature value by a set amount before altering the temperature control curve. For example, for every 3 or 5 degree increase in the actual engine oil temperature above the optimum oil temperature value there is a corresponding decrease in the set point temperature of the temperature control fluid which directs actuation of the valve. FIG. 45B graphically illustrates this aspect of the invention. A series of identical temperature control curves are shown for a plurality of actual sensed engine oil temperatures. Each dashed line (NC') represents a shifted-down version of the solid "normal" temperature control curve (NC). It should be readily apparent that only one particular curve or value would be utilized for a given sensed engine oil temperature. In an alternate arrangement, an equation and/or scaling factor instead of a separate curve may be utilized to alter the value at which actuation occurs according to the normal curve.

In many instances, altering the temperature control fluid component based only on the amount that the actual engine oil temperature exceeds the optimum engine oil value would be sufficient. However, in the preferred embodiment, it is also desirable to monitor the engine load to determine how much altering of the temperature control curves is required to maintain the actual engine oil temperature at or near the optimum oil temperature.

Figure 45C:
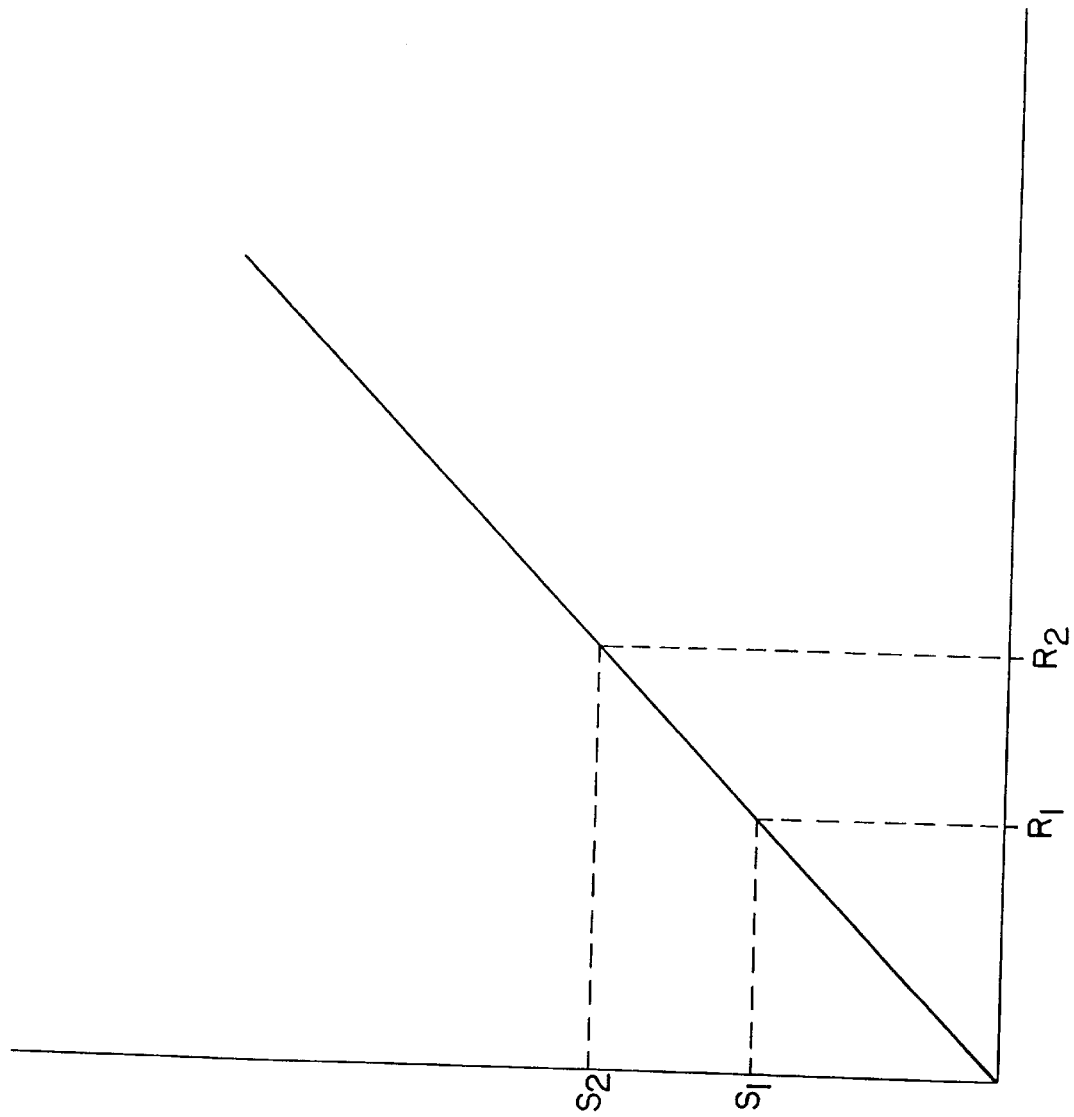
FIG. 45C is a graphical illustration of another method for adjusting the temperature control fluid temperature component.

One method for varying or altering the temperature control curve as a function of engine load is by monitoring the rate of change of the actual engine oil temperature. Referring to FIG. 45C, an exemplary curve is illustrated which depicts the rate of change of the actual engine oil temperature versus the scaling or adjustment factor for the temperature control fluid temperature component and/or for determining the downward shifting of the set of predetermined values. If the detected rate of change of the actual oil temperature is relatively low ($R_1$), the downward shifting of the temperature control curves is also small ($S_1$). If, on the other hand, the detected rate of change of actual oil temperature is large ($R_2$) which is indicative of a high loading condition, then the downward shifting of the temperature control curve is also relatively large ($S_2$). Although the exemplary curve depicts a linear curve other curve shapes, such as exponential, logarithmic, curvilinear, etc., may be substituted therefor. Furthermore, a step function may instead be utilized which provides a different amount of downward shifting of the temperature control curve for different detected rates of change of the actual engine oil.

During use, when the engine computer detects that the actual sensed oil temperature exceeds the optimum oil temperature, the computer then determines rate of change of the actual engine oil temperature. The engine computer determines a scaling or adjustment factor from this rate of change. The adjustment factor is then applied to the normal temperature curve to shift the curve downward. The engine computer continues to monitor the rate of change in the actual oil temperature and shifts the temperature control curve accordingly. Delays can be incorporated into the system to minimize the amount of shifting of the temperature control curve that occurs.

Figure 46:
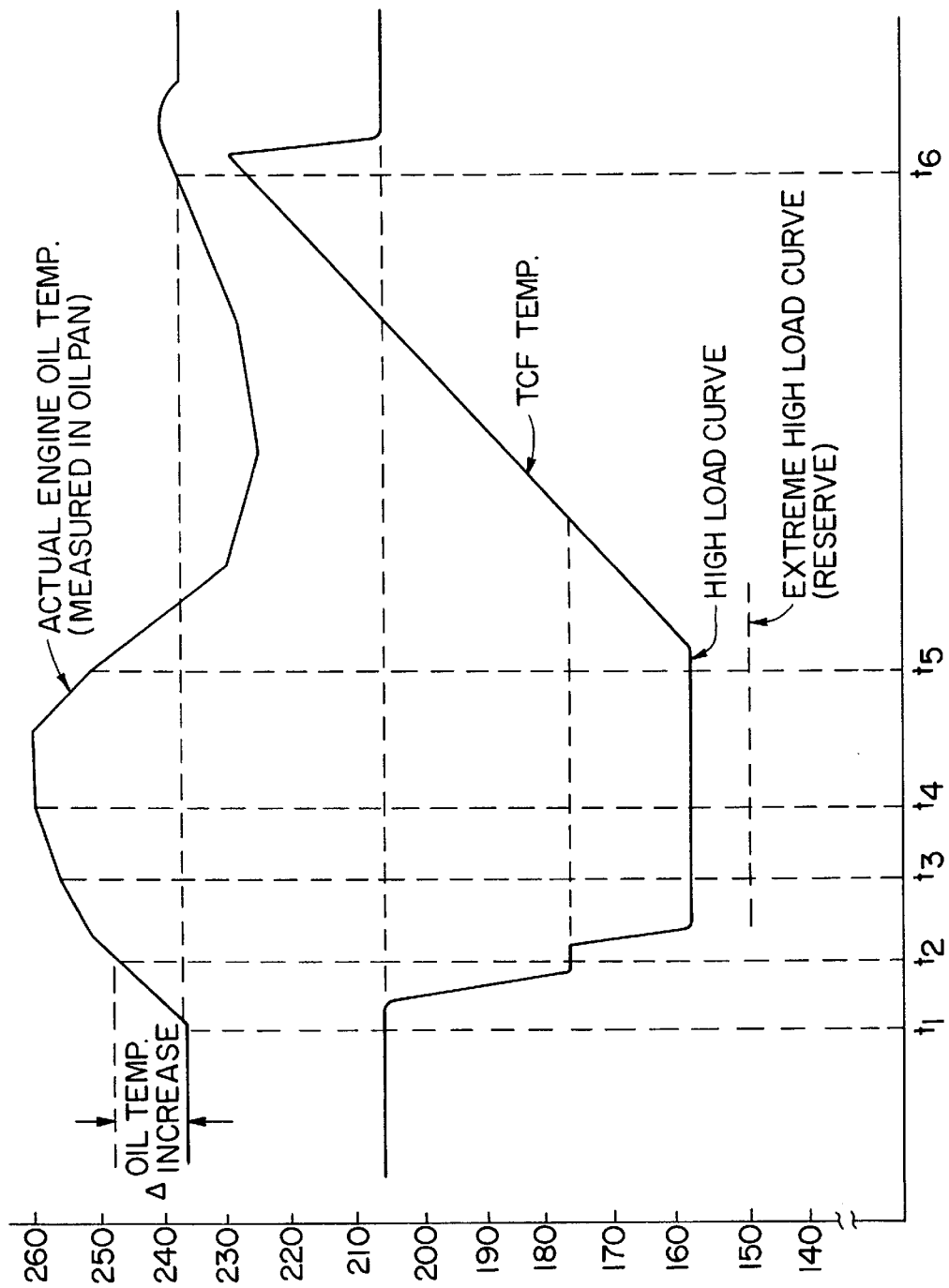
FIG. 46 is an empirical curve showing the actual engine oil temperature and the temperature control fluid temperature over a time period during which the engine was subjected to varying load conditions.

An analytically determined curve illustrating the effect of the above embodiment is shown in FIG. 46. The curve shown is for a constant ambient temperature of 60° F. From time $t_0$ to time $t_1$, the engine computer controls the opening and closing of the EETC valve and restrictor valves according to a normal temperature control curve (level 1). At time $t_1$, the engine computer detects an increase in the actual oil temperature above the optimum engine oil temperature value (approximately 235° F. in the illustrated embodiment) which is preferably determined from an optimum engine oil temperature curve similar to the one shown in FIG. 25. The engine computer either applies a predetermined factor for downward shifting of the temperature control curve (e.g., 2 degree drop in TCF for each 1 degree rise in engine oil temperature) or, more preferably, the engine computer determines a rate of change of the engine oil temperature and from that rate calculates the amount of downward shifting of the temperature control curve required.

The EETC valve is opened according to the new shifted temperature control curve (level 2), causing the immediate drop in the temperature control fluid as shown between time $t_1$ and $t_2$. The engine oil however, will continue to rise until the cooling effect of the temperature control fluid begins to cool the engine oil.

The engine computer continues to monitor the actual engine oil temperature. At time $t_2$, the temperature of the temperature control fluid stabilizes at the new shifted temperature control fluid valve. If the actual engine oil is still above the optimum engine oil temperature, the engine computer determines the rate of change of engine oil temperature between time $t_1$ and $t_2$. The high rate of change indicates a continued high engine load condition. Accordingly, based on this determined rate, the engine computer determines an additional amount of downward shifting of the temperature control curve that is required. The flow control valve or valves are then controlled based on the this second shifted temperature control curve (level 3).

At time $t_3$ the engine computer determines a rate of change of the engine oil temperature between time $t_2$ and $t_3$. Since the new rate of change in the illustrated example is less than the previous rate of change, the engine computer does not shift the temperature control curve downward. Instead, the engine computer continues to control the flow control valve or valves based on the level 3 temperature control curve.

At time $t_5$ the engine computer determines a rate of change of the engine oil temperature between time $t_4$ and $t_5$. Since the new rate of change in the illustrated example is decreasing, the engine computer shifts the temperature control curve upward back toward the first or normal level. As a result, the temperature control fluid temperature continues to heat up while the engine oil decreases in temperature and begins to return to its optimal operating temperature.

Since the reheating of the temperature control fluid is a slow process, as illustrated by the time period between time $t_5$ and $t_6$, it is important not to drop the temperature control fluid to an unnecessarily low temperature so as to maintain the engine oil as close to the optimum engine oil as possible.

It should be understood that the sensed ambient air temperature will affect rate or slope of the temperature control fluid temperature curve in FIG. 46. For example, at hot ambient temperatures, the temperature slope of the temperature control fluid between time $t_5$ and $t_6$ will be steeper than at low ambient temperatures. This is due to the fact that at lower temperatures (e.g., zero degrees ambient) it is more preferable that the engine oil remains at a higher temperature for a longer period of time to increase heater and defroster capabilities. The cold ambient temperature reduces the likelihood that the engine oil will become excessively hot. In warmer ambient temperatures, it is desirable to maintain the engine oil closer to its optimum valve so as to prevent overheating. The temperature slope of the temperature control fluid is, thus, steeper at these warmer temperatures.

An alternate method for determining the engine load is by monitoring the intake manifold vacuum pressure. The sensed intake manifold pressure generally provides an accurate indication of the current engine load. For example, if the sensed intake manifold vacuum pressure is less than about 4 inches Hg, the engine is operating under a high load condition. Accordingly, a first predetermined adjustment factor or curve can be selected for reducing or replacing the temperature control curve. If, however, the intake manifold vacuum pressure is less than about 2 inches Hg, then the engine is operating under an extremely load condition. In this case, a second adjustment factor is selected for varying the normal temperature control curve.

Yet another method for determining engine load is through the monitoring of the commanded engine acceleration. For example, a high commanded engine acceleration is indicative of a high engine load condition. The amount of engine acceleration can be determined from a variety of methods, such as the accelerator pedal displacement, a signal from the fuel injection system, etc. Depending on the commanded acceleration, a predetermined factor and/or curve is selected for varying the normal temperature control curve.

In both the commanded engine acceleration method and the intake manifold vacuum pressure method, a rate monitoring system similar to the one discussed above with respect to the engine oil temperature could also be incorporated to further optimize these methods.

Figure 47:
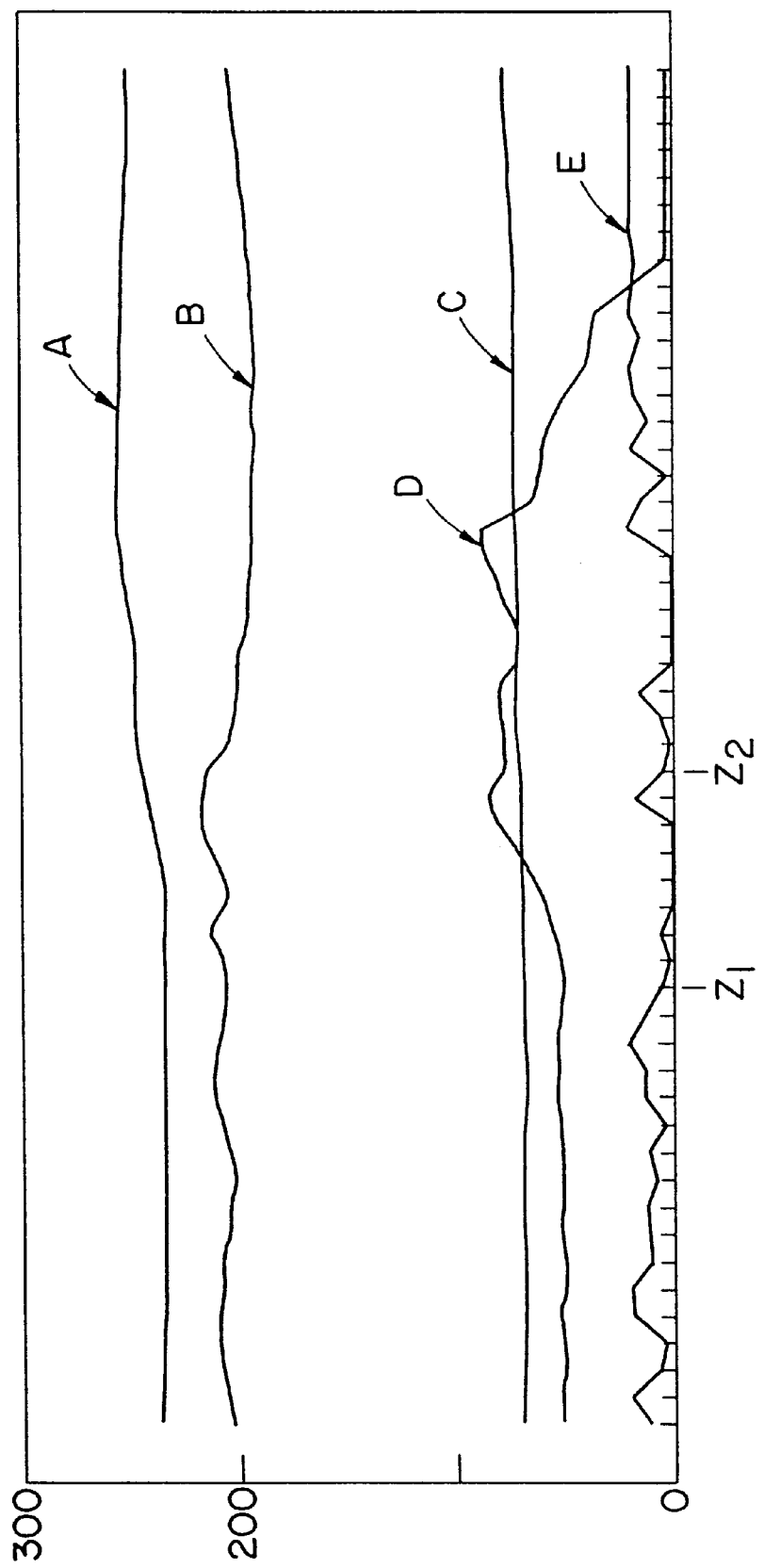
FIG. 47 is an actual plot of data generated on a GM 3800 V6 engine while experiencing varying load conditions.

FIG. 47 is an actual plot of the present invention incorporated into a GM 3800 V6 engine. The data was recorded as the vehicle was being driven up a very steep incline. The data which is shown is the engine oil temperature (curve A), the temperature of the temperature control fluid (curve B), the temperature of ambient air (curve C), the speed of the vehicle (curve D) and the vacuum pressure (curve E). The X axis represents a time period of several minutes. At point $Z_1$, an acceleration was commanded by the vehicle, increasing its speed from approximately 55 miles per hour to over 90 miles per hour. The increase in engine speed and acceleration results in a corresponding decrease in vacuum pressure and an increase in the temperature of the engine oil. The temperature control system detects the increase in engine oil temperature and, accordingly, reduces the temperature of the temperature control fluid. At point $Z_2$, the lower temperature of the temperature control fluid begins to reduce the temperature of the engine oil. FIG. 47 clearly illustrates the interrelationship between detected engine load conditions (acceleration, velocity, and/or vacuum pressure) and the engine oil and temperature control fluid temperatures.

Based on the above discussion, those skilled in the art would readily understand and appreciate that various modifications can be made to the exemplary embodiments disclosed and are well within the scope of this invention. For example, the temperature control curves themselves may be replaced by one or more equations for controlling the actuation of the valves. In yet another embodiment, fuzzy logic controllers could be implemented for controlling the actuation of the valves and/or varying of the temperature control curves.

The varying or downward shifting of the temperature control curves as discussed above is preferably limited to between approximately 50° F.–70° F. This is intended to prevent substantial degradation in the capabilities of the heater/defroster systems by maintaining the temperature control fluid at a reasonably high temperature.

The above methods for adjusting the temperature control curves can also be utilized in the start up/warm up phase. For example, if the actual engine oil temperature is below the desired or optimum engine oil temperature by a predetermined amount, an adjustment factor can be applied to the temperature control curve to shift it upward a preset amount. Preferably, the amount of adjustment would also vary with the ambient air temperature such that the shifted temperature control curve would be similar to the start-up/warm-up curve shown in FIG. 26.

The above discussion has been directed toward a temperature control system which controls engine oil temperature so as to maintain it at or near its optimum temperature. However, it is contemplated that, in certain cases, optimal control may not be necessary. In light of this, another embodiment of the present invention is disclosed which does not utilize curves that vary with ambient temperature for controlling actuation of the valves. Instead, one or more predetermined engine oil and/or temperature control fluid temperature values are utilized for controlling the valves regardless of ambient air temperature. The predetermined engine oil and temperature control fluid temperatures are preferably chosen so as to provide an acceptable temperature state for the engine over a wide range of ambient temperatures. For example, an average engine oil temperature value of approximately 260° F. may be utilized as the predetermined value.

Figure 48:
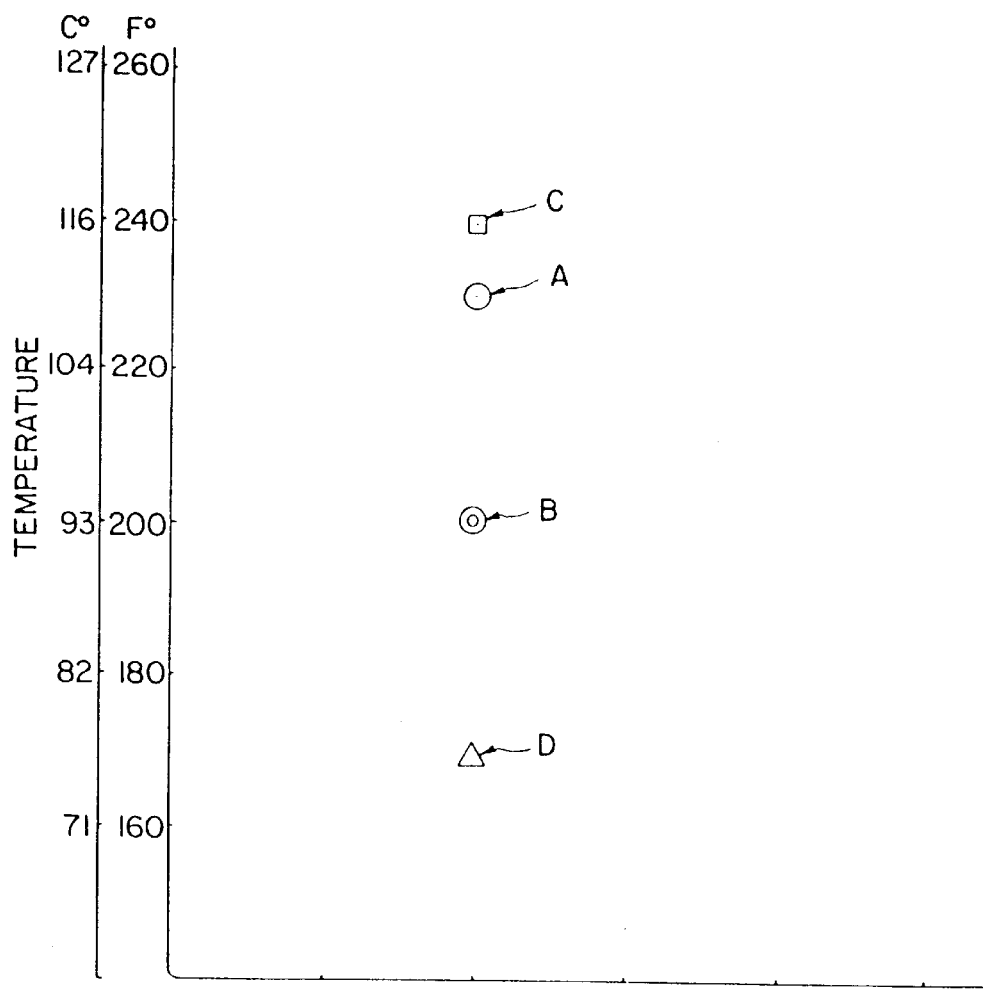
FIG. 48 is a graphical illustration of an alternate embodiment of the present invention wherein a constant desired oil temperature is utilized.

Referring to FIG. 48, a graphical illustration of this embodiment of the invention is shown. In this embodiment, the temperature control system is operated so as to maintain the engine oil at or near at least one engine oil temperature value (designated by the letter 'A'). The operation of the system is as follows. A sensor within the engine detects a temperature indicative of the temperature of the engine oil. This may be accomplished, for example, by directly sensing the temperature of the oil within the oil pan, or by sensing the temperature of the engine block or the oil pan itself. Hence, any temperature which generally represents the temperature of the engine oil (or is a function of that temperature) can be sensed and utilized in the present invention. This signal is sent to the engine computer. The engine computer compares the signal to a predetermined engine oil temperature value. If the sensed oil temperature signal is less than the predetermined engine oil temperature value, the engine oil is in a relatively cold state. In this state, it is not desirable to circulate a flow of temperature control fluid. The engine computer may be utilized to determine the position of the valve controlling the flow of temperature control fluid between the radiator and the engine (e.g. EETC valve). The engine computer can determine the position of the valve many different ways. One way involves providing signals from the valve which indicate its position. If the valve is in its open position (allowing flow of temperature control fluid between the radiator and the engine) then it is desirable for engine computer to send signals to cause the valve to close (inhibiting flow of temperature control fluid from the radiator).

In the above discussion, the engine computer determines the position of the valve and automatically closes the valve based on only the temperature of the engine oil. However, it is contemplated that the engine computer may also utilize the temperature of the temperature control fluid for controlling the opening and closing of the valve. By utilizing the temperature of the temperature control fluid the system can more readily account for the lag time involved in heating the oil (i.e., engine heats up quicker than engine oil) In this embodiment, a signal indicative of the actual or sensed temperature of the temperature control fluid is sent to the engine computer. The engine computer compares this signal (or temperature) against at least one predetermined temperature control fluid temperature value. If the actual sensed temperature is below the predetermined temperature control fluid temperature value then the valve is likely in its closed position inhibiting flow between the radiator and the engine. By leaving the valve is its closed position, the temperature of the engine oil will rise since there is no cooling being provided by fluid from the radiator.

If, on the other hand, the sensed temperature of the temperature control fluid is greater than the predetermined temperature control fluid temperature value, then the valve be in its open position allowing temperature control fluid to circulate from the radiator into the engine. However, since the temperature of the engine oil is relatively cold, it is desirable that the valve be placed in its closed position. In order to close the valve (if it is not already in its closed position), the engine computer shifts the predetermined temperature control fluid temperature value upward a prescribed amount. This is equivalent to adjusting or increasing the predetermined temperature value. The amount of shifting or adjusting may depend on various factors. Preferably, the amount of upward shifting is a function of the amount that the actual engine oil temperature is below the predetermined engine oil temperature value. A detailed discussion has already been provided hereinabove on shifting or adjusting predetermined temperature values or components.

It may instead be desirable to adjust or increase the predetermined temperature control fluid temperature value an amount that will automatically place it above the actual temperature control fluid temperature, regardless of the comparison of the actual engine oil temperature to the predetermined engine oil temperature value. The engine computer would then maintain the predetermined temperature control fluid value at that temperature (or above) until the actual engine oil temperature reaches the predetermined engine oil temperature value. In another embodiment, the engine computer does not adjust the predetermined temperature control fluid temperature value but simply maintains the valve in the closed position until the actual engine oil temperature reaches the predetermined engine oil temperature value.

When the engine computer receives an engine oil temperature signal which is above the predetermined engine oil temperature value, then engine is in a relatively hot state. In this state it is desirable to circulate cool temperature control fluid from the radiator through the water jackets surrounding the engine. As discussed above, the engine computer may be utilized to determine the position of the valve and then automatically place the valve in a desired position (e.g., open). However, in one preferred embodiment, the engine computer also utilizes the actual or sensed temperature of the temperature control fluid. The engine computer compares the temperature of the temperature control fluid to at least one predetermined temperature control fluid temperature value. If the actual sensed temperature is above the predetermined temperature control fluid temperature value, then the valve should already be in its open position allowing temperature control fluid flow between the radiator and the engine. However, if the sensed temperature of the temperature control fluid is less than the predetermined temperature control fluid temperature value, then the valve is likely to be in its closed position. It is therefore desirable to open the valve so as to cool the engine. In order to do so, the engine computer shifts or adjusts the predetermined temperature control fluid temperature value downward a prescribed amount in a similar manner as described above. When the actual temperature of the temperature control fluid exceeds the shifted or adjusted predetermined temperature control value, the valve will open.

FIG. 48 also illustrates upper and lower temperature control fluid temperature limits (letters 'C' and 'D'). These temperature limits prevent the temperature control system from significantly reducing the effectiveness of the heater/defrost system.

The preferred temperature control system utilizes the engine computer to continuously shift or adjust the predetermined temperature control temperature value based on the comparison of the actual engine oil temperature value to the predetermined engine oil temperature value. Thus, the shifted or adjusted predetermined temperature control value may not necessarily cause immediate actuation of the valve. Instead, the new shifted value may simply be closer, temperature-wise, to the actual temperature resulting in quicker actuation of the valve. In an alternate, but not preferred embodiment, the predetermined temperature control fluid temperature value is not adjusted. Instead, the sensed or actual temperature control fluid temperature is adjusted and then compared against the predetermined temperature control fluid temperature value. Those skilled in the art would readily be capable of practicing alternate methods for controlling the temperature control system based on the engine oil temperature. These alternate methods are well within the purview of the claims.

In operation, the above system functions as follows. During initial start-up, if the engine computer senses that the engine oil temperature is less than approximately 230° F., the engine computer raises or sets the predetermined temperature control fluid temperature value to approximately 240° F. until the engine computer detects that the engine oil temperature is at or near approximately 230° F. which is its normal operating temperature.

If the engine computer subsequently determines that the engine oil temperature is greater than approximately 230° F., the computer shifts the predetermined temperature control fluid temperature value from its normal operational value (e.g., approximately 200° F.) to a lower value. The shifting is achieved by decreasing the predetermined temperature control fluid temperature value 2° F. for every 1° F. that the actual engine oil temperature exceeds the predetermined engine oil temperature value. The downward shifting of the predetermined temperature control fluid temperature value is limited to approximately 170° F.

If after reaching the normal engine oil operating temperature, the engine computer subsequently determines that the engine oil temperature is less than approximately 230° F., the computer shifts the predetermined temperature control fluid temperature value from its normal operational value (e.g., approximately 200° F.) to a higher value. The shifting is achieved by increasing the predetermined temperature control fluid temperature value 2° F. for every 1° F. that the actual engine oil temperature is below the predetermined engine oil temperature. The upward shifting of the predetermined temperature control fluid temperature value is limited to approximately 240° F.

It is also contemplated that the control logic for the temperature control system may be incorporated into computer chips or processors mounted directly in the valve instead of in the engine computer. Hence, while the above discussion has concentrated on utilizing an engine computer for controlling the valves, it is also contemplated that other electronic control mechanisms may be utilized in its stead.

Although the EETC valves disclose fluid injectors which are integrated into the valve housing, the scope of the invention includes an embodiment wherein the fluid injectors are physically separated from the reciprocating EETC valve components and connected by fluid lines therebetween. Likewise, the fluid injectors associated with the restrictor/shutoff valves can be either integrated into the valve housing as shown in FIG. 38, or can be physically separated from the reciprocating valve components as shown in FIGS. 33 and 34. Alternatively, fluid injectors associated with an integrated valve such as shown in FIG. 38 can control the state of other restrictor/shutoff valves which do not have their own fluid injectors.

While the preferred embodiment utilizes an ECU to provide pressurized hydraulic oil to the EETC valve for actuating the valve member 146, a simpler and less precise means for providing the pressurized fluid is by mounting a thermostat-type device within the hydraulic fluid lines leading to and from the EETC. The thermostat would provide pressurized hydraulic fluid when the oil in the line or in the pan exceeds a prescribed temperature which, in the preferred embodiment, is chosen to be indicative of the engine oil temperature. A drawback to this type of a system is that a mechanism must be added to the system which removes or release the oil in the EETC valve when it is desired to close the valve, i.e., depressurize the diaphragm.

Figure 49:
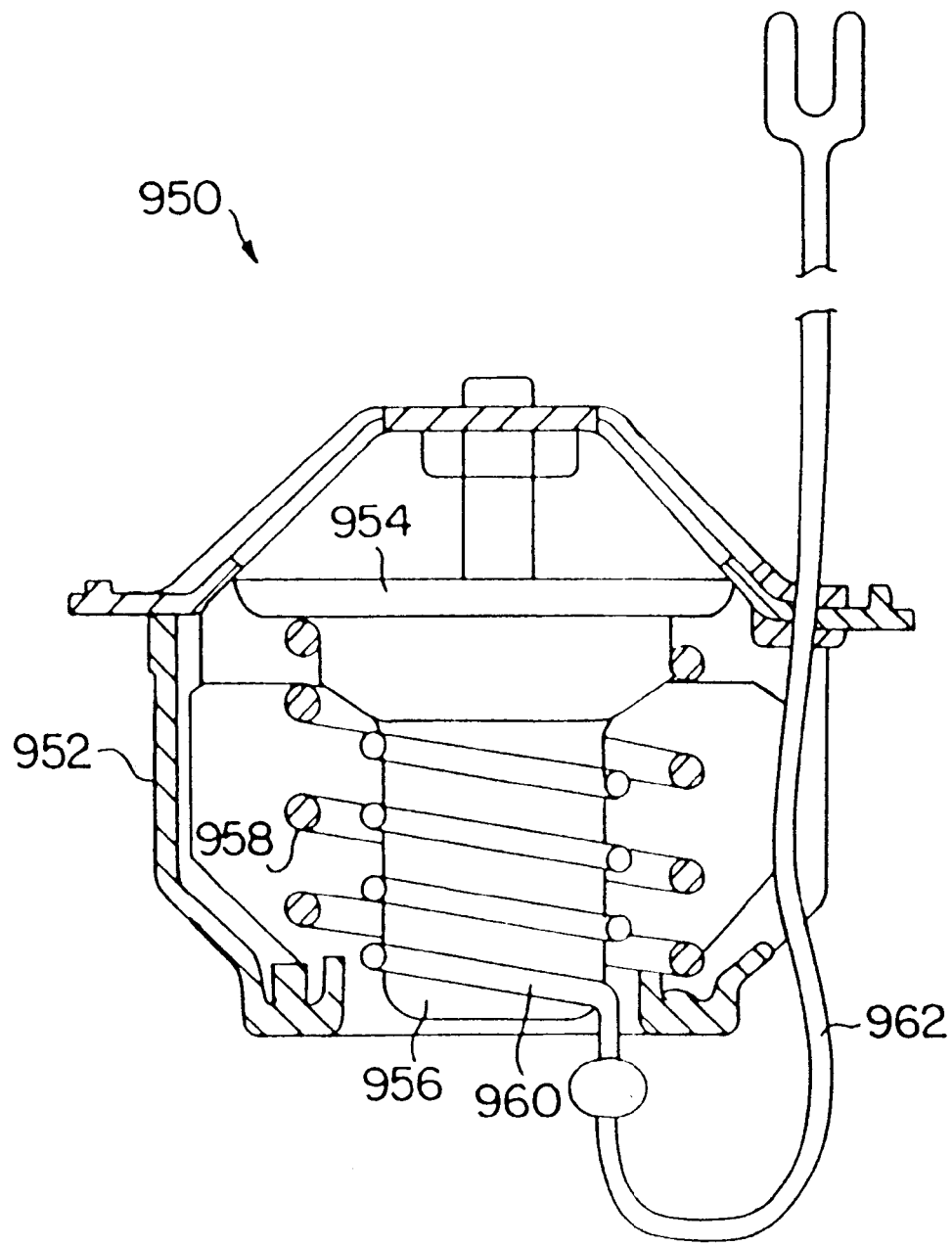
FIG. 49 is an illustration of an electronically assisted thermostat for use in a temperature control system.

As stated above, the preferred valve in the present invention is operated through the use of hydraulic fluid. However, other types of valves may also be utilized within the scope of this invention. For example, referring to FIG. 49, an electronically assisted thermostat 950 is illustrated which can be utilized in one embodiment of the present invention. The electronically assisted thermostat 950, to an extent, is configured and operates similar to a conventional thermostat. The conventional portion of the electronically assisted thermostat 950 includes an outer housing 952, a valve member 954, a wax pellet 956, and a return spring 958. The wax pellet 956 is designed to maintain the valve member 954 in a closed position when the wax pellet 956 is solidified. The return spring 958 is configured to bias the valve member 954 into an open position when the wax pellet 956 is melted. The details of the configuration and operation of conventional thermostats is well known to those skilled in the art.

The electronically assisted thermostat 950 also includes a heating element 960, such as a coil, which extends around or through the wax pellet 956. The heating element 960 is electrically connected to a power source (not shown) through an electrical cable 962. A computer, such as the ECU 900, controls the transmission of electric current along the cable 962 to the heating element 960. The heating element 960 is designed to heat up to an elevated temperature when current is supplied to it. The heat from the heating element 960 exposes the wax pellet 956 to an approximately 80 degree Fahrenheit temperature increase. This assists in melting the wax pellet 956 sooner than it would otherwise melt. Heating elements, such as dielectric heaters and resistance heaters, are well known in the art and, thus, no further details are required.

In order to operate more efficiently in the present system, the wax pellet 956 is calibrated to begin to open between 220° F. and 226° F. and to be fully open at a fluid temperature between 236° F. and 240° F. These temperatures are higher than current thermostat designs (e.g., approximately 180° F.). However, maintaining the temperature control system as a closed circuit (i.e., no radiator) until the temperature control fluid reaches 220° F. produces increased pressure (approximately 7 psi) in the system. To accommodate this increased pressure, the wax pellet 956 is preferably manufactured slightly larger then conventional pellets. A larger return spring 958 and housing 952 may also be necessary.

The ability of the heating element 960 to melt the wax pellet 956 80° F. before it would normally melt permits control over the temperature control fluid flow for a variety of temperature control fluid temperatures. The 80° F. temperature limit on the heating element 960 provides the lower limit at which the valve member 954 can be opened (e.g., lower temperature limit of 160° F.). This helps prevent loss of the heater and defrost capabilities of the system. The upper temperature limit is maintained at 240° F. by the melt temperature of the wax pellet 956 itself.

The operation of one preferred embodiment of the electronically assisted thermostat 950 will now be discussed.

The ECU 900 receives a signal indicative of the actual engine oil or block temperature. If actual engine temperature is less than a predetermined engine temperature value (e.g., the desired engine oil temperature value for a given sensed ambient air temperature), the thermostat operates in a conventional manner (e.g., initial opening when the temperature control fluid reaches 220° F./226° F.). If, however, the actual engine temperature is greater than the predetermined engine temperature value, the ECU 900 controls the transmission of current along the cable 962. The current results in heating of the heating element 960 which, in turn, causes the wax pellet 956 to begin to melt, thereby initiating opening of the thermostat.

The electronically assisted thermostat 950 described above provides a simple, lightweight device for efficiently controlling the flow of temperature control fluid.

The inlet hydraulic fluid injector employed in the novel EETC and restrictor/shutoff valves must tap into a source of pressurized hydraulic fluid to fill the respective valve chambers. Typical valves will tap into that source for about six seconds to fully change state. A slightly longer time period may be required for systems where a single injector fills the chambers of multiple restrictor/shutoff valves. These time periods are very short compared to the average length of a vehicle trip. Since valve states are unlikely to be changed more than a few times during a normal vehicle trip, the percentage of time that the pressurized source is tapped is anticipated to be very small, typically under one minute for every hour of driving, or less than 2%. Accordingly, there should be little, if any, effect on the normal functioning of the hydraulic fluid system. Thus, if the engine lubrication oil pump outlet lines are the source of the hydraulic fluid, the operation of the novel valves should not have any significant effect on the normal operation of the lubrication system. Nor should it be necessary to modify existing oil pumps or lubrication systems to accommodate the novel valves. The lines may tap off of the cylinder head or the block itself if desired, thus, requiring very little change to the existing engine envelope.

The preferred novel EETC and restrictor/shutoff valves described above reciprocate between a first position for allowing unrestricted flow of fluid through at least one passageway and a second position for restricting the flow through the passageway. The flow restriction is either partial or complete (i.e., 100 percent). Each of the valves are biased in one of the positions by a biasing spring and placed in the other position by hydraulic fluid pressure pushing against a piston member. In the EETC valves, the piston member is, preferably, either a diaphragm or a piston shaft. In the restrictor/shutoff valve, the piston member comprises a combination of a separate piston and shaft.

Although the EETC and restrictor/shutoff valves are shown as having a first position associated with a pressurized, fully filled chamber and a second position associated with an unpressurized, empty chamber, each of the valves can be designed to operate in reverse. That is, the position of the chambers and biasing springs can be reversed so that the valve is in a first position when the chamber is unpressurized and empty and is in a second position when the chamber is pressurized and fully filled. The scope of the invention includes such reversed configurations.

Likewise, the scope of the invention includes embodiments wherein the EETC and restrictor/shutoff valves are placed in positions between the first and second positions by only partially filling and pressurizing the respective chambers. To achieve a desired mid-position for a particular valve, chamber pressure values and/or filling or emptying time periods must be empirically determined for that valve. For example, if a particular EETC valve is fully opened by pressurizing the chamber to 25 psi and continuing to pressurize for two seconds after the chamber reaches 25 psi, a procedure of pressurizing until the chamber reaches 15 psi might place the valve in the desired mid-position. Alternatively, if it is desired to move an open EETC valve to a mid-position, partial chamber depressurization could be employed. Again, the particular pressure values and additional time periods must be empirically determined for a given novel valve. Once those values are determined, the ECU can be pre-programmed with the values to achieve the desired mid-position(s). Alternatively, a feedback control system employing valve position transducers connected to the ECU could be employed.

While the temperature control system of the present invention has been described as replacing the thermostat of an internal combustion engine, the system can also be utilized in conjunction with the a standard thermostat. An embodiment of this type would, preferably, incorporate a EETC valve in series with the thermostat. That is, the fluid line to the radiator would have both a standard thermostat mounted thereon, as well as an EETC valve. An ECU would determine when the EETC valve will have control over the fluid flow. Preferably, the EETC valve would control the initial start-up/warm-up mode of the engine, which is when the thermostat does not operate efficiently. In this mode, a means for inhibiting the thermostat would have to be incorporated to prevent the thermostat from opening the line to the radiator before the engine approaches its optimum temperature. For example, a pin could be actuated to lock the valve of the thermostat in the closed position. The actuation of the pin would be controlled by the ECU based on one of the valve control graphs discussed above. Accordingly, the EETC valve would be in control of the system until the TCF fluid reaches its normal operating temperature whereupon the EETC valve would be inhibited from further control and the thermostat would be released to control the system as is commonly performed. The thermostat could also be locked out when the ambient temperature falls below a predetermined temperature, such as zero degrees Fahrenheit.

It is envisioned that this embodiment would be utilized in situation where retrofitting of an existing engine is more desirable then fully implementing the disclosed temperature control system. Since the temperature control system disclosed provides significant benefits during start-up/warm-up and at low temperatures, the modified embodiment discussed above has advantages over a standard thermostatic system.

Another feature of the present invention is the ability to control various other engine parameters in combination with the control of the TCF. For example, it is possible to control the electric fan which provides cooling for the radiator. When the temperature of the TCF measured at the outlet of the radiator is approximately between about 150 degrees and 160 degrees Fahrenheit, and the vehicle speed is less than about 35 miles per hour, the fan is designed be operative. This corresponds to the operational state wherein the car is moving relatively slowly and the TCF is being to become hot car. It is typically in this operational state where most overheating will occur. When the car is traveling above 35 miles per hour, the air flowing through the radiator and around the engine block will function to reduce the TCF temperature. Variations on the control of the fan are also possible. The ECU can be programmed to provide the fan control or, instead, a separate fan control unit may be utilized.

It is also possible to control the spark generated by the spark plug utilizing signals from the ECU. For example, the temperature of the TCF in the radiator and the ambient air temperature can be monitored to determine how much spark is required to produce the optimum combustion of the fuel. It is preferable to utilize the TCF temperature in the radiator since this valve should be relatively stable as compared with the TCF temperature out of the engine block which may vary significantly. Those skilled in the art would readily understand that other modifications can be made to the operational state of the internal combustion engine when utilizing the novel system disclosed.

The temperature control system of the present invention provides additional consequential benefits. By providing the means to increase the actual temperature of the TCF fluid in cold temperature environments (see FIG. 23), the physical size of the heater can be decreased. This is because the hotter the temperature of the TCF, the less heater core surface area required to extract the necessary amounts of heat energy from the TCF to warm the vehicle's passenger compartment.

An engine employing the EETC valve and one or more restrictor/shutoff valves will have less engine out exhaust emissions and greater fuel economy than a prior art engine cooling system employing only a prior art thermostat. Since the reduction in emissions and improvement in fuel economy will be greatest in cold temperature environments and during engine start-up, the invention offers the possibility to significantly reduce vehicle exhaust pollution levels. An engine incorporating the novel EETC and restrictor valves should also produce increased horsepower at lower temperatures.

Currently, the United States Environmental Protection Agency conducts its emissions testing in relatively warm ambient air temperatures. Testing in these warm temperatures does not expose the actual polluting effects of vehicles when they are started and operated in cold temperature climates. For example, the current testing procedure requires that a vehicle "cold soak" in an ambient air temperature of 68 to 80 degrees Fahrenheit for 12 hours. That is, the vehicle must sit unused for 12 hours in this temperature environment so that the engine parts stabilize to that ambient air temperature. Then, the engine is started and emissions are measured to verify that they are within acceptable limits. Since the ambient air temperature is relatively warm the engine and catalytic converter quickly heat up to an efficient operating temperature. Most vehicles today would fail the current emissions standards if the "cold soak" test was required to be performed in significantly lower ambient air temperatures, such as 28 to 40 degrees Fahrenheit. An engine employing the EETC valve along with restrictor/shutoff valves or the engine block by-pass system illustrated in FIGS. 44A and 44B, will show a substantial improvement over current systems towards meeting current emissions standards under a "cold soak" test at such lower ambient air temperatures.

The inventions disclosed above provide an effective way to harness the underestimated one-third of heat energy handled by a vehicle's cooling system (see the excerpt in the Background of the Invention from page 111 of the Goodheart-Willcox automotive encyclopedia). The EETC valve, the restrictor/shutoff valve, and the use of programmed curves for determining their states are the basic building blocks for an engine temperature control system that effectively tailors the performance of the engine cooling system with the overall needs of the vehicle.

The present invention may be embodied in other specific forms without departing from the spirit or essential attributes thereof and, accordingly, reference should be made to the appended claims, rather than to the foregoing specification, as indicating the scope of the invention.

I claim:

1. A temperature control system in a liquid cooled internal combustion engine comprising:
   an electronically assisted thermostat for controlling flow of a temperature control fluid through the engine, the electronically assisted thermostat having a first state for inhibiting said flow and a second state for allowing said flow, the electronically assisted thermostat including
   a housing,
   a valve member reciprocatable within the housing between the first state and the second state,
   a return spring for biasing the valve member into the second state, a wax pellet attached to the valve member and having a solid state and a liquid state, the wax pellet maintaining the valve member in its first state when the wax pellet is in its solid state, and the wax pellet allowing the return spring to bias the valve member into its second state when the wax pellet is in its liquid state, and
   a heating element mounted within the housing and adapted to transfer heat to wax pellet, the heating element adapted to receive an electrical transmission for producing heating of the heating element;
   a first sensor for sensing a temperature indicative of the temperature control fluid temperature and for providing a temperature control fluid temperature signal indicative thereof; a second sensor for sensing the temperature of the ambient air and for providing an ambient air temperature signal indicative thereof;
   a third sensor for sensing the temperature of the engine oil and for providing an engine oil temperature signal indicative thereof;
   an engine computer for receiving the temperature control fluid temperature signal, the ambient air temperature signal, and the engine oil temperature signal the engine computer comparing the engine oil and ambient air temperature signals to a set of engine oil temperature limits, the engine oil temperature limits varying with ambient air temperature, the engine computer comparing the engine oil temperature signal to the engine oil temperature limit associated with the ambient air temperature signal the engine computer determining the desired state for the thermostat based on the comparison, the engine computer comparing the temperature control fluid temperature signal to a threshold temperature value to determine the actual state of the thermostat the thermostat being in its first state when the temperature control fluid temperature signal is less than the threshold temperature value and the thermostat being in its second state when the temperature control fluid temperature signal is greater than the threshold temperature value, the engine computer sending an output signal when the engine oil temperature signal exceeds the engine oil limit and the thermostat is in the first state; and
   wherein the signal from the engine computer controls the electrical transmission to the heating element.

2. A method for controlling the flow of temperature control fluid in an internal combustion engine, the method comprising the steps of:
   controlling the flow of temperature control fluid along a passageway within the engine with the use of an electronically assisted thermostat, the thermostat having a first state for inhibiting the flow of temperature control fluid through the passageway and a second state for allowing the flow of temperature control fluid through the passageway, the thermostat including a housing, a valve member reciprocatable within the housing between the first state and the second state, a return spring for biasing the valve member into the second state, a wax pellet attached to the valve member and having a solid state and a liquid state, the wax pellet maintaining the valve member in its first state when the wax pellet is in its solid state, and the wax pellet allowing the return spring to bias the valve member into its second state when the wax pellet is in its liquid state, and a heating element mounted within the housing and adapted to transfer heat to wax pellet, the heating element adapted to receive an electrical transmission for producing heating of the heating element;

receiving an engine oil temperature signal indicative of the temperature of the oil in the oil pan;

receiving an ambient air temperature signal indicative of the temperature of the ambient air;

selecting an engine oil temperature limit based on the ambient air temperature signal, the engine oil temperature limit varying as a function of the ambient air temperature;

comparing the engine oil temperature signal to the engine oil temperature limit; and sending an electrical transmission to the heating element when the engine oil temperature signal is greater than the engine oil temperature limit, the electrical transmission causing the heating element to melt the wax pellet so as to actuate the thermostat into its second state.

3. A temperature control system in a liquid cooled internal combustion engine comprising:

an electronically assisted thermostat for controlling flow of a temperature control fluid through the engine, the electronically assisted thermostat having a first state for inhibiting said flow and a second state for allowing said flow, the electronically assisted thermostat including a housing, a valve member reciprocatable within the housing between the first state and the second state, a return spring for biasing the valve member into the second state, a wax pellet attached to the valve member and having a solid state and a liquid state, the wax pellet maintaining the valve member in its first state when the wax pellet is in its solid state, and the wax pellet allowing the return spring to bias the valve member into its second state when the wax pellet is in its liquid state, and a heating element mounted within the housing and adapted to transfer heat to wax pellet, the heating element adapted to receive an electrical transmission for producing heating of the heating element;

a first sensor for sensing a temperature indicative of the temperature of the engine oil and providing an engine oil temperature signal indicative thereof;

a second sensor for sensing a temperature indicative of the temperature of the ambient air and providing an ambient air temperature signal indicative thereof;

an engine computer for receiving the engine oil temperature signal and the ambient air temperature signal, the engine computer selecting an engine oil temperature limit based on the ambient air temperature signal the engine oil temperature limit varying as a function of the ambient air temperature, the engine computer determining a desired thermostat state based on a comparison of the engine oil temperature signal to the engine oil temperature limit, the engine computer sending an electrical transmission to the heating element when the engine computer determines that the desired thermostat state is the second state.

\* \* \* \* \*